(12) United States Patent
Kajino et al.

(10) Patent No.: US 7,097,457 B2
(45) Date of Patent: Aug. 29, 2006

(54) TACTILE PIN HOLDING APPARATUS, TACTILE PIN DISPLAY APPARATUS AND BRAILLE DISPLAY MEMBER

(75) Inventors: Jiro Kajino, Osaka (JP); Michinori Hashizume, Kyoto (JP); Kaoru Shimizu, Osaka (JP); Tomohiro Asao, Osaka (JP)

(73) Assignee: ASKK Co., Ltd., Osaka (JP)

( * ) Notice: Subject to any disclaimer, the term of this patent is extended or adjusted under 35 U.S.C. 154(b) by 433 days.

(21) Appl. No.: 10/720,241

(22) Filed: Nov. 25, 2003

(65) Prior Publication Data

US 2004/0110562 A1 Jun. 10, 2004

(30) Foreign Application Priority Data

| Dec. 10, 2002 | (JP) | ............................. 2002-357444 |
| Jan. 29, 2003 | (JP) | ............................. 2003-019613 |
| Feb. 17, 2003 | (JP) | ............................. 2003-037541 |
| Feb. 27, 2003 | (JP) | ............................. 2003-050257 |
| Apr. 9, 2003 | (JP) | ............................. 2003-105248 |
| May 23, 2003 | (JP) | ............................. 2003-145704 |

(51) Int. Cl.
*G09B 21/00* (2006.01)

(52) U.S. Cl. ..................................... 434/112

(58) Field of Classification Search ................ 434/112, 434/113, 114, 115; 345/31, 108; 340/407.1, 340/407.2

See application file for complete search history.

(56) References Cited

U.S. PATENT DOCUMENTS

| 5,192,660 A | | 3/1993 | Reed-Gitomer |
| 5,522,728 A | * | 6/1996 | Kaplan ........................ 434/112 |
| 5,714,978 A | | 2/1998 | Yamanaka et al. |
| 5,720,616 A | * | 2/1998 | Schuler, III .................. 434/113 |
| 5,842,867 A | * | 12/1998 | Hong et al. .................. 434/114 |
| 6,109,922 A | | 8/2000 | Litschel et al. |
| 6,217,338 B1 | * | 4/2001 | Tieman ....................... 434/114 |
| 6,700,553 B1 | | 3/2004 | Becker et al. |
| 6,776,619 B1 | * | 8/2004 | Roberts et al. ............. 434/113 |
| 7,018,209 B1 | * | 3/2006 | Schleppenbach et al. ... 434/114 |
| 2002/0045151 A1 | | 4/2002 | Slattery |

FOREIGN PATENT DOCUMENTS

| DE | 195 39 306 | 5/1996 |
| JP | 9-127859 | 5/1997 |
| JP | 9-311622 | 12/1997 |
| JP | 2000-122526 | 4/2000 |

(Continued)

*Primary Examiner*—Kurt Fernstrom
(74) *Attorney, Agent, or Firm*—Wenderoth, Lind & Ponack, L.L.P.

(57) ABSTRACT

Rotational member (310) with plural tactile pins (301) movable up-and-down for displaying characters is rotated by rotation driving means. Elastic O-rings (370) are provided in the rotational member (310) for pressing and holding the pins (301). Actuators (320) brought to contact the pins (301) are provided nearby the rotational member (310) for positioning the pins (301) at desired heights from a tactile surface. Cam (330) brought to contact with the pins (301) is provided also nearby the rotational member (310) for positioning the pins (301) at the reset position or height. Furthermore, selectively actuating means is provided for selectively actuating the actuators (320). Owing to such arrangement, a continuous tactile pin display apparatus can be reduced in size, weight and cost.

By providing at least the pins (301) or the rotational member (310) with a photocatalyst, it becomes possible to decompose contaminants, such as bacteria, sweat, oil of the hand and food particles, deposited on the pins or their peripheral portions.

57 Claims, 29 Drawing Sheets

FOREIGN PATENT DOCUMENTS

| | | |
|---|---|---|
| JP | 2000-206873 | 7/2000 |
| JP | 2000-122526 | 4/2002 |

* cited by examiner

TACTILE PIN HOLDING APPARATUS, TACTILE PIN DISPLAY APPARATUS AND BRAILLE DISPLAY MEMBER

BACKGROUND OF THE INVENTION

1. Field of the Invention

The present invention relates to a tactile pin holding apparatus for holding plural pins such as 6 pins, 8 pins or more, and to a tactile pin display apparatus for continuously displaying desired characters and/or graphics, either braille or general (for e.g. the non-handicapped), two-dimensionally or three-dimensionally. More particularly, it relates to a tactile pin holding and moving mechanism by which the pins are moved up-and-down from and to a tactile surface, and held at desired positions or heights from the tactile surface. The present invention furthermore relates to a braille display member capable of decomposing contaminants deposited on the pins or their peripheral portions.

2. Background Art

In a conventional braille display apparatus, which is usually a tactile pin display apparatus, a plurality of braille cells, i.e. display cells, in a given number are arranged in one (braille) line. The tactile pins (hereinafter frequently referred to as pins simply) in the braille or display cells in one (braille) line are electromagnetically moved up-and-down for tactile pin display. After a user (visually handicapped) touches and read the tactile pins in the one braille line, a next braille line is displayed. By sequentially displaying such braille lines of display cells, the user reads the braille information line by line.

Japanese Laid-open Patent Publication 2000-122526 discloses a continuous braille display or tactile pin display apparatus comprising the following six elements. A first element comprises a rotational display drum having a plurality of braille cells, each being composed of 6 pins, wherein the 6 pins in each braille cell are raised and lowered in various ways to display one braille character. A second element comprises a display cover, which covers the display drum, and which exposes a part of the display drum at a braille display window thereof, i.e. braille display location. A third element comprises a display command input unit for inputting display commands. A fourth element comprises a display setting unit for selectively moving up-and-down, relative to a tactile surface, 6 pins in a braille cell at a non-display location of braille cells, thereby preliminarily setting the combination of the positions (heights relative to the tactile surface) of the 6 pins to display a braille character in correspondence with a character signal input to the display command input unit.

A fifth element comprises a display drum rotation driving unit for rotating the display drum relative to the display cover in response to a braille display command, such that the braille cell having been preliminarily set with respect to the combination of the positions of the 6 pins is brought to the place of the braille display window for being exposed outside thereat, and that the braille cell having been exposed outside at the braille display window is brought to a non-display location of braille cells. A sixth element comprises a display holding unit for holding the combination of the pins of the braille cell at the display location, namely at the braille display window.

Japanese Laid-open patent publication 2000-206873 proposes another continuous braille display apparatus comprising: a rotational display drum having a plurality of braille cells, each being composed of 6 pins to be raised and lowered in various ways to display one braille character, each pin being made of permanent magnet; a first arrangement for selectively raising or lowering the pins, using electromagnets; and a second arrangement for holding the pins at the raised and the lowered positions by two kinds of shape-memory alloy springs and heating means.

Japanese Laid-open Patent Publication Hei 09-127859 discloses an arrangement, using an elastic cantilever made of a flat spring, for holding pins at certain positions (heights) of the pins from a tactile surface.

Furthermore, Japanese Laid-open Patent Publication Hei 09-311622 discloses an arrangement, using frictional force of rubber sheet, for holding the pins to be movable up-and-down relative to the tactile surface.

However, the conventional braille display apparatuses according to e.g. Japanese Laid-open Patent Publications 2000-122526 and 2000-206873 have drawbacks, such that pin moving means and pin holding means have complicated structures, making it difficult to reduce in size, weight and cost. In addition, none of the four Japanese Laid-open Patent Publications teach any arrangements for keeping clean the pins and/or the rotational drums, constituting the braille display apparatuses, against odor, bacteria, sweat, oil of the hand, food particles and so on.

The conventional braille display or tactile pin display apparatuses will be more specifically described hereinbelow.

Firstly, Japanese Laid-open Patent Publication 2000-122526 requires a very complicated structure comprising: slippage prevention members (reference numeral 15 in FIGS. 5 and 6 of the Publication) for preventing the pins at the non-display place from slipping in an unintentional direction, either raising or lowering; and a display holding unit (reference numeral 9 in FIG. 2 there), i.e. hooking portions (reference numeral 22 in FIGS. 4, 8 and 9 there) of latching members (reference numeral 22a in FIGS. 8 and 9 there), for holding the pins against strong force of pressing the pins downward by e.g. a finger of a user.

Furthermore, for preventing the pin from pivoting or turning, it is required to bend an end of each pin (reference numeral 7b in FIG. 6 there), and to provide pivoting prevention slits (reference numeral 4e in FIGS. 5 and 6 there) Additionally, three pins (reference numeral 7 there) of each column of each braille cell (reference numeral 6 there) are moved up-and-down by three actuators (reference numeral 17 in FIG. 7 there) that are arranged at one place and are driven simultaneously. Moreover, at an abnormal condition such that a foreign article, such as a paper clip, falls onto the braille cells at the braille display window exposed to outside, and is stuck between the rotational display drum (reference numeral 4 there) and some other element of the apparatus, the rotation of the rotation driving motor is disturbed or stopped. Thereby, an overload or abnormal load is undesirably applied to the motor. This may undesirably cause the apparatus to overheat, emit smoke or even catch fire in the absence of any means to prevent the apparatus therefrom.

Secondly, the apparatus disclosed in Japanese Laid-open Patent Publication Hei 09-127859 is not a continuous braille display apparatus. A display plate (reference numeral 2 there) is fixed, and displays braille characters linearly. In other words, the display plate (2) neither rotates, nor continuously displays braille cells in linear movement.

Furthermore, pins (reference numeral 3 there) for displaying braille characters are held by flat springs (reference numeral 8 there). However, the flat springs (8) are not integrated with the display plate (2) or a plate (reference numeral 4 there), but are fixed on a holding member support plate (reference numeral 9 there). The flat springs (8) can hold the pins (3) against the movement of the pins (3) to be lowered to the display plate (2), but cannot hold the pins against the movement of the pins (3) to be raised from the display plate (2). That is, it only provides a unidirectional holding force.

Lastly, the apparatus disclosed in Japanese Laid-open Patent Publication Hei 09-311622 is not a continuous display apparatus, either. Pins (reference numeral 2 there) are arranged in predetermined numbers of rows and columns in one display zone for displaying characters and/or graphics. The display zone does not move, either rotate or move linearly, so that continuous display cannot be realized. There is provided a lower stopper plate (reference numeral 10 there) made of rubber material for holding the pins (2). However, the lower stopper plate (10) is not integrally supported or held with a flat display plate (reference numeral 1 there) having the pins (2) arranged thereon, and is fixed in the apparatus as a member separate from the flat display plate (1).

SUMMARY OF THE INVENTION

An object of the present invention is to provide a tactile pin holding apparatus for displaying characters and/or graphics, wherein the apparatus has a very simple mechanism for moving and holding pins, realizing small size, light weight and low cost.

A further object of the present invention is provide a tactile pin display apparatus which is small in size, light in weight and low in cost, thereby making it easy and convenient for users (handicapped) to buy and use, and making it possible to widely spread such apparatuses to public facilities such as libraries and transportation stations.

A still further object of the present invention is to provide a tactile pin display apparatus and a braille display member in which contaminants deposited thereon, such as bacteria, sweat, oil of the hand and food particles, can be decomposed, thereby keeping the surfaces thereof clean, and also constantly stabilizing sliding movement thereof when the sliding movement is needed.

According to a first aspect of the present invention, the object of the present invention is achieved by a tactile pin holding apparatus comprising: a holding member having a tactile surface and a first number of holes, and being provided for supporting the first number of tactile pins in the holes, respectively, to be movable up-and-down therein relative to the tactile surface for displaying characters and/or graphics, the tactile pins being arranged in multi-row multi-column and in a second number of groups at the tactile surface, the second number being smaller than the first number; and elastic members, in the second number, respectively corresponding to the second number of groups of tactile pins and being arranged at the holding member for pressing and holding the tactile pins with the holding member in a manner that each of the tactile pins in each of the groups of tactile pins is pressed at one side thereof by the elastic member corresponding to the each of the groups of tactile pins and can thereby be held at a desired height relative to the tactile surface, and that the each of the tactile pins is movable up-and-down when a force exceeding a given value is applied to the each of the tactile pins in up-and-down direction.

According to this tactile pin holding apparatus as well as the tactile pin holding apparatus in later described second aspect and the tactile pin display apparatuses in later described fourth and fifth aspects, tactile pins can be moved and held by a simple mechanism with one elastic member pressing and holding plural tactile pins, whereby the apparatuses can be made small in size, light in weight and low in cost.

It is to be noted here that the terminology "elastic" member according to the present specification is used to mean elastic member in a broad sense. More specifically, "elastic" member can mean not only rubber-type elastic member, but also a spring-type elastic member which may be referred to as "resilient" member, as long as such "elastic" member has a required function therefor.

In the first aspect and later described second, fourth and fifth aspects of the present invention, it is a first preferred mode that the second number is the number of rows of tactile pins, and each of the elastic members provided for each of the rows of tactile pins is an elastic ring placed annularly at the holding member (or rotational member) for pressing, at one side thereof, and holding each of the tactile pins in the each of the rows.

Further, in the first aspect and later described second, fourth and fifth aspects of the present invention, it is a second preferred mode that the second number is equal to half of the number of columns of tactile pins, and each of the elastic members is an elastic rod extending in column direction and being sandwiched between a pair of adjacent columns of tactile pins in a manner that the tactile pins in one column of the pair of columns are pressed and held by one side of the elastic rod, and the tactile pins in the other column are pressed and held by the opposite side of the elastic rod. In the present specification, the terminology "column direction" is used to mean a direction in which tactile pins in each column are aligned.

Further, in the first aspect and later described second, fourth and fifth aspects of the present invention, it is a third preferred mode that the second number is equal to half of the number of tactile pins, and each of the elastic members is an elastic segment sandwiched between a pair of adjacent tactile pins in each row in a manner that one of the pair of tactile pins is pressed and held by one side of the elastic segment, and the other tactile pin is pressed and held by the opposite side of the elastic segment.

These first, second and third modes are preferable modes for realizing the advantages of simple mechanism, small size, light weight and lost of the tactile pin holding apparatus or the tactile pin display apparatus using the tactile pin holding apparatus.

Further, in the first aspect and later described second, third, fourth, fifth and sixth aspects of the present invention, it is a preferred mode that each of the tactile pins has an annular groove for engagement with the elastic member. By this mode, each tactile pin can be more securely held by the elastic member.

Further, in the first aspect and later described second, third, fourth, fifth and sixth aspects of the present invention, it is preferred that the holding member (or rotational member) is disc-shaped, drum-shaped or conveyor-shaped.

Further, in the first aspect and later described first aspect and later described second, fourth, fifth and sixth aspects of the present invention, it is preferred that each of the elastic members is a non-metal ring-shaped member, a non-metal rod-shaped member, a non-metal tube-shaped member or a compression coil spring.

According to a second aspect of the present invention, the object of the present invention is achieved by a tactile pin holding apparatus comprising: a holding member having a tactile surface and a first number of holes, and being provided for supporting the first number of tactile pins in the holes, respectively, to be movable up-and-down therein relative to the tactile surface for displaying characters and/or graphics, the tactile pins being arranged in multi-row multi-column and in a second number of groups at the tactile surface, the second number being smaller than the first number; and elastic members, in the second number, respectively corresponding to the second number of the groups of tactile pins and being arranged at the holding member for pressing and holding the tactile pins with the holding member in a manner that each of the tactile pins in each of the groups of tactile pins is pressed at one side thereof by the elastic member corresponding to the each of the groups of tactile pins, wherein each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface.

This second aspect of the present invention makes it possible for the tactile pins to be more securely held at desired heights with less holding force of each of the elastic members, whereby the tactile pins can be moved up-and-down with a smaller force when the step portion of each tactile pin is out of engagement with the engagement portion of each hole.

In the second aspect of the present invention, it is preferred that the tactile pin holding apparatus further comprises engagement release members each for being coupled to each of the tactile pins for releasing the engagement between the step portion of the each of the tactile pins and the engagement portion of the each of the holes.

According to a third aspect of the present invention, the object of the present invention is achieved by a tactile pin holding apparatus comprising: a holding member having a tactile surface and holes, and being provided for supporting tactile pins in the holes, respectively, to be movable up-and-down therein relative to the tactile surface for displaying characters and/or graphics; and ring-shaped elastic members, each being arranged in each of the holes of the holding member and having each of the tactile pins fitly inserted therein for pressing and holding the each of the tactile pins with the holding member at a desired height relative to the tactile surface, wherein the each of the tactile pins is movable up-and-down in the each of the holes when a force exceeding a given value is applied to the each of the tactile pins in up-and-down direction.

According to this tactile pin holding apparatus, tactile pins can be moved and held by a simple mechanism with a simple ring-shaped elastic member (O-ring) for each of the tactile pins, whereby the apparatus can be made small in size, light in weight and low in cost. Further, each ring-shaped elastic member for each tactile pin can make each hole for each tactile pin dust-proof and drip-proof to prevent dust and water falling into each hole from further falling into inside of the apparatus.

According to a fourth aspect of the present invention, the further object of the present invention is achieved by a tactile pin display apparatus comprising: a rotational member having a tactile surface and a first number of holes, and being provided for supporting the first number of tactile pins in the holes, respectively, to be movable up-and-down therein relative to the tactile surface for displaying characters and/or graphics, the tactile pins being arranged in multi-row multi-column and in a second number of groups at the tactile surface, the second number being smaller than the first number; elastic members, in the second number, respectively corresponding to the second number of groups of tactile pins and being arranged at the rotational member for pressing and holding the tactile pins with the rotational member in a manner that each of the tactile pins in each of the groups of tactile pins is pressed at one side thereof by the elastic member corresponding to the each of the groups of tactile pins and can thereby be held at a desired height relative to the tactile surface, and that the each of the tactile pins is movable up-and-down when a force exceeding a given value is applied to the each of the tactile pins in up-and-down direction; rotation driving means coupled to the rotational member for rotating the rotational member; a pin height reset member provided nearby the rotational member for resetting the height of the tactile pins at a reset height when the tactile pins are brought to contact with the pin height reset member during the rotation of the rotational member; actuators provided nearby the rotational member for moving the tactile pins; and selectively driving means coupled to the actuators for selectively driving the actuators to selectively move the tactile pins to be positioned at desired heights, respectively, relative to the tactile surface.

According to this tactile pin display apparatus, tactile pins can be moved and held by a simple mechanism with one elastic member pressing and holding plural tactile pins, whereby the apparatus can be made small in size, light in weight and low in cost. Further, characters and/or graphics (braille characters and/or braille graphics) in any optional length or number can be continuously touched or read by a user who simply puts its finger, for example, on the rotational member.

In the fourth aspect and following described fifth and sixth aspects of the present invention, it is a preferred mode that the number of the actuators is equal to the number of rows of tactile pins, and the actuators are placed distantly from each other. This mode realizes an even simpler, smaller and lighter tactile pin display apparatus with a small number of actuators, and further increases freedom in designing outer dimension of each actuator.

Further, in the fourth aspect and following described fifth, sixth and eighth aspects of the present invention, it is a preferred mode that the number of the actuators is equal to the number of rows of tactile pins, and the actuators are driven at timings respectively different from each other. This mode realizes an even simpler, small and lighter tactile pin display apparatus with a small number of actuators, and further decreases a total peak current for driving the actuators by the selectively driving means.

Further, in the fourth aspect and following described fifth and sixth aspect of the present invention, it is preferred that the tactile pin display apparatus further comprises an abnormal load detecting means for detecting an abnormal load applied to the rotational member. Thereby, the safety of the tactile pin display apparatus can be increased, preventing the rotation driving means (motor) from overheating, emitting smoke and even catching fire.

Further, in the fourth aspect and following described fifth and sixth aspect of the present invention, it is preferred that the tactile pin display apparatus further comprises an indicator portion provided nearby the rotational member for a user to put its finger at for touching the tactile pins. Thereby, the user (visually handicapped) can easily recognize the position (tactile starting position) at which to put a finger.

Further, in the fourth aspect and following described fifth and sixth aspect of the present invention, it is preferred that photocatalytic function is provided to at least the rotational member or the tactile pins. Thereby, it becomes possible to decompose contaminants, such as bacteria, sweat, oil of the hand and food particles, deposited on the rotational member or the tactile pins. Further, it becomes easy thereby to wipe such contaminants off them, using a cloth or tissue paper. Furthermore, frictional resistance between each tactile pin and the wall surface of each hole for the tactile pin can be stabilized, preventing such ultimate malfunction that the tactile pins cannot be moved by the actuators.

According to a fifth aspect of the present invention, the further object of the present invention is achieved by a tactile pin display apparatus comprising: a rotational member having a tactile surface and a first number of holes, and being provided for supporting the first number of tactile pins in the holes, respectively, to be movable up-and-down therein relative to the tactile surface for displaying characters and/or graphics, the tactile pins being arranged in multi-row multi-column and in a second number of groups at the tactile surface, the second number being smaller than the first number; elastic members, in the second number, respectively corresponding to the second number of groups of tactile pins and being arranged at the rotational member for pressing and holding the tactile pins with the rotational member in a manner that each of the tactile pins in each of the groups of the tactile pins is pressed at one side thereof by the elastic member corresponding to the each of the groups of tactile pins, wherein each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface; rotation driving means coupled to the rotational member for rotating the rotational member; a pin height reset member provided nearby the rotational member for resetting the height of the tactile pins at a reset height when the tactile pins are brought to contact with the pin height reset member during the rotation of the rotational member; engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member; actuators provided nearby the rotational member for moving the tactile pins; and selectively driving means coupled to the actuators for selectively driving the actuators to selectively move the tactile pins to be positioned at desired heights, respectively, relative to the tactile surface.

This fifth aspect of the present invention makes it possible for the tactile pins to be more securely held at desired heights with less holding force of each of the elastic members, whereby the tactile pins can be moved up-and-down with a smaller force when the step portion of each tactile pin is out of engagement with the engagement portion of each hole.

According to a sixth aspect of the present invention, the further object of the present invention is achieved by a tactile pin display apparatus comprising: a rotational member having a tactile surface and holes, and being provided for supporting tactile pins in the holes, respectively, to be movable up-and-down therein relative to the tactile surface for displaying characters and/or graphics, the tactile pins being arranged in multi-row multi-column at the tactile surface; ring-shaped elastic members, each being arranged in each of the holes of the rotational member and having each of the tactile pins fitly inserted therein for pressing and holding the each of the tactile pins with the rotational member at a desired height relative to the tactile surface, wherein the each of the tactile pins is movable up-and-down in the each of the holes when a force exceeding a given value is applied to the each of the tactile pins in up-and-down direction; rotation driving means coupled to the rotational member for rotating the rotational member; a pin height reset member provided nearby the rotational member for resetting the height of the tactile pins at a reset height when the tactile pins are brought to contact with the pin height reset member during the rotation of the rotational member; actuators provided nearby the rotational member for moving the tactile pins; and selectively driving means coupled to the actuators for selectively driving the actuators to selectively move the tactile pins to be positioned at desired heights, respectively, relative to the tactile surface.

According to this tactile pin display apparatus, tactile pins can be moved and held by a simple mechanism with a simple ring-shaped elastic member (O-ring) for each of the tactile pins, whereby the apparatus can be made small in size, light in weight and low in cost. Further, each ring-shaped elastic member for each tactile pin can make each hole for each tactile pin dust-proof and drip-proof to prevent dust and. water falling into each hole from further falling into inside of the apparatus, which comprises the rotation driving means and others including a control circuit.

According to a seventh aspect of the present invention, the further object of the present invention is achieved by a tactile pin display apparatus comprising: a rotational member having a tactile surface and holes, and being provided for supporting tactile pins in the holes, respectively, to be movable up-and-down therein relative to the tactile surface for displaying characters and/or graphics, the tactile pins being arranged in multi-row multi-column at the tactile surface and each having an annular groove; elastic cantilevers, each being arranged in correspondence with each of the holes of the rotational member and each having an engagement portion engageable with the annular groove of the each of the tactile pins for pressing and holding the each of the tactile pins with the rotational member, wherein the each of the tactile pins is movable up-and-down in the each of the holes when a force exceeding a given value is applied to the each of the tactile pins in up-and-down direction; rotation driving means coupled to the rotational member for rotating the rotational member; a pin height reset member provided nearby the rotational member for resetting the height of the tactile pins at a reset height when the tactile pins are brought to contact with the pin height reset member during the rotation of the rotational member; actuators provided nearby the rotational member for moving the tactile pins; and selectively driving means coupled to the actuators for selectively driving the actuators to selectively move the tactile pins to be positioned at desired heights, respectively, relative to the tactile surface.

According to this seventh aspect of the present invention, pin holding force of each elastic cantilever in upward movement of each pin in each hole can be easily made different from that in its downward movement.

According to an eighth aspect of the present invention, the further object of the present invention is achieved by a tactile pin display apparatus comprising: a rotational member having a tactile surface and first holes, and being provided for supporting tactile pins in the first holes, respectively, to be movable up-and-down therein relative to the tactile surface for displaying characters and/or graphics, the tactile pins being arranged in multi-row multi-column at the tactile surface and each having an annular groove; an elastic sheet member having second holes, each being arranged in correspondence with each of the first holes of the rotational member and each being engageable with the annular groove of the each of the tactile pins for pressing and holding the each of the tactile pins with the rotational member, wherein the each of the tactile pins is movable up-and-down in the each of the first and the second holes when a force exceeding a given value is applied to the each of the tactile pins in up-and-down direction; rotation driving means coupled to the rotational member for rotating the rotational member; a pin height reset member provided nearby the rotational member for resetting the height of the tactile pins at a reset height when the tactile pins are brought to contact with the pin height reset member during the rotation of the rotational member; actuators provided nearby the rotational member for moving the tactile pins; and selectively driving means coupled to the actuators for selectively driving the actuators to selectively move the tactile pins to be positioned at desired heights, respectively, relative to the tactile surface.

This tactile pin display apparatus has an advantage in its further simplified pin holding and pin pressing mechanism, using the elastic sheet member.

According to a ninth aspect of the present invention, the still further object of the present invention is achieved by a tactile pin display apparatus comprising: a rotational member having a tactile surface and tactile pins to be movable up-and-down relative to the tactile surface; a moving mechanism coupled to the tactile pins for moving the tactile pins up-and-down relative to the tactile surface; and rotation driving means coupled to the rotational member, wherein photocatalytic function is provided to at least the rotational member or the tactile pins.

According to a tenth aspect of the present invention, the still further object of the present invention is achieved by a braille display member having photocatalytic function on a surface thereof or inside thereof.

The use of photocatalytic function for the tactile pin display apparatus and the braille display member according to the ninth and tenth aspects of the present invention makes it possible to decompose contaminants, such as bacteria, sweat, oil of the hand and food particles, deposited on the rotational member or the tactile pins. Further, it becomes easy thereby to wipe such contaminants off them, using a cloth or tissue paper.

BRIEF DESCRIPTION OF THE DRAWINGS

The present invention will be described hereinafter with reference to the annexed drawings. It is to be noted that all the drawings are shown for the purpose of illustrating the technical concept of the present invention or examples thereof, and do not represent precise dimensions or parameters of respective elements appearing therein.

FIG. 12 is a schematic block diagram, showing a control circuit for controlling a rotational member driving motor, actuators and so on.

DETAILED DESCRIPTION OF THE INVENTION

Figure 1:
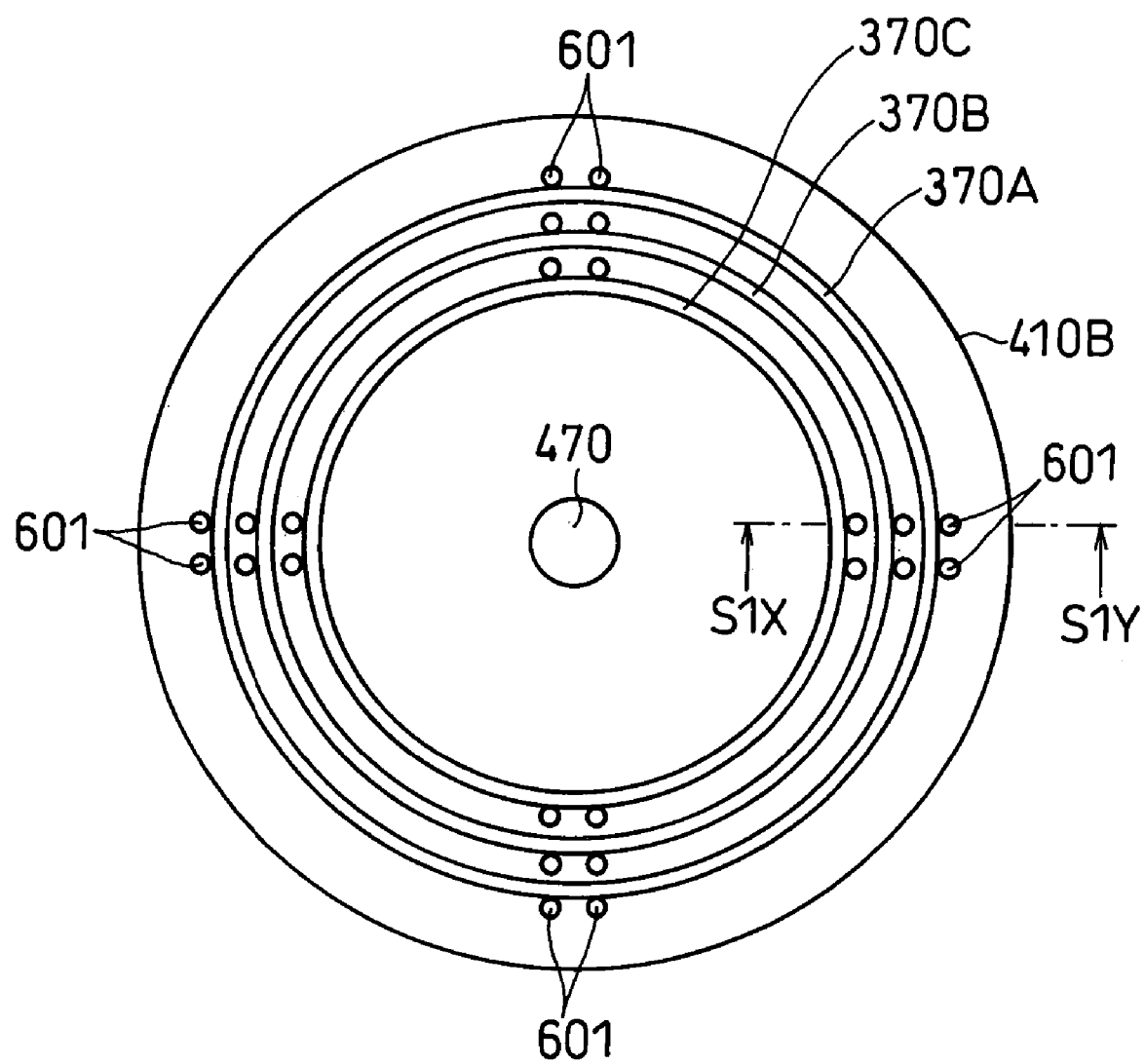
FIG. 1 is a schematic plan view, showing a main part of a rotational member for a continuous tactile pin display apparatus (braille display apparatus) according to an embodiment of the present invention, with an upper disc having been removed.

According to the above-described aspects of the present invention, each tactile pin display apparatus makes it possible to continuously display (touch or read) any desired number of pins (pin cells or braille cells), namely any desired lengths of sentences on a rotational member. This is thus different from the case of displaying (touching or reading) and refreshing one line (braille line) at a time. Moreover, in the tactile pin display apparatus according to the above-described aspects, the user (visually handicapped) putting its finger on the cylindrical surface (tactile surface) can feel as if moving the finger from left to right on a braille paper, or as if the finger traces a braille paper from left to right.

Further, according to the above-described aspects of the present invention, each tactile pin holding apparatus or tactile pin display apparatus preferably uses a holding member or rotational member made of a double-layered disc, a double-layered drum or a conveyor conveying a double-layered pin holding plate mechanism. The outer surface of each of the disc, the drum or the pin holding plate mechanism functions as a tactile surface. The terminology "tactile surface" is used herein to mean a surface for a user (e.g. a handicapped person) to touch the top surfaces of the pins by its finger (usually an index finger). By such touching, the user can recognize variations of heights of the pins. Usually, one display cell (braille cell) is composed of 6 pins arranged in 3-row 2-column. By touching display cells arranged continuously, the user can discriminate the variations of the heights of the pins as display cells (braille cells). According to a basic braille system, the height of each pin is selected to be either zero (the same level as or lower than the tactile surface) or one (one certain raised height). By selecting various zero-one combinations of the pins, various braille characters are assigned.

According to the present specification, the terminology "two-dimensional display" is used to mean display based on the zero-one combinations or two value combinations. Meanwhile, the terminology "three-dimensional display" is used to mean display based on combinations of three or more values. More specifically, according to the three dimensional display, the height of each tactile pin can be not only zero or one, but also other value or values between zero and one.

The height and the diameter of each pin can be optionally designed. Practically, it is considered to be preferable that each pin has a diameter in a range of about 1.0 mm to 2.0 mm, and the raised height is in a range of about 0.5 mm to 0.8 mm. The reason for allowing such parameters to be variable within the ranges is because to suit the tactile pin holding or display apparatus to distinct users.

More specifically, the distinctions are between adults and children, between those having big fingers and small fingers, and between those accustomed and unaccustomed to braille characters. To those accustomed to braille characters, the diameter and the height of each pin can be small, whereas such parameters should be large to the unaccustomed. It is said that the reading speed (tactile reading speed) of fast readers is about 300 to 400 characters per minute, while that of slow readers is about 50 to 100 characters per minute. Thus, the reading speed on average is about 200 characters per minute.

Each pin is preferred to have a curved surface, e.g. semi-spherical or roughly semi-spherical shape, at each of both ends thereof. The material of the pin is preferred to be selected from stainless steel, nickel, aluminum having been subjected to alumite-treatment on the surface thereof, brass, iron group metals having been subjected to anti-rust treatment, iron group metals coated with fluorine-based resin for stain resistance, cupper materials having anti-bacteria effect, resin materials, resin materials containing photocatalyst particles mixed therein and stainless steel provided with a photocatalyst. Furthermore, the curved surface to touch by fingers is preferred to be a mirror surface from the viewpoint of low frictional resistance.

Each elastic member, such as a non-metal ring-shaped member, a non-metal rod-shaped member or a non-metal tube-shaped member as described above in connection with the various aspects of the present invention, is preferred to be made of a rubber material, a soft resin (soft plastic) or a rubber O-ring. The rubber material is preferred to be silicone rubber (Si), fluorocarbon rubber (FKM), acrylonitrile-butadiene rubber (NBR) or natural rubber (NB). The soft resin is preferred to be a material, having a sufficient elastic deformation, selected from nylon resin, polyvinyl resin, fluorine-based resin, silicone-based resin, polyethylene resin and the line.

In the case of O-rings, it is advantageous from the viewpoint of cost to use commercially available O-rings. The cross-section of the O-ring, i.e. cross-section of wire for the O-ring, is preferred to have a shape of circle, rough circle, rectangle or rhombus. Furthermore, according to the present invention, the O-shape of the O-ring is not necessarily a perfect O-shape. It can be a substantially O-shape. For example, it can have a cut portion to discontinue the O-shape, such that the shape can be called C-shape. In the present specification, the terminology "O-ring" is used to mean to cover such O-ring that can have a cut portion as long as the O-ring has a required function of press and hold, with a pin holding member or rotational member, one or a plurality of tactile pins in a corresponding one or plurality of holes.

It is effective for the elastic member to have a lubricant material, such as fluorocarbon resin, on the surface or inside thereof. This is because thereby the frictional force between the elastic member and the tactile pin can be stabilized for a long time.

The material for the compression coil spring is preferred to be selected from metal materials, such as piano wire, and soft resin materials such as nylon resin and polyvinyl resin.

According to the tactile pin holding apparatuses in the first and the second aspect as well as the tactile pin display apparatuses in the fourth and fifth aspects of the present invention, tactile pins can be moved and held by a simple mechanism with one elastic member pressing and holding plural tactile pins. Accordingly, such apparatuses are effective not only for holding tactile pins to display braille characters, but also for holding tactile pins to two-dimensionally or three-dimensionally display general characters and/or general graphics in the case of arranging tactile pins in optional number of rows and optional number of columns.

In such case, it is also possible to place one elastic member, having a long rod shape (or string or thread shape), between each pair of adjacent columns of pins or between each pair of adjacent rows of pins, wherein the elastic member presses, at one side thereof, the plural pins in one column (row) and presses, at the other side thereof, the plural pins in the other column (row). It is also possible to prepare a very long elastic member having such long rod shape, and arrange the elastic member to be placed between every pair of adjacent columns (rows) of pins by folding the elastic member into a wave form with a plurality of folds in the number corresponding to the number of pairs of columns (rows). Hence, according to the present specification, plural elastic members to be placed among tactile pins can be one continuous elastic member having the function of plural elastic members as described above. In other words, the terminology "elastic members" can mean one elastic member having the function of plural elastic members, elastic rods or elastic segments.

According to the tactile pin holding apparatus in the third aspect as well as the tactile pin display apparatus in the sixth aspect of the present invention, tactile pins can be moved and held by a simple mechanism with a simple ring-shaped elastic member (O-ring) for each of the tactile pins, whereby the apparatus can be made small in size, light in weight and low in cost. Further, when a user carelessly drops e.g. water or drink onto the surface of the pin holding member or the rotational member, or when dust deposits on the same surface, such water, drink or dust may fall in to one or more of the holes. In such case, the ring-shaped elastic members for the tactile pins, which can make the holes for the tactile pins dust-proof and drip-proof, can prevent such water, drink and/or dust from further falling into inside of the apparatus. Thereby, various elements in the apparatus, such as the rotation driving means and the control circuit unit, can be protected from being damaged by such water and/or dust.

According to the tactile pin holding apparatuses and the tactile pin display apparatuses in the first to the eighth aspects of the present invention, the pin holding force for holding each tactile pin by each elastic member is preferred to be 0.3 N to 1.0 N (newton), more preferably 0.4 N to 0.8 N, generally describing.

The pin holding force is defined in the present specification as a critical force, such that when a force equal to or below the critical force is applied to each pin, the pin stays at the then position or height relative to the tactile surface, while when a force exceeding the critical force is applied to each pin, the pin moves from the then position or height relative to the tactile surface. The pin holding force is thus typically such critical force that when a user presses each pin by its finger with a force exceeding the critical force, the pin is lowered toward the tactile surface, while the pin stays at the then height when the user presses the pin with a force equal to or below the critical force. Generally, an average pressing force by a finger of a user is as low as about 0.1 N.

In the case of the second and the fifth aspects of the present invention, however, such pin holding force by each elastic member can be as small as about 0.1 N because the height of each pin relative to the tactile surface can be held by the engagement between the step portion of the pin and the engagement portion of the hole. An advantage of such low holding force is in that the force by each actuator for moving the pin up-and-down relative to the tactile surface can be made small, whereby the actuator can be reduced in size and its power consumption, and the entire apparatus can also be reduced in size, weight and cost.

For allowing each elastic member to have a desired pin holding force, it is preferable to select material, hardness, wire diameter, structure and the like of the elastic member. This will be described below in accordance with different the different modes of elastic members or pin holding mechanisms.

In the case of the elastic cantilevers each made of a flat spring of stainless steel, it is preferred that the flat spring has a plate thickness of about 0.06 to 0.07 mm, a plate width of about 2 mm and an amount of spring deflection of about 0.7 to 0.8 mm.

In the case of the O-rings, each being annularly arranged on a rotational member for pressing and holding, at one side thereof, plural tactile pins having a diameter of about 1.2 mm and each being made of nitro-butadiene rubber, it is preferred that the O-ring has a wire diameter of about 1.4 to 1.6 mm and an amount of elastic compression (amount of wire diameter shrinkage) of each O-ring caused by the pin pressing is about 0.3 to 0.6 mm, and that the cross-section of the wire of the O-ring has a shape of circle, rough circle, rectangle or rhombus as selected from commercially available O-rings.

In the case of the O-rings each being for pressing and holding each tactile pin having a diameter of about 1.2 mm and each being made of nitro-butadiene rubber, it is preferred that each O-ring has a wire diameter of about 0.6 mm and an inner diameter of about 0.8 to 1.0 mm. Furthermore, in the case of having such O-ring for inserted in each tactile pin, it is also preferable to provide plural ones of such O-rings for each tactile pin, because thereby the tactile pin can be held with a larger force, and the function of dust-proof and drip-proof can be enhanced.

In the case of the rubber sheet (elastic sheet) made of nitro-butadiene rubber having holes each for pressing and holding each tactile pin having a diameter of about 1.2 mm, it is preferred that the rubber sheet has a thickness of about 0.6 to 2.0 mm with a diameter of each hole being about 0.8 to 1.0 mm, which is to be about 10 to 30% smaller than the diameter of the pin. The shape of each hole can be selected from circle, quasi-circle, triangle and so on.

Next, it is optional to provide, to each tactile pin display apparatus, an indicator portion for a user to put its finger at. When such indicator portion is needed, it should be provided in the vicinity of the rotational member. The shape of the indicator portion can be optional. For example, in the case of a disc-shaped rotational member, it is formed by firstly providing a wall having a width of about 2 mm and a height of about 0.3 mm nearby the circumference of the rotational member, and by secondly removes one portion of the wall, whereby the removed portion becomes an indicator portion. In another way, one portion of an apparatus housing, which portion is designed to be at substantially the same level as that of the rotational member, and which portion is positioned in the vicinity of the circumference of the rotational member, can be provided with a recess having a depth of about 0.3 mm and a bottom of e.g. a triangle shape or roughly arrow head shape, whereby the recess becomes an indicator portion. Thereby, the user can touch, by the finer, both the indicator portion and the pins on the tactile surface of the disc-shaped rotational member at the same time.

In the case of cylinder-shaped and conveyor-shaped rotational members, an indicator portion can be optionally provided as well. For example, in the case of a cylinder-shaped rotational member, usually it is so designed that the axis of the cylinder is parallel to the ground or horizontal plane in the tactile pin display apparatus, and that hence the cylindrical surface rotates to be exposed at an upper part of the display apparatus and hidden at a lower part of the display apparatus. Ordinarily, the upper part of the display apparatus is open as a window with a rotational angle of about 45 degrees. Thus, an indicator portion in such case is provided at an end portion of a housing of the display apparatus, which portion faces and is close to an end of the cylinder of the cylinder-shaped rotational member at an upper side of the display apparatus. Thereby, a user can touch, by its finger, the indicator portion and the tactile pins on cylindrical surface at the same time.

Likewise, a tactile pin display apparatus using a conveyor-shaped rotational member is so designed that the axis of each of the rotation driving means such as pulleys and sprockets in the display apparatus is parallel to the ground or horizontal plane, and that hence the conveyor surface rotates to be exposed at an upper part of the display apparatus and hidden at a lower part of the display apparatus. Here, the upper side of the display apparatus is usually provided with an open window to display about 40 to 50 display characters (braille characters) from the window. In such case, an indicator portion is provided at an end portion of a housing of a tactile pin display apparatus, which portion faces and is close to an end of the belt or chain of the conveyor at an upper side of the display apparatus. Thereby, a user can touch, by its finger, both the indicator portion and the tactile pins on the surface of the conveyor at the same time.

Next, according to the seventh aspect of the present invention, each elastic cantilever is preferred to be selected from a flat spring made of stainless steel and a piano wire, each of which has, at a free end thereof, a V-shaped bent portion as the engagement portion to be engaged with the annular groove of each tactile pin. By elastically pressing the engagement portion, e.g. V-shaped, to the annular groove of the pin, the pin can be held with a desired holding force at the height as defined by the engagement between the engagement portion of the elastic cantilever and the annular groove. Here, the pin holding force of each elastic cantilever in upward movement of each pin in each hole can be easily made different from that in its downward movement.

Next, regarding the actuators for moving (either raising or lowering) the tactile pins relative to the tactile surface of the holding member or the rotational member according to the above-described various aspects of the present invention, it is preferred that each of such actuators is selected from the following members or mechanisms: a motor (pulse motor or the like) having a disc cam mounted on a shaft thereof; an electric cylinder (motor having a lead screw provided on a shaft thereof); a linear motor; an electromagnetic solenoid; a cam made of a permanent magnet rotated by an electromagnet; a plate-shaped electromechanical conversion element (piezoelectric element) polarized in its thickness direction; and the like.

A preferable member for moving the tactile pins back to the reset position or height (lowering or raising the pins to the first position) is a cam having a gradual slope surface or a rotatable roller.

It is preferred that the actuators, the cam, the roller and the like for moving the tactile pins are arranged in the vicinity of the rotational member and on e.g. a housing or a base of the tactile pin display apparatus.

Next, it is preferred that each tactile pin, each holding member and each rotational member for holding each pin have photocatalytic function. More specifically, it is preferred that each of such pins and members has thereon a coating of a photocatalyst of e.g. titanium dioxide particles, which can be formed by coating thereon a liquid containing such photocatalyst. For example, such liquid can be a liquid dispersion or a slurry of titanium dioxide particles having anatase crystal structure in water and/or an organic solvent. Examples of such organic solvents are propanol, alcohol, ester, ether, amine, hydrocarbon and mixtures of them. It is optional e.g. to add a silan coupling agent or titanium coupling agent to a titania sol, and to add a surfactant to the solvent.

It is preferred to mix a further material with the liquid containing the photocatalyst. Examples of such further materials are acryl resin, alkyd melamine rein, vinyl acetate-based resin, fluorine-based resin, silicone-based resin, epoxy-based resin, urethane-based resin, polysiloxane-based rein, UV-resin (UV-curable resin), natural rubber, butyl rubber, vinyl chloride-based resin, phenol resin, ABS (acrylonitrile-butadiene-styrene) resin, PS (polystyrene) resin, styrene-based resin and polyamide resin. It is preferable to adjust the viscosity of the liquid mixture containing the photocatalyst, using a general organic solvent such as alcohol, thinner, acetone, xylene and the like.

Examples of methods for coating the liquid mixture containing the photocatalyst are dipping (immersion), spraying, printing (screen printing, gravure printing, electrostatic printing, ink jet printing, pad printing, and the like), and the like. Instead thereof, it is also possible to use a coating method conducted in gaseous phase. Examples of such gaseous coating methods are PVD (physical vapor deposition) including sputtering and ordinary vapor deposition, CVD (chemical vapor deposition) and thermal spraying.

Average particle size of the titanium dioxide for the photocatalyst is preferred to be a few nm (nanometers) to a few hundred nm. The amount of the titanium dioxide in the liquid mixture is preferred to be about 0.5 to 5 wt %. The thickness of the liquid mixture containing the photocatalyst to be coated is preferred to be about 0.1 to 10 μm. The liquid mixture containing the photocatalyst is preferred to be transparent to a light for activating the photocatalyst such as near-ultraviolet light. The liquid mixture does not need to be transparent thereto, however, if the photocatalyst contains water, aniline or the like that can evaporate. This is because thereby micropores through which the activating light reaches the photocatalyst can be generated in the photocatalyst layer, more specifically in the resin layer in the photocatalyst layer.

By providing the tactile pins, the rotational member and the like in the tactile pin holding or display apparatuses, it becomes possible to decompose contaminants deposited on such elements, such as bacteria, sweat, oil of the hand and food particles. It also becomes possible thereby to stabilize the surface conditions of the tactile pins and to smooth the movements of the tactile pins.

In the case where the tactile pins and the holding member or the rotational member for holding the pins are made of a resin material, it is preferred to mix a few wt % to about 10 wt % of photocatalyst such as titanium dioxide with the resin material, and then to mold the resin material into a desired form for such elements. Examples of the molding methods are injection molding, extrusion molding, blow molding, and the like. Examples of such resin materials are urea resin, melamine resin, ABS resin, PS resin, PP (polypropylene) resin, epoxy resin, acryl resin, fluoride resin, fluorocarbon resin, and the like.

Examples of the photocatalysts are titanium dioxide, mixture of titanium dioxide with activated carbon, titanium dioxide responsive to visible light and the like that are each in the form of fine particles. The titanium dioxide can be rutile type such as those metalized by a metal of e.g. copper, silver or platinum, but is more preferably anatase type. It is also possible to use a semiconductor material, such as $WO_3$, $CdS$, $CdSe$, $SrTiO_3$ and $MoS_2$, for forming the photocatalyst.

In the case where there is possibility that the photocatalyst may decompose the above-described materials to be mixed with the photocatalyst and/or targeted objects such as the tactile pins and the holding or rotational member, it is preferable either to partially coat the surfaces of the particles of the photocatalyst with a material which is inert to or is not decomposed by the photocatalyst, or to coat the surfaces of the particles of the particles of the photocatalyst with porous layers. Examples of the materials inert to the photocatalyst are silica, alumina, zirconium, calcium, barium, strontium, magnesium, zinc, niobium, apatite of ceramics, and combinations of these materials.

As described above, by providing a photocatalyst to the tactile pins, the holding and the rotational members and/or other elements in the tactile pin holding and the tactile pin display apparatuses, it becomes possible to decompose, bactericide or deodorize contaminants (deposited on such elements) such as bacteria, sweat, oil of the hand and food particles. More specifically, photocatalysts subjected to lights, such as sun light and fluorescent light, containing near-ultraviolet light component in the wavelength range of about 300 to 400 nm are activated, thereby decomposing contaminating organic materials such as acetaldehyde and ammonia. The contaminating materials having been decomposed can be easily wiped off by a cloth, tissue paper or the like, or can be washed off.

The tactile pin holding apparatus and the tactile pin display apparatus are furthermore preferred to be provided with a lubricant at each pin moving portion thereof. For example, it is preferable to coat each pin firmly with a fluorocarbon rein (e.g. by bake coating) or with a solid lubricant using plastics-based material. It is also possible to allow the holding member, the rotational member, the tactile pins and the ring-shaped members to contain e.g. a fluorine-based resin. Thereby, the frictional force between each tactile pin and such member or members as supporting and holding the pin can be decreased and stabilized. As a result, the pin holding force by e.g. each elastic member can be stabilized as well.

Hereinafter, tactile pin holding or display apparatuses (braille holding or display apparatuses) according to certain non-limiting embodiments of the present invention will be described with reference to the drawings. In FIGS. 1, 3, 5, 10, 13, 16, 18, 19, 20 and 22, only a partial number of tactile pins for displaying pin patterns (braille) are shown in order to simplify the drawings. Actually, optional numbers of pin groups (braille cells) for about 8 to 50 characters (braille characters) are annularly and equiangularly arranged on a tactile surface of each rotational member.

Embodiment 1

Figure 2:
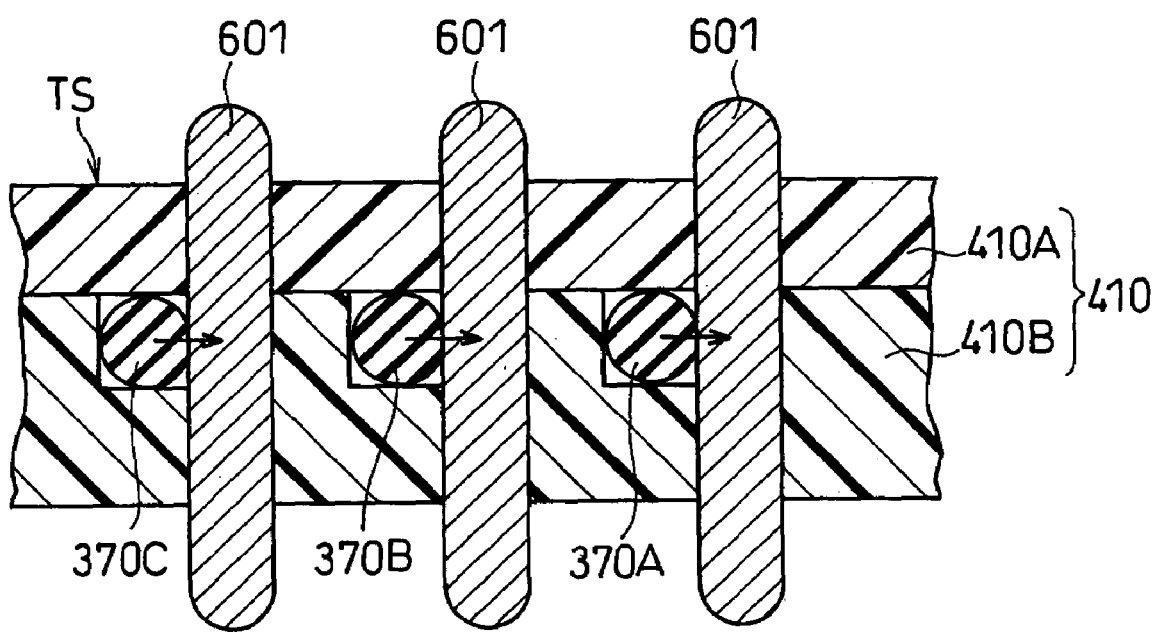
FIG. 2 is a schematic cross-sectional view, cut by S1X-S1Y plane shown in FIG. 1, showing a part of the rotational member of FIG. 1 with the upper disc fixed thereto.
Figure 9:
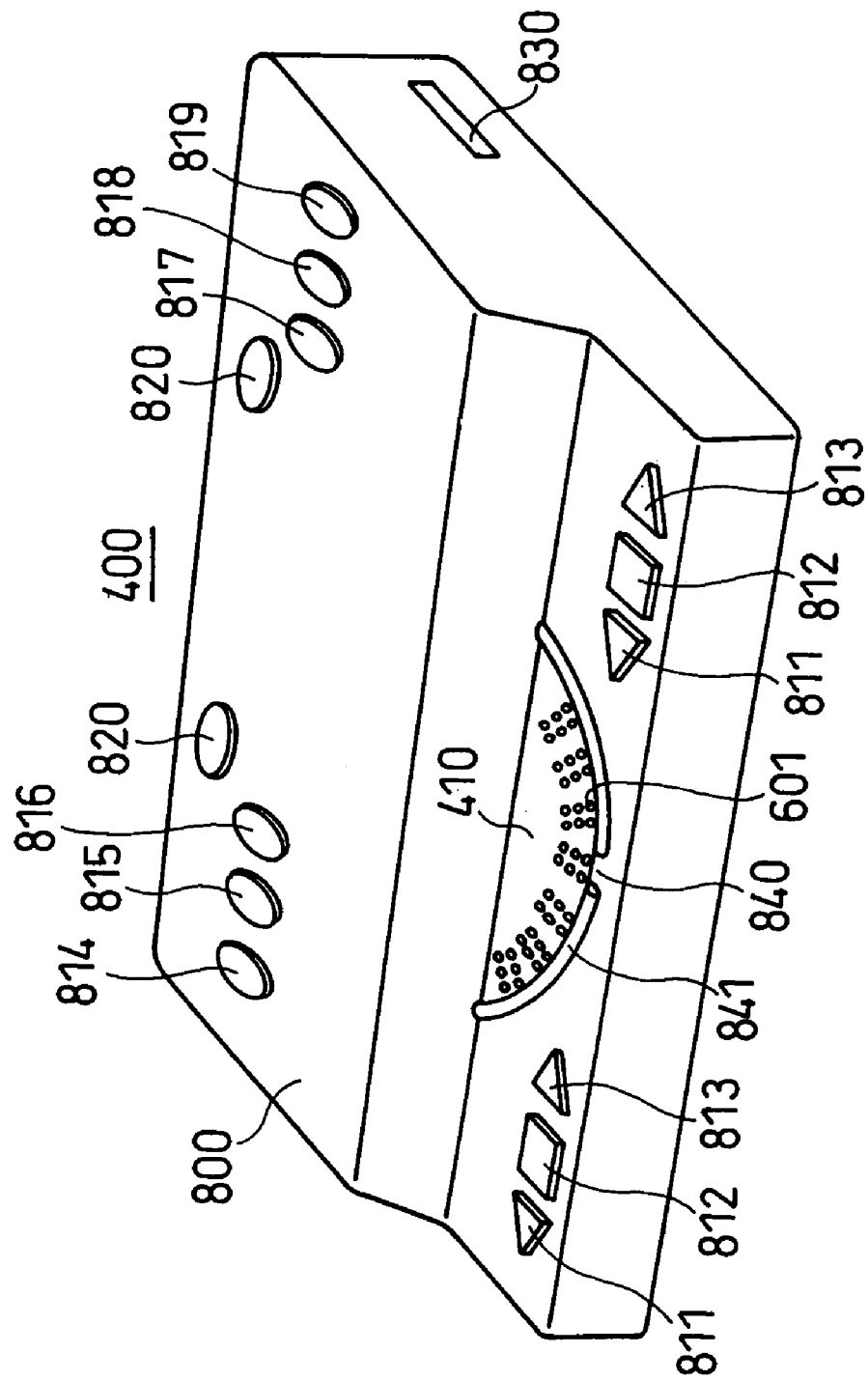
FIG. 9 is a schematic oblique view, conceptually showing a part of a tactile pin display apparatus according to an embodiment of the present invention.
Figure 10:
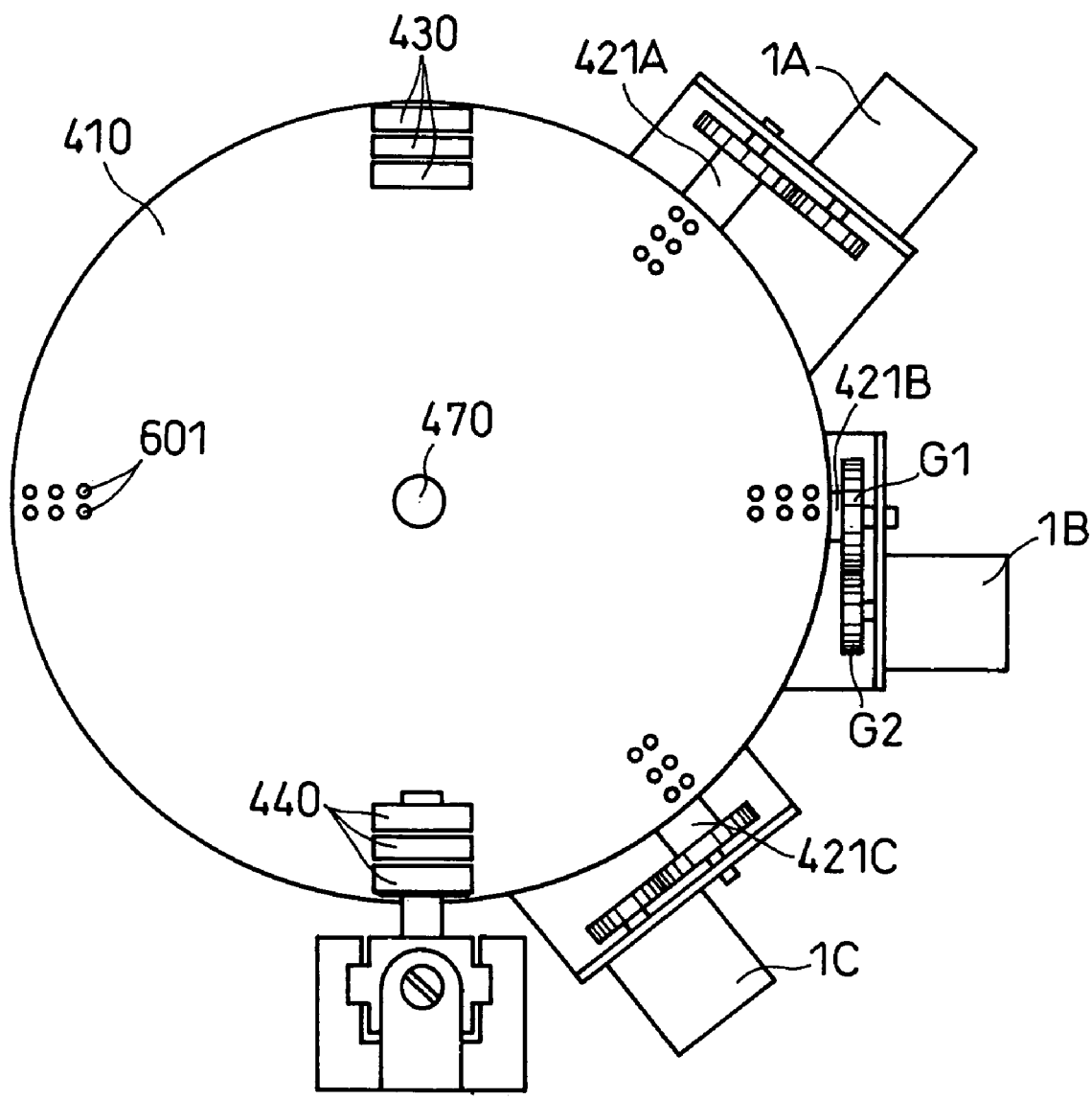
FIG. 10 is a schematic plan view, conceptually showing a part of the apparatus of FIG. 9, with a housing shown in FIG. 9 having been removed.
Figure 11:
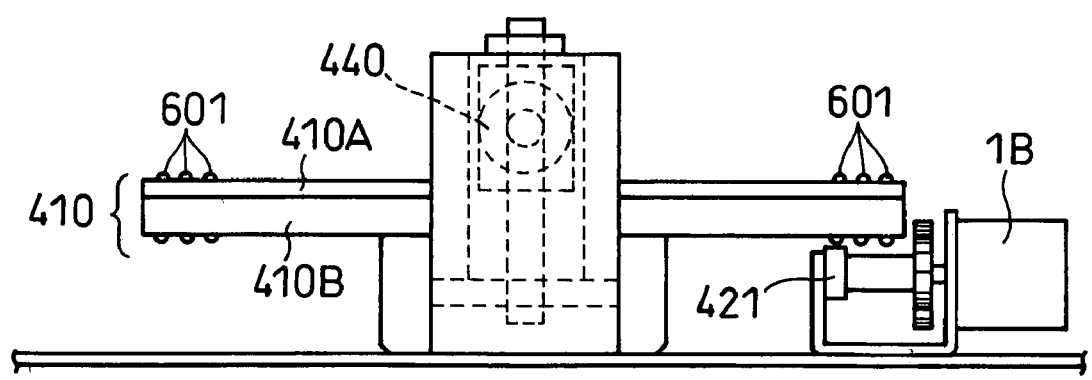
FIG. 11 is a schematic side view of a part of the apparatus of FIG. 10.
Figure 12:
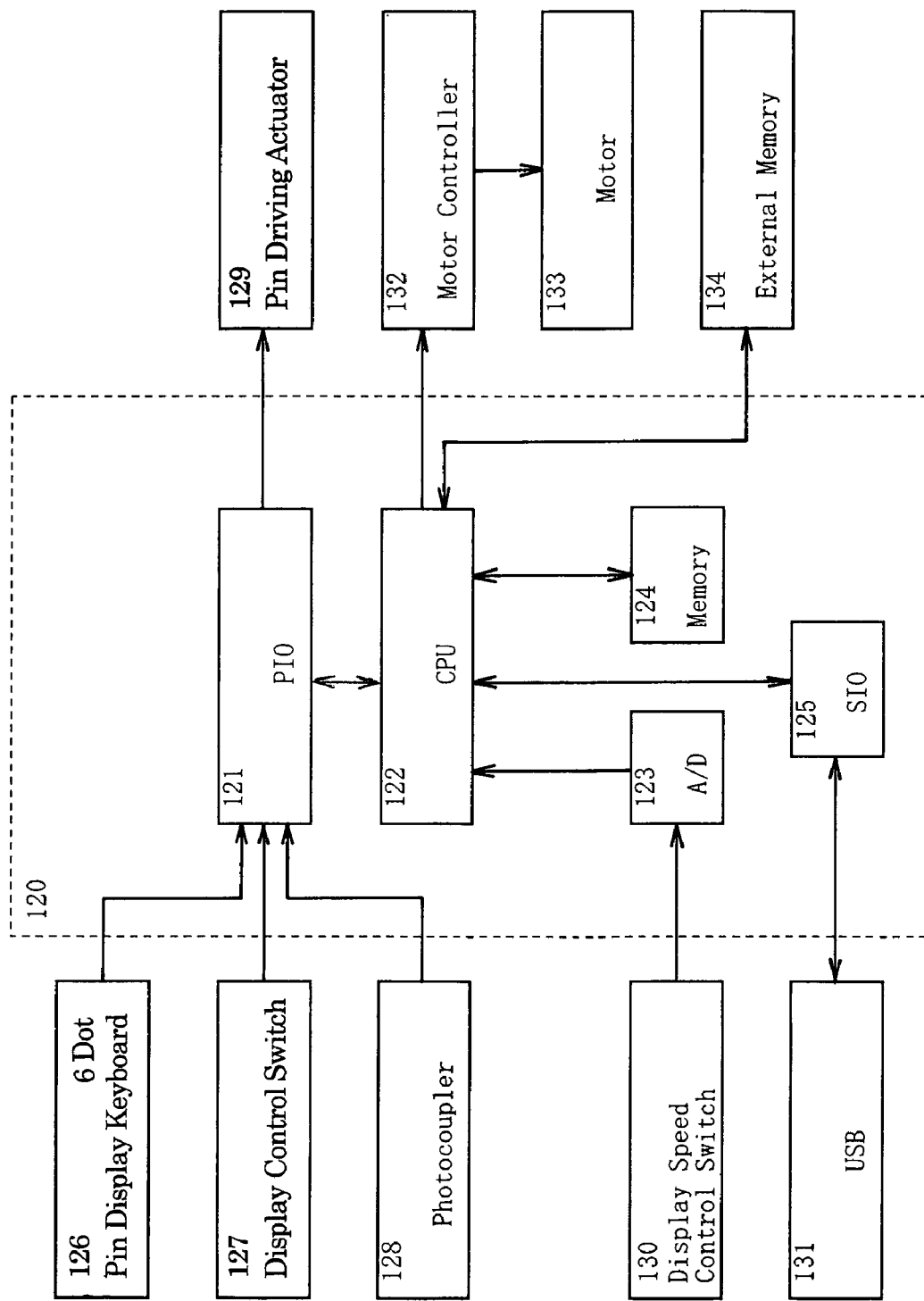

FIG. 1 is a schematic plan view, showing a main part of a rotational member for a continuous tactile pin display apparatus (braille display apparatus) according to the present EMBODIMENT, with an upper disc having been removed. FIG. 2 is a schematic cross-sectional view, cut by S1X-S1Y plane shown in FIG. 1, showing a main part of the rotational member of FIG. 1 with the upper disc fixed thereto. FIG. 9 is a schematic oblique view, conceptually showing a main part of a tactile pin display apparatus according to the present EMBODIMENT. FIG. 10 is a schematic plan view, conceptually showing a main part of the apparatus of FIG. 9, with a housing shown in FIG. 9 having been removed. FIG. 11 is a schematic side view of a main part of the apparatus of FIG. 10. FIG. 12 is a schematic block diagram, showing a control circuit for controlling a rotational member driving motor, actuators and so on.

The tactile pin display apparatus 400 comprises seven main elements. A first element comprises a rotational member 410 having, annularly arranged on a tactile surface thereof, plural cells (braille cells) composed of up-and-down movable pins 601 as shown in FIG. 9. A second element comprises three O-rings 370A, 370B and 370C being made of rubber and annularly arranged in recessed grooves on the rotational member 410 for radially pressing the pins 601 from one side of each pin and holding the pins as shown in FIG. 1. A third element comprises three actuators (pulse motors 1 to 3, disc-type cams, etc.) to raise the pins 601 to a height of about 0.7 mm from the tactile surface when the rotational member 410 rotates to bring the actuators to contact with the pins as shown in FIG. 10. A fourth element comprises three rollers 440 for making uniform the raised heights of the pins when the rotational member 410 rotates as shown in FIG. 10. A fifth element comprises three rollers 430 which are positioned downstream of the rollers 440 in the rotational direction of the rotational member 410, and which are brought to contact with the pins 601 and lower the pins to the tactile surface (i.e. first position or pin reset position or pin reset height) or allow the pins to stay at the lowered position (i.e. first position) when the rotational member 410 rotates as shown in FIG. 10. Thus, the rollers 430 can be referred to as pin height reset member (pin position reset member). A sixth element comprises selectively actuating means (not shown) for selectively actuating the three actuators. A seventh element comprises rotation driving means (not shown) for rotating the rotational member 410.

The present EMBODIMENT, as shown in e.g. FIG. 1 and FIG. 9, illustrates a case where each cell (braille cell) is composed of 6 pins (3 rows and 2 columns) for displaying one character (braille character). The 6 pins are basically the same as each other. Each pin 601 is made of stainless steel in a diameter of about 1.2 mm, and a length of about 8 mm, and has a roughly semi-spherical shape at each end thereof.

FIG. 1 and FIG. 2 schematically show an example of a structure for holding the pins 601. Three O-rings 370A, 370B and 370C are annularly and coaxially arranged in correspondence with each of the three rows of each cell. All the annularly arranged pins at the first row of each cell are pressed, at one side of each thereof, by the annularly arranged O-ring 370A in the arrow direction as shown in FIG. 2, whereby the pins are held. Likewise, all the annularly arranged pins at the second row and those at the third row are pressed at one side of each thereof and thereby held by the O-rings 370B and 370C, respectively, as shown in FIGS. 1 and 2.

Although not shown here, it is also possible that each pin is provided with an annular groove (grooves) in a manner similar to those as later shown in FIG. 19 (annular groove 1002) and FIG. 24 (annular grooves 2 and 3) for the purpose of allowing each O-ring to engage with such annular groove(s) for increasing the holding force of the pin by the O-ring. In providing such annular groove(s), it is preferable to provide such annular groove(s) at such position(s) that when each O-ring is engaged with such annular groove(s) of each pin, the pin is positioned at the first position (reset position) or a later described second position (display position).

Each of the three O-rings is made of nitro-butadiene rubber having a diameter of about 1.5 mm. It is so designed that an amount of elastic compression of each O-ring caused by the pin pressing is about 0.4 mm.

The finger pressing force of an ordinary user (visually handicapped person) to touch the pins 601 is as low as about 0.1 N (Newton). Thus, the force for holding the pins in the structure of FIGS. 1 and 2 is designed to be about 0.4 N. Thereby, the pins can stay without being lowered when the user touches the pins.

The tactile pin holding mechanism or apparatus can be simplified by setting the pin holding force to be uniform, irrespectively of the position of the display unit (braille display unit) at which the user touches or not.

FIGS. 10 and 11 schematically illustrate a concept of actuators for raising the pins 601 to a height of about 0.7 mm from the tactile surface of the rotational member 410. Three actuators are arranged in correspondence with the number of pins in each column of each cell (braille cell) for one character (braille character). The respective actuators are placed on a housing or a base (not shown) to be distanced from each other at the periphery of the rotational member 410. Furthermore, the respective actuators are driven at different timings. Since the actuators are placed to be distanced from each other, the outer dimensions of the actuators can be designed pretty freely. Moreover, the peak value of actuator driving current can be lowered by the different driving timings of the actuators, i.e. by sequentially shifting the operation times of the actuators.

Each actuator comprises: a disc-type cam 421 (421A to 421C) to contact with the pins 601; a pulse motor 1 (1A to 1C) for rotating the disc-type cam 421; and a train of gears G1 and G2 for engaging the disc-type cam 421 with the pulse motor. When the rotational member 410 rotates clockwise in the direction as shown by the arrow in FIG. 10, the pins 601 of the first, the third and the second rows of the cells (braille cells) are sequentially brought to be associated with the disc-type cams 421A, 421B and 421C, respectively, in a manner that the two pins in each of the first, the third and the second rows of each cell are either raised from or allowed to stay at the tactile surface level, whereby the total six pins 601 of each cell are selectively raised to a height of about 0.7 mm from the tactile surface of the rotational member 410 against elastic contact forces (frictional forces) with the O-rings 370A, 370B and 370C, respectively, and are held there. That is to say, the pulse motors 1A, 1B and 1C selectively raise the pins of the first row, the third row and the second row of the cell, respectively. It is optional to provide a stopper (not shown) at a top end of each pin 601 for restricting the pin 601 from being raised by each disc-type cam to a height greater than a desired one.

In the present EMBODIMENT, three rollers 430 rotatable independently from each other are provided for lowering the pins 601 to the tactile surface. When the rotational member 410 rotates clockwise, the peripheral speed of pins at each row is different from that at another row. This is why it is preferable that the three rollers 430 are provided to be rotatable independently from each other in correspondence with the different peripheral speeds of the pins at the respective rows. Reference numeral 440 designates rollers for making uniform the heights of the pins raised from the tactile surface. It is preferable that these rollers 440 are also provided to be rotatable independently from each other in correspondence with the different peripheral speeds of the pins at the respective rows.

The rotational member 410 can be rotated by an optional arrangement, e.g., using a gear train and a pulse motor. More specifically, although not shown, it can be arranged that a gear is provided on a boss portion at the lower surface of the rotational member 410 supported rotatably by a shaft 470, and is engaged with a pinion, a pulse motor and so on.

An example of a control circuit for controlling a motor (rotational member driving motor), an actuator (such as a pulse motor) and so on in the tactile pin (braille) display apparatus 400 is shown by the block diagram of FIG. 12. Briefly describing the block diagram, a control circuit 120 comprises a parallel input/output unit (PIO) 121, a control processing unit (CPU) 122, an analog/digital converter (A/D) 123, a memory 124 and a serial input/output interface (SIO) 125. The PIO 121, coupled to the CPU 122, receives a signal output from a 6 dot pin display keyboard 126, a display control switch 127 and a photocoupler 128, and provides its output signal to a pin driving actuator 129 under the control of the CPU 122. The A/D converter 123 receives signals from a display speed control switch 130, and provides its output signal to the CPU. The SIO 125 is coupled to both the CPU 122 and a universal serial bus (USB) 131. The CPU 122 is coupled to the memory 124 and an external memory 134. The CPU 122 provides its output signal to a motor controller 132 in response to signals from the PIO 121, the A/D converter 123, the SIO 125, the memory 124 and/or the external memory 134. The motor controller 132 provides its output signal to and controls a motor 133.

The rotation of the pulse motor of the actuator is driven at timings based on phase detection conducted by a photo-interrupter (not shown, such as a rotating disc with punch holes). The photo-interrupter has punch holes, the number of which is equivalent to the total number of columns of the pins provided on the rotational member 410. For example, in the case where pins for 48 characters (48 cells) are provided on the rotational member, the number of the punch holes is 96. The timings for driving the actuator can also be made by using the pulse motor for driving the rotational member 410. Furthermore, the phase detection can also be conducted by two photocouplers for detecting actuation start position and tactile pin position, respectively.

The rotational member 410, which is a component of the tactile pin display apparatus 400, can be made of a polystyrene (PS) resin, with a lower disc 410B and an upper disc 410A each having been molded in the disc shape and integrally combined with each other. The upside surface of the upper disc 410A functions as a tactile surface (reading surface) as indicated by symbol TS in FIG. 2. Further, as shown, e.g., in FIG. 2, the O-rings 370A, 370B and 370C are placed in the recessed annular grooves provided at the lower. disc 410B. The pins 601 are supported to be slidable. across the upper and the lower discs 410A and 410B. For smoothing and stabilizing the sliding of each pin 601, a fluoride-based solid lubricant is preferably coated on a pin sliding portion such as surface of the pin 601.

In the tactile pin display apparatus 400, it is assumed that 48 cells (characters) are annularly arranged on the tactile surface of the rotational member 410. Since one cell consists of 6 pins (3 rows and 2 columns), the total number of pins is 288.

Assuming that the reading speed (tactile acuity) is 200 characters per minute, the rotational member 410 is to have a rotational speed of about 4 rpm (revolutions per minute). When a user puts a finger on the tactile surface of the rotational member 410 that rotates clockwise, the user feels as if the finger traces a braille paper from left to right. Moreover, the tactile pin display apparatus according to the present EMBODIMENT can continuously and sequentially display characters, and makes it unnecessary to move the finger to each new line, which is needed in the case of a braille paper or in the case of a conventional tactile pin (braille) display apparatus which displays and refreshes one line (braille line) at a time. Accordingly, this apparatus is very convenient for users (the visually handicapped).

In the tactile pin display apparatus 400 as shown in FIG. 9, a roughly semi-circular part of the rotational member 410 having the pins 601 are exposed from a housing 800. An indicator portion 840 formed by a recess or convex is provided in the vicinity of the exposed part of the rotational member 410. Owing to the indicator portion 840, the user (visually handicapped) can easily recognize the tactile starting position at which to put a finger. Reference numeral 841 designates a guide rail to guide the finger. The guide rail is an arch-shaped protrusion having a height of about 0.3 mm, and a width of about 2 mm. Owing to this protrusion, it can be recognized that the finger is on or nearby the rotational member.

Although not shown, the tactile pin display apparatus 400 according to the present EMBODIMENT comprises a detecting circuit for detecting an abnormal load and for automatically and instantaneously stopping the motor for driving the rotational member in the case where a load exceeding a predetermined value is applied to the motor due to troubles such that a foreign article is stuck between the rotational member and the opening of the housing.

Reference numeral 811 designates a forward rotation switch (continuous read switch) for rotating the rotational member 410 clockwise to sequentially and continuously display characters (braille characters). Reference numeral 812 designates a rotation stop switch for stopping the continuous reading. Reference numeral 813 designates a reverse rotation switch (reread switch) for rotating the rotational member 410 counterclockwise, i.e. in a reverse direction, for rereading characters having been read once. Reference numerals 814 to 819 are character (braille) input switches according to Perkins-style, by which a user (visually handicapped) inputs characters (braille characters). These character (braille) input switches 814 to 819 correspond to braille numbers 3, 2, 1, 4, 5 and 6, respectively. Reference numeral 820 designates input character (input braille) determination switch (enter switch) for determining the character input (braille input) when the user determines that the input characters are correct. Reference numeral 830 designates an insertion slot for inserting, into the apparatus, a memory card having e.g. various text data stored therein.

As evident from the foregoing, the tactile pin display apparatus 400 according to the present EMBODIMENT can allow the tactile pin holding mechanism or apparatus and the tactile pin lowering mechanism to be very simple, and hence can be reduced in size and cost. One example of the tactile pin display apparatus 400, which the present inventors have actually manufactured, has a width of 210 mm, a depth of 130 mm and a maximum height of 30 mm as outer dimensions, and a weight of about 450 g.

Figure 3:
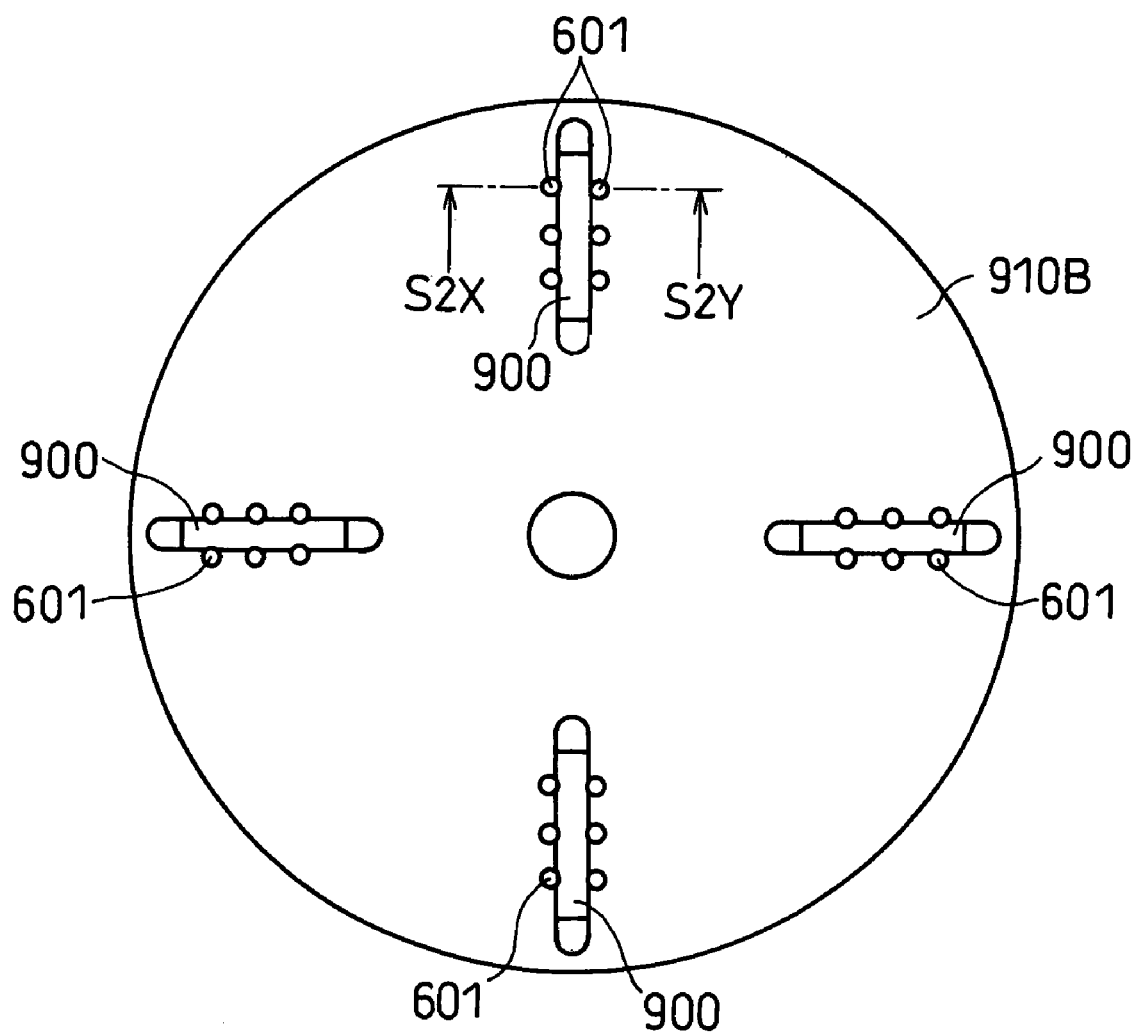
FIG. 3 is a schematic plan view, showing a part of a further rotational member as a component for a tactile pin display apparatus according to an embodiment of the present invention, with an upper disc having been removed.
Figure 4:
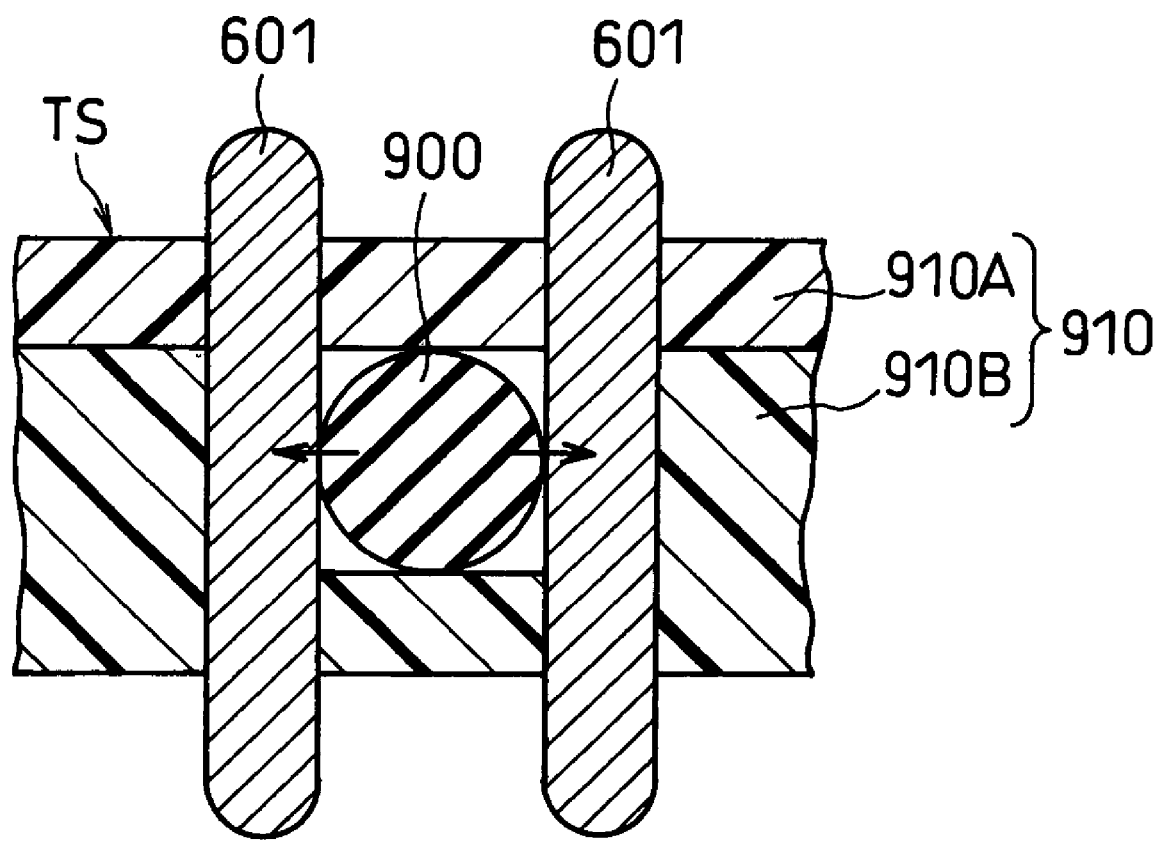
FIG. 4 is a schematic cross-sectional view, cut by S2X-S2Y plane shown in FIG. 3, of the rotational member of FIG. 3 with an upper disc provided thereon.

Hereinafter, a further tactile pin holding mechanism or apparatus according to the present EMBODIMENT will be described. FIG. 3 shows a part of a further rotational member as a component for a tactile pin display apparatus according to the present EMBODIMENT, and is a schematic plan view of its main part, with an upper disc having been removed. FIG. 4 is a schematic cross-sectional view, cut by S2X-S2Y plane shown in FIG. 3, of the rotational member of FIG. 3 with an upper disc provided thereon. Referring to these drawings, a rotational member 910 has an upper disc 910A and a lower disc 910B integrally combined with each other. The upside surface of the upper disc 910A functions as a tactile surface (reading surface) as indicated by symbol TS in FIG. 4. An elastic member 900 is placed in a recessed groove provided at the lower disc 910B.

In the case of this tactile pin holding mechanism or apparatus as well as the tactile pin holding mechanism or apparatus as described above, each pin 601 is pressed at a side thereof by the elastic member 900 (e.g. made of a rod-shaped rubber having a circular cross-section) as shown by the arrows in FIG. 4, and thereby can be held at a desired position in the direction of the up-and-down movement of each pin 601. More specifically, the pins 601 and the elastic members 900 are arranged such that the rotational member 910 supports, with the aid of the elastic members, the pins to be movable up-and-down, and that the length direction of each elastic member 900 is in perpendicular to the length direction of each pin 601. The rod-shaped rubber for the elastic member is preferred to be nitrile-butadiene rubber having an outer diameter of 1.5 mm and a rubber hardness of 70 IRHD (International Rubber Hardness Degree). Further, it is preferable that the amount of elastic compression of the rod-shaped rubber by the pin pressing is about 0.4 mm, and that the pin holding force is about 0.4 N.

Although not shown here, it is also possible that each pin is provided with an annular groove (grooves) in a manner similar to those as later shown in FIG. 19 (annular groove 1002) and FIG. 24 (annular grooves 2 and 3) for the purpose of allowing each elastic member 900 to engage with such annular groove(s) for increasing the holding force of the pin by the elastic member 900. In providing such annular groove(s), it is preferable to provide such annular groove(s) at such position(s) that when each elastic member 900 is engaged with such annular groove(s) of each pin, the pin is positioned at the first position (reset position) or a later described second position (display position).

Figure 5:
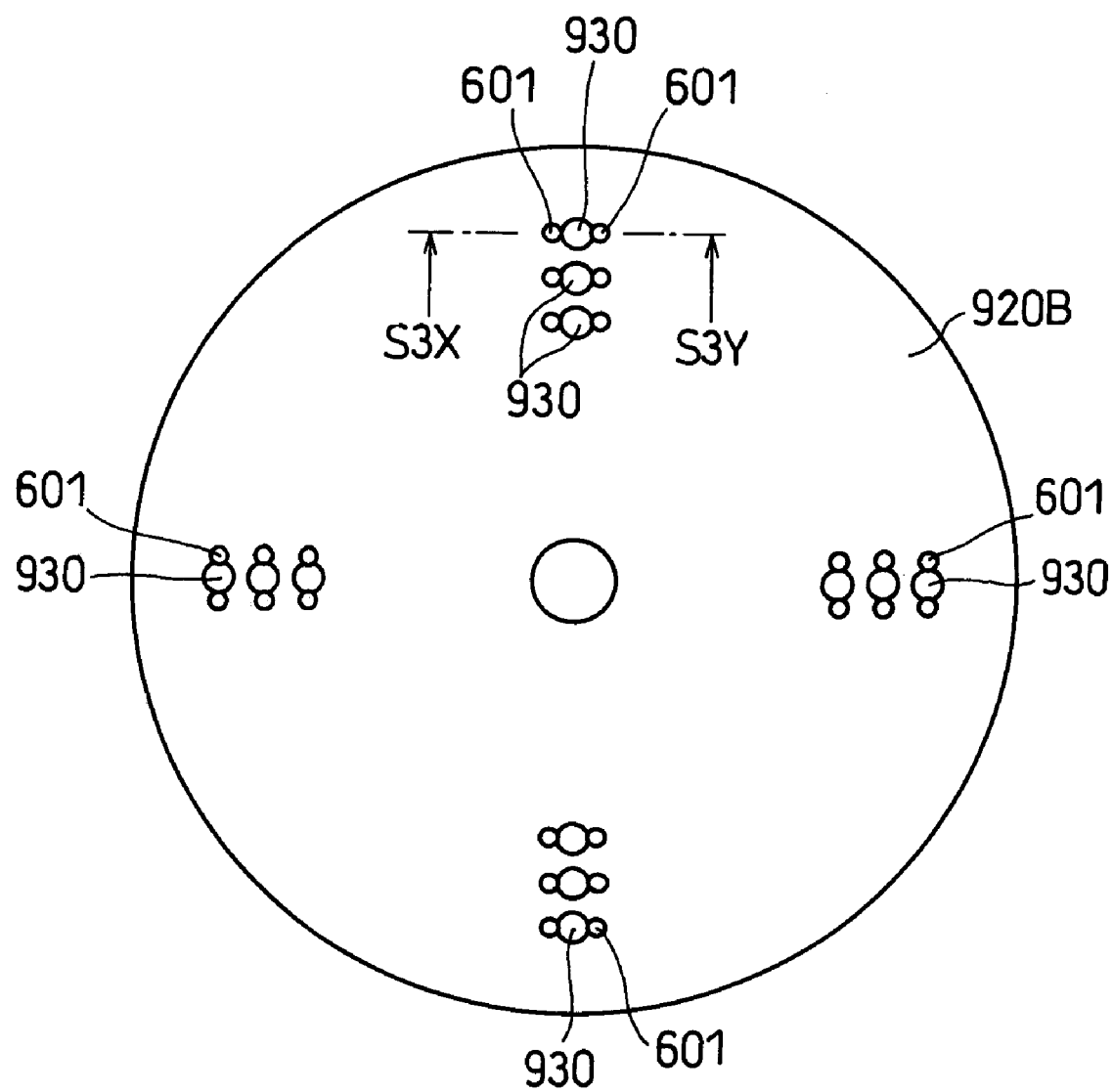
FIG. 5 is a schematic plan view, showing a part of a still further rotational member as a component for a tactile pin display apparatus according to an embodiment of the present invention, with an upper disc having been removed.
Figure 6:
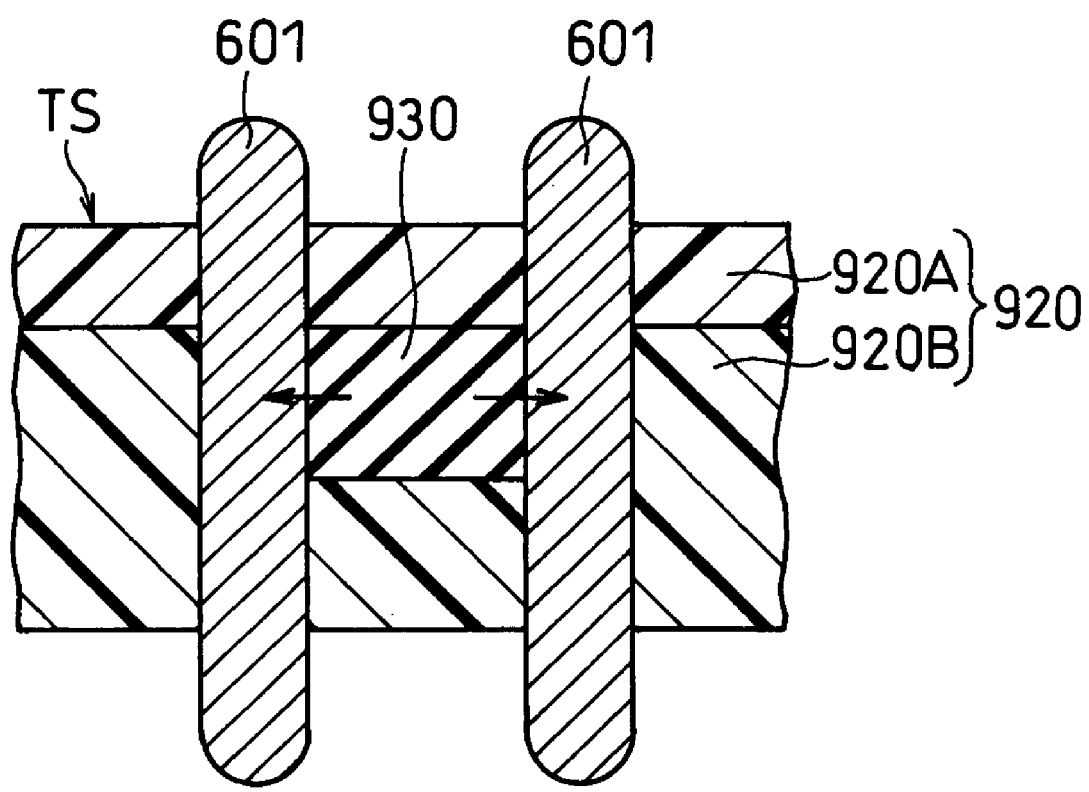
FIG. 6 is a schematic cross-sectional view, cut by S3X-S3Y plane shown in FIG. 5, of the rotational member of FIG. 5 with an upper disc provided thereon.

A still further tactile pin holding mechanism or apparatus according to the present EMBODIMENT will be described below with reference to FIGS. 5 and 6. FIG. 5 schematically shows a part of a still further rotational member as a component for a tactile pin display apparatus according to the present EMBODIMENT, and is a plan view of its main part, with an upper disc having been removed. FIG. 6 is a schematic cross-sectional view, cut by S3X-S3Y plane shown in FIG. 5, of the rotational member of FIG. 5 with an upper disc provided thereon. Referring to these drawings, a rotational member 920 has an upper disc 920A and a lower disc 920B integrally combined with each other. The upside surface of the upper disc 920A functions as a tactile surface (reading surface) as indicated by symbol TS in FIG. 6. Elastic members 930 are placed in recessed portions provided at the lower disc 920B.

In the case of this tactile pin holding mechanism or apparatus as well as the tactile pin holding mechanism or apparatus as described above, each pin 601 is pressed at a side thereof by the elastic member 930 (e.g. made of a rod-shaped rubber) as shown by the arrows in FIG. 6, and thereby can be held at a desired position in the direction of the up-and-down movement of each pin 601. More specifically, one rod-shaped elastic member 930 is placed between two pins 601 at each row of each cell (3 rod-shaped elastic members in total for each cell) for elastically pressing and holding the two pins at an optional position in the direction of the up-and-down movement of each pin. The cross-sectional shape and the material of each rod-shaped elastic member is assumed to be the same as those of each rod-shaped elastic member as used in FIG. 3.

The length direction of each rod-shaped elastic member, here, is parallel with the length direction of each pin. Accordingly, the pin holding force of each rod-shaped elastic member can be easily adjusted by adjusting the length of each rod-shaped elastic member.

It is also possible, however, that the length direction of each rod-shaped elastic member is perpendicular to that of each pin as in the above-described case, and that each rod-shaped elastic member is placed between each pair of two adjacent pins at each column of each cell (4 rod-shaped elastic members in total for each cell) by providing recessed portions for the rod-shaped elastic members in correspondence therewith.

Although not shown here, it is also possible that each pin is provided with an annular groove (grooves) in a manner similar to those as later shown in FIG. 19 (annular groove 1002) and FIG. 24 (annular grooves 2 and 3) for the purpose of allowing each elastic member 930 to engage with such annular groove(s) for increasing the holding force of the pin by the elastic member 930. In providing such annular groove(s), it is preferable to provide such annular groove(s) at such position(s) that when each elastic member 930 is engaged with such annular groove(s) of each pin, the pin is positioned at the first position (reset position) or a later described second position (display position).

Figure 7:
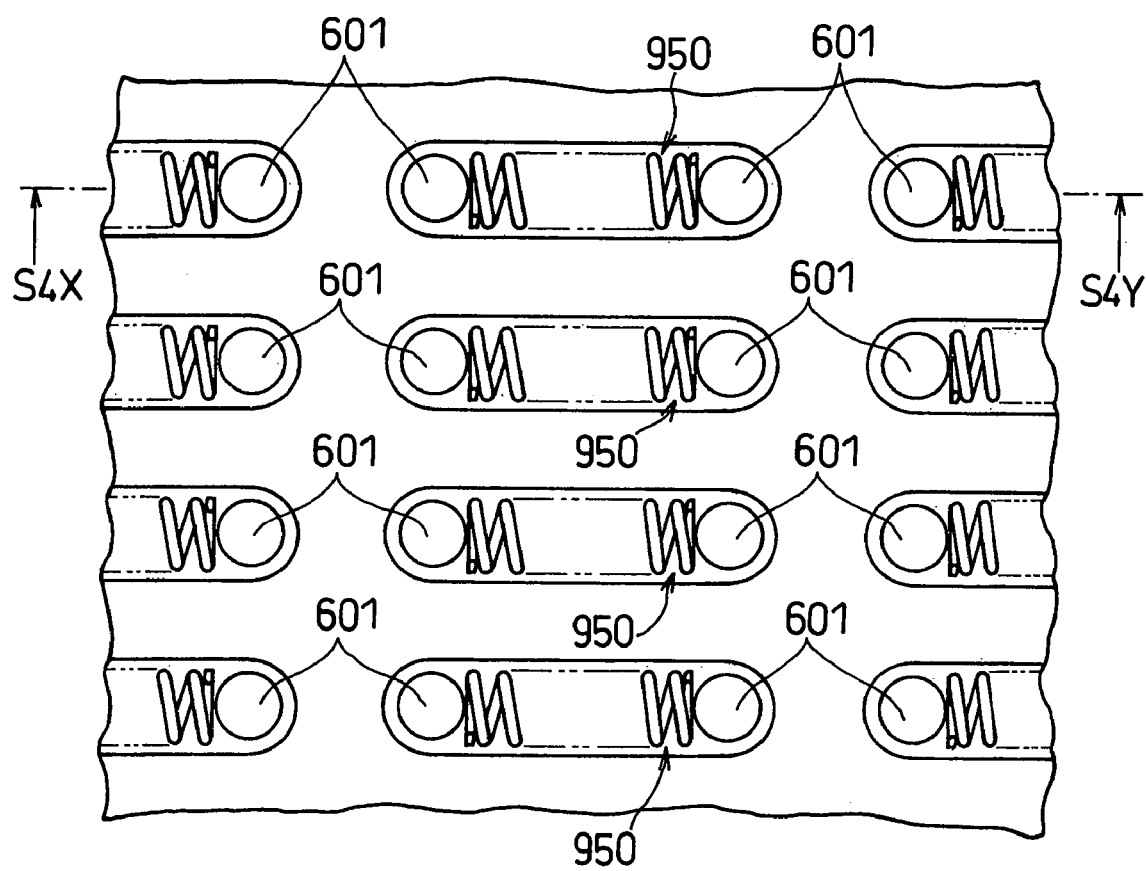
FIG. 7 is a schematic plan view, showing a part of a flat plate member as a component for a tactile pin display apparatus according to an embodiment of the present invention, with an upper flat plate having been removed.
Figure 8:
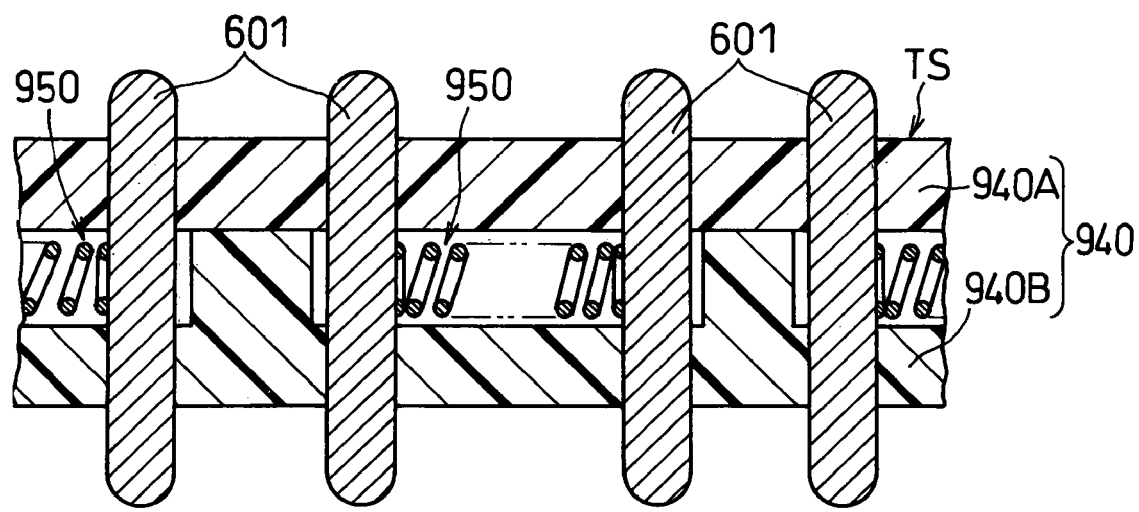
FIG. 8 is a schematic cross-sectional view, cut by S4X-S4Y plane shown in FIG. 7, of the flat plate member of FIG. 7 with an upper flat plate provided thereon.

A yet further tactile pin holding mechanism or apparatus according to the present EMBODIMENT will be described below with reference to FIGS. 7 and 8, schematically showing an example for a two-dimensional or three-dimensional tactile display apparatus with a flat plate member having pins of each cell arranged in a multi-row multi-column matrix. In FIGS. 7 and 8 specifically, two cells are shown, each cell consisting of 8 pins in a 4 row-2 column matrix. This mechanism is suitable, e.g., for a later described display apparatus using a belt conveyor, a chain conveyor or a pallet conveyor.

According to the present specification, the term "two-dimensional display" and the term "three dimensional display" are described already above. More specifically describing here, the term "two-dimensional display" is used to mean that each pin at the display status can have either one raised height or no height from the tactile surface (namely either value 1 or value 0 in terms of binary code). On the other hand, the term "three-dimensional display" is used to mean that each pin at the display status can have any arbitrary height from the tactile surface (namely any value between 1 and 0).

FIG. 7 shows a part of the flat plate member as a component for a tactile pin display apparatus according to the present EMBODIMENT, and is a plan view of its main part, with an upper flat plate having been removed. FIG. 8 is a schematic cross-sectional view, cut by S4X-S4Y plane shown in FIG. 7, of the flat plate member of FIG. 7 with an upper flat plate provided thereon. Referring to these drawings, a flat plate member 920 has an upper flat plate 940A and a lower flat plate 940B integrally combined with each other. The upside surface of the upper flat plate 940A functions as a tactile surface (reading surface) as indicated by symbol TS in FIG. 8. Compression coil springs 950, as elastic members, are placed in recessed portions provided at the lower flat plate 940B.

In the case of this tactile pin holding mechanism or apparatus as well as the tactile pin holding mechanisms or apparatuses as described above, each pin 601 is pressed at a side thereof by the compression coil spring 950, and thereby can be held at a desired position in the direction of the up-and-down movement of each pin 601. More specifically, the pins are supported, with the aid of the compression coil springs, by the flat plate member 940 to be movable up-and-down.

In each pair of two cells, that are the left cell consisting of the 8 pins and the right cell consisting also of the 8 pins in the case of FIG. 7, each compression coil spring is arranged between a pin at the second column of each row in the first cell (that is the left cell in FIG. 7) and a pin at the first column of each row in the second cell (that is the right cell in FIG. 7). As shown therein, the length direction of each pin is in perpendicular to the length direction of (the center axis of) each compression coil spring. According to this tactile pin holding mechanism or apparatus, two pins can be held by one compression coil spring.

Each compression coil spring has, for example, an effective coil diameter of 1.0 mm, a wire diameter of 0.2 mm, a compression amount of 4 mm, and an effective coil turn number of 8. The pin holding force is, for example, 0.3 N.

Although not shown here, it is also possible that each pin is provided with an annular groove (grooves) in a manner similar to those as later shown in FIG. 19 (annular groove 1002) and FIG. 24 (annular grooves 2 and 3) for the purpose of allowing each compression coil spring 950 to engage with such annular groove(s) for increasing the holding force of the pin by the compression coil spring 950. In providing such annular groove(s), it is preferable to provide such annular groove(s) at such position(s) that when each compression coil spring 950 is engaged with such annular groove(s) of each pin, the pin is positioned at the first position (reset position) or a later described second position (display position).

Other examples of tactile pin holding mechanisms or apparatuses, each being as a component of a tactile pin display apparatus according to the present EMBODIMENT, will be described in the following with reference to FIG. 13 to FIG. 17.

Figure 13:
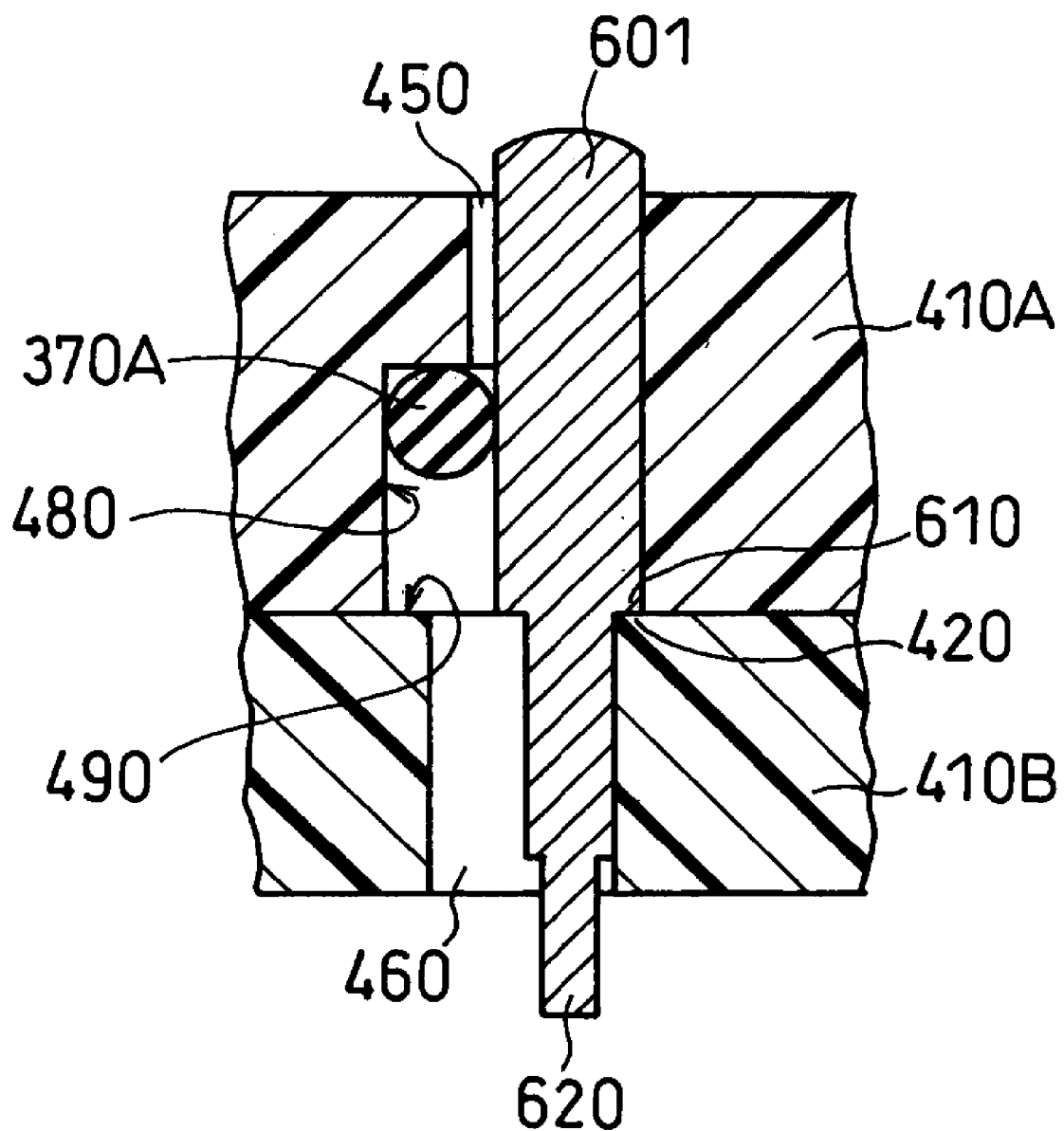
FIG. 13 is a schematic cross-sectional view of a part of a tactile pin holding apparatus according to an embodiment of the present invention, where a pin is engaged with a lower disc.
Figure 14:
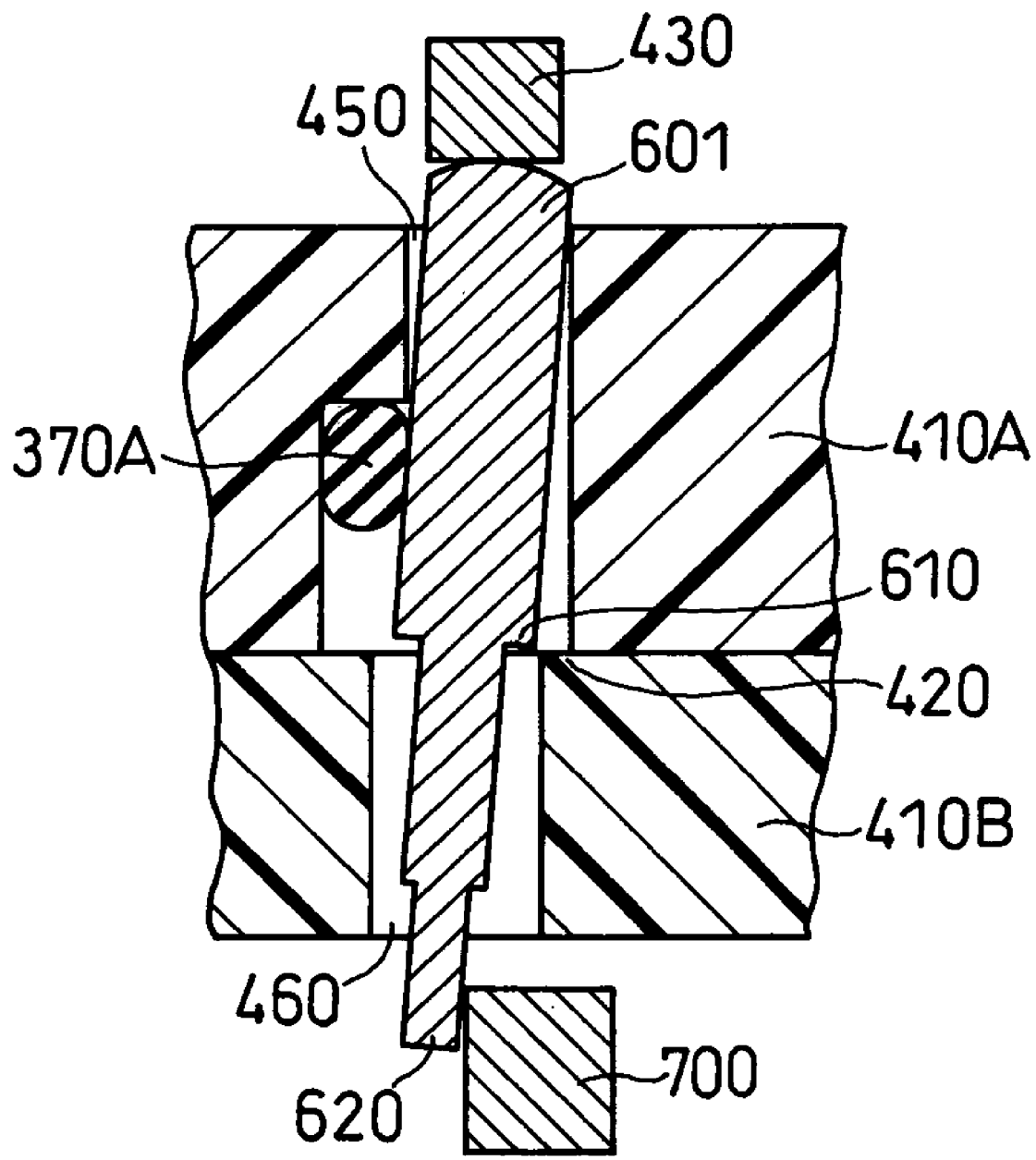
FIG. 14 is a schematic cross-sectional view of the same apparatus as of FIG. 13, showing a process of releasing the engagement of the pin with the lower disc as shown in FIG. 13.
Figure 15:
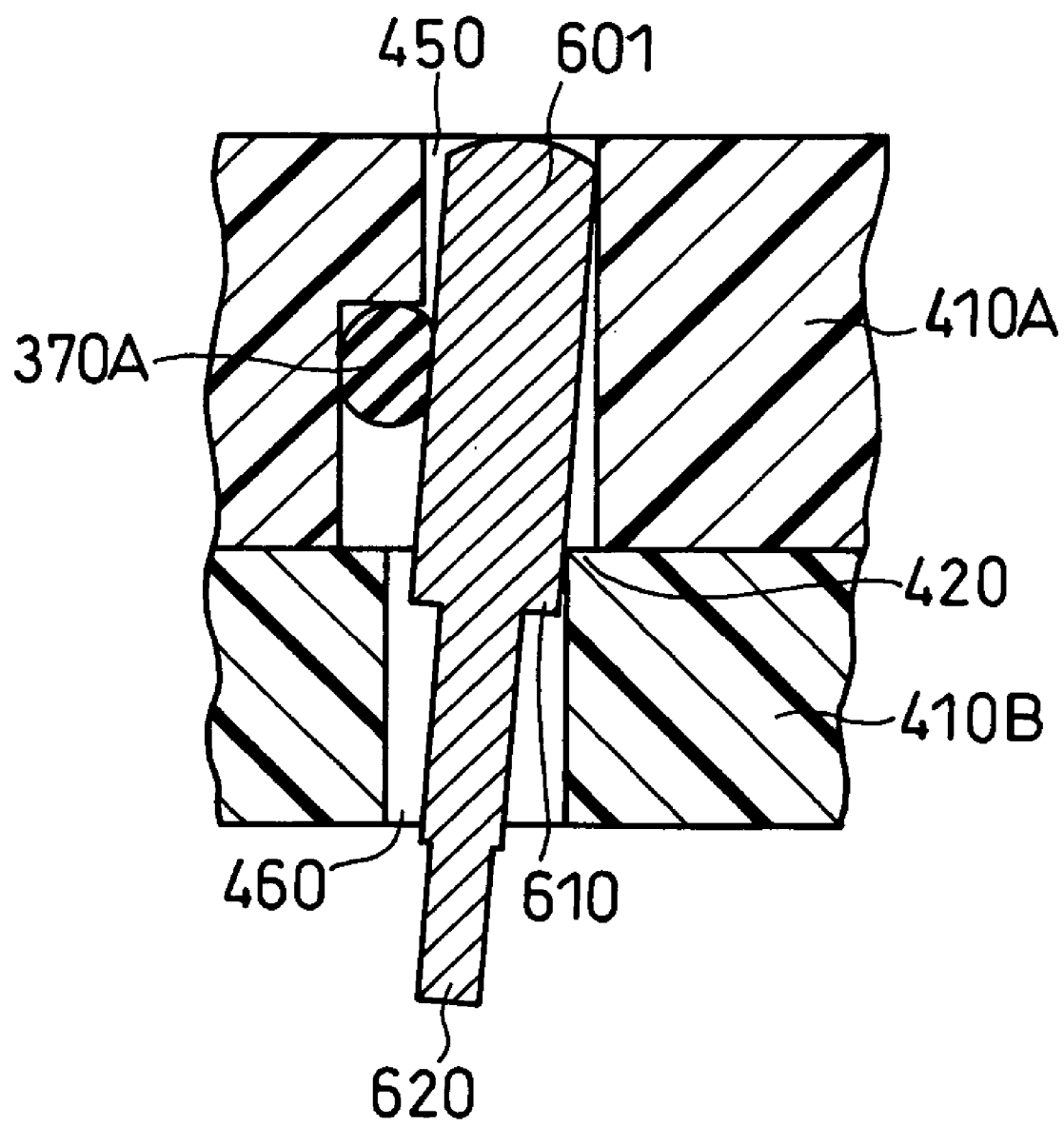
FIG. 15 is a schematic cross-sectional view of the same apparatus, showing a status where the engagement of the pin with the lower disc has been released.

FIG. 13 to FIG. 15 schematically show an example of a tactile pin holding mechanism or apparatus according to the present EMBODIMENT. FIG. 13 is a schematic cross-sectional view of a main part of the mechanism, where the pin is engaged with a lower disc. FIG. 14 is a schematic cross-sectional view of the same mechanism, showing a process of releasing the engagement of the pin with the lower disc as shown in FIG. 13. FIG. 15 is a schematic cross-sectional view of the same mechanism, showing a status where the engagement of the pin with the lower disc has been released.

Referring to FIG. 13, a pin 601 is pressed at a side thereof by an O-ring 370A annularly provided at a recessed portion of an upper disc 410A, and is held there by the engagement of a step portion 610 of the pin 601 with an engagement portion (step) 420 of a lower disc 410B. Accordingly, the pin is not lowered to retract into the tactile surface even if the user (visually handicapped) touches the pin with an excessive force.

When the disc rotates clockwise, a lower end 620 of the pin 601 is brought to contact with an engagement release cam (engagement release member) 700, as shown in FIG. 14, which has a gradual slope surface similar to that as shown in later described FIGS. 18A and 20A, and which is placed upstream of a roller 430 described below. The pin 601 then starts inclining against the pressing force of the O-ring 370A, whereby the engagement of the step portion 610 with the engagement portion 420 is ultimately released. When the pin 601 is then pressed downwards by a roller 430 (pin height reset member), the pin 601 is lowered to retract into the tactile surface (the top position of the pin 601 is lowered to substantially the level of the tactile surface) as shown in FIG. 15.

Basically, one engagement release cam (engagement release members) is needed for one row of pins. So the pin holding mechanism basically has engagement release members in the number of rows of the pins arranged in multi-row multi-column.

The engagement portion 420 can be easily formed merely by slightly differentiating the position of a through-hole 450 provided in the upper disc 410A from that of a through-hole 460 provided in the lower disc 410B in the radial direction of the disc (rotational member) as shown in e.g. FIG. 13. Further, the side pressure applied to the pin 601 by the O-ring 370A can be reduced by shifting the position of a wall surface 480 of the recessed portion toward the center of the upper disc 410A, with the O-ring 370A being kept contacting the pin 601.

Furthermore, for fixing the vertical position of the O-ring 370A, a portion 490 of the lower disc 410B at a periphery of the through-hole 460, which portion is opposite to the engagement portion 420 across the through-hole 460, can be raised from the level of the upper surface of the lower disc 410B to contact with the O-ring 370A, although the raised status is not shown in the drawings.

The above-described tactile pin holding mechanism or apparatus makes it possible to securely hold the pin at a predetermined vertical position raised from the tactile surface, and to withstand against excessive touching pressure by users.

Figure 16:
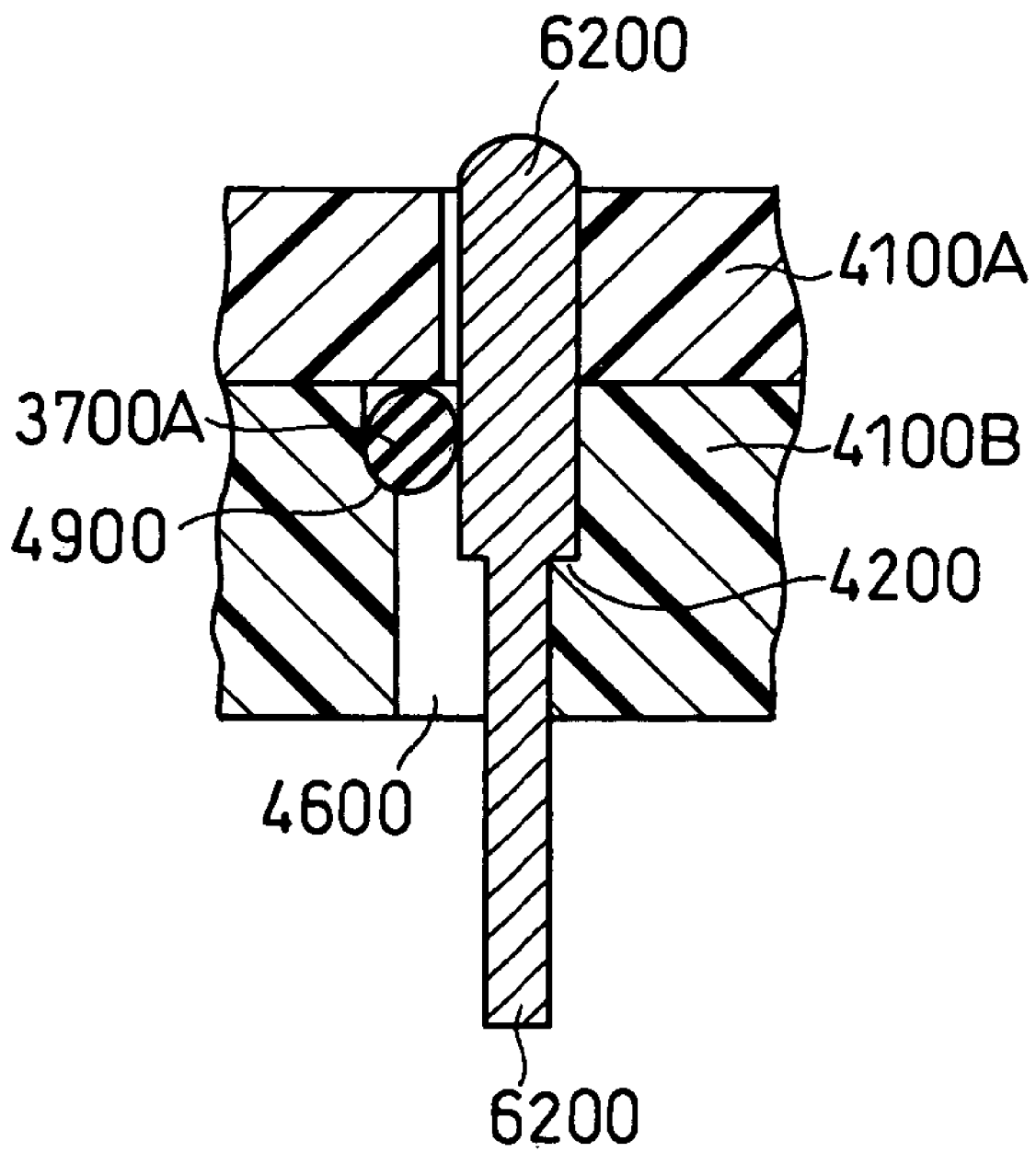
FIG. 16 is a schematic cross-sectional view, showing a part of another tactile pin holding apparatus according to an embodiment of the present invention.
Figure 17:
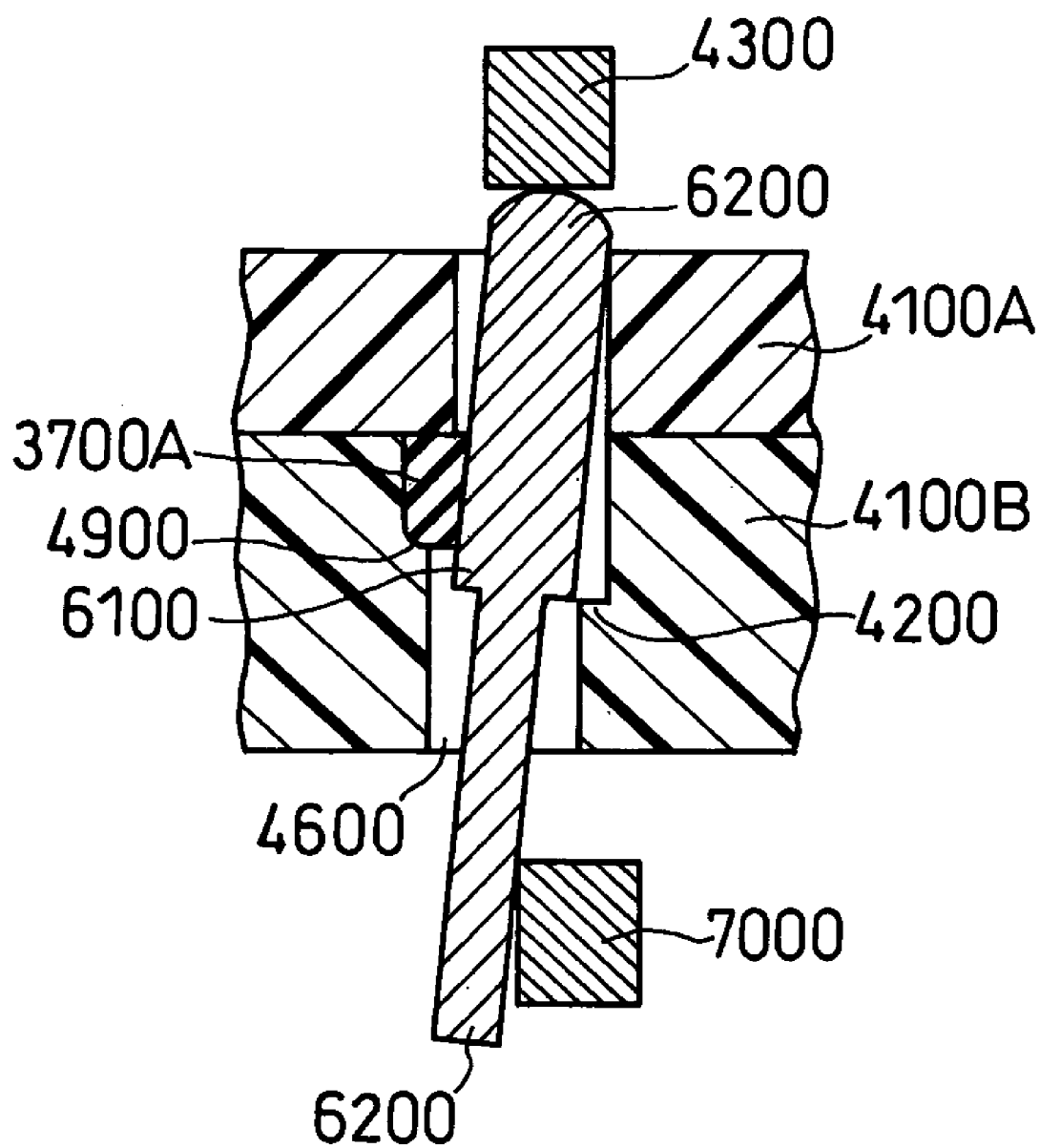
FIG. 17 is a schematic cross-sectional view of the same apparatus as of FIG. 16, showing a process of releasing the engagement of the pin with the lower disc as shown in FIG. 16.

FIGS. 16 and 17 schematically show another tactile pin holding mechanism or apparatus for holding a pin 6200 having a step portion as well, namely a stepped pin, wherein an O-ring is placed at a lower disc of the rotational member. A fundamental concept as shown in these drawings is the same as that as shown in FIGS. 13 to 15. In this case, however, a pin engagement portion 4200 is provided at a mid-position (mid-depth) of a lower disc 4100B, not at an interface between the lower disc 4100B and an upper disc 4100A. Accordingly, the pin engagement portion is constant even if there may be a positional discrepancy between the upper disc 4100A and the lower disc 4100B in contrast to the case of FIGS. 13 to 15. Although not shown, it is also possible for the stepped pin 6200 to have an increased diameter at a position thereof slightly lower than the lower surface of the lower disc 4100B (for example, a further step portion of the stepped pin to engage with the lower surface of the lower disc). Thereby, the stepped pin 6200 can be prevented from being raised to a height higher than a desired height from the tactile surface of the upper disc 4100A owing to contact between the increased diameter portion (the further step portion) of the pin and the lower surface of the lower disc.

The other elements in FIGS. 16 and 17 designated by reference numerals 4300, 3700A, 6100, 4600, 7000 and 4900 are like elements corresponding to the elements in FIGS. 13 to 15 designated by reference numerals 430, 370A, 610, 460, 700 and 490, respectively.

It is to be noted that combinations of the rotational members with the tactile pin holding mechanisms or apparatuses and other elements as shown in FIGS. 1 to 17 above in the present EMBODIMENT 1 evidently illustrate examples of the tactile pin holding apparatuses according to the before-described first or the second aspect of the present invention.

Embodiment 2

FIG. 18A schematically shows a tactile pin display apparatus (braille display apparatus) according to the present EMBODIMENT. A tactile pin display apparatus 300 comprises eight elements. A first element comprises a rotational member 310 of disc-type having a plurality of punch holes provided at radial positions therein that are distanced from one another and appear at a main plane surface thereof (tactile surface TS). A second element comprises a gear 340 to engage with a circumferential portion of the rotational member 310. A third element comprises rotation driving means (not shown) for rotating the rotational member 310, the rotation driving means comprising a gear, a motor and so on. A fourth element comprises pins 301 each provided, in each of the holes, to be raised and lowered between a first position (pin reset position) and a second position (pin display position) in the direction of the length of each hole or each pin.

A fifth element comprises O-rings 370 respectively fit on and around the pins 301 for holding each pin at an optional position such as the first position or the second position. A sixth element comprises a cam 330 for making uniform the height of each of the pins 301 at the first position when the rotational member 310 rotates to bring the pins 301 to the position of the cam 330, such that pins having been raised to the second position from the tactile surface TS are lowered by the cam to the first position (or reset position or reset height) at the level of the tactile surface TS, while other pins having been positioned at the first position stay at the first position. Thus, the cam 330 can be referred to as pin height reset member (pin position reset member). A seventh element comprises three electromagnetic solenoids 320 which are positioned downstream of the cam 330 in the rotational direction of the rotational member 310, and which raise the pins 301 to the second position, when the rotational member 310 is rotated to bring the pins 301 to the position of the solenoids 320, and when the solenoids are actuated. An eighth element comprises a selectively actuating means for selectively actuating the solenoids in order to selectively raise the pins 301 to the second position, which is an operative position of each pin, the first position being an inoperative position of each pin.

When the rotational member 310 is rotated by the rotation driving means, the pins 301 are brought to contact with the cam 330, whereby the pins are lowered by the cam 330 to or stay at the first position. When the rotational member 310 is further rotated by the rotation driving means to the position of the solenoids 320, the pins 301 are selectively raised by the solenoids to the second position.

When the rotational member 310 is rotated by the rotation driving means, the pins 301 are brought to contact with the cam 330, whereby the pins are lowered by the cam 330 to or stay at the first position (reset position or reset height). When the rotational member 310 is further rotated by the rotation driving means to the position of the solenoids 320, the pins 301 are selectively raised by the solenoids to the second position.

The rotational member 310 is made by integrally assembling the upper disc 310A and the lower disc 310B, each of which is made by molding an ABS (acrylonitrile-butadiene-styrene) resin, and which have O-rings 370 arranged therebetween. The O-ring 370 are respectively fit and retained in holes of a retainer 360. This retainer 360 is used for facilitating the assembling. Even if the retainer 360 is omitted, the holding force of each pin 301 by the O-ring 370 is not influenced thereby. Alternatively, each O-ring 370 can be placed in a recessed groove provided at either the upper disc 310A or the lower disc 310B.

As schematically shown in FIG. 18A, the rotational member 310 is rotatably supported by a stepped shaft 311, an upper part 311B of which has a smaller diameter and positioned in a central cylindrical hole of the rotational member 310. A retaining ring 260 (resilient ring) having a substantially C-shaped outer shape is mounted on the shaft 311B at the upper surface of the rotational member 310 for preventing the rotational member 310 from falling off the upper part 311B of the shaft.

Each pin 301 is supported to be movable up-and-down across the upper disc 310A and the lower disc 310B. By the O-ring 370 fit on and around each pin 301, the pin 301 can be held at an optional position in the up-and-down direction. The pin holding force with the O-ring 370 is designed to be 0.4 N.

The pins 301 are basically designed to be the same as each other with respect e.g. to the material and the shape such as diameter and length, similarly as in EMBODIMENT 1. In the case where each pin 301 is designed to have a diameter of 1.2 mm and a length of about 8 mm in FIG. 18A, the O-ring 370 made of nitrile-butadiene rubber is designed to have a wire diameter of about 0.6 mm nitrile-butadiene rubber and an inner diameter of about 0.8 mm.

The diameter of the hole of the retainer 360 can be constant as shown by the cross-sectional view of FIG. 18A. However, it is also possible for the wall surface of the hole of the retainer 360 to have a taper such that the diameter of the hole at the upper surface of the retainer 360 is a little larger than that at the lower surface of the retainer. Thereby, it becomes possible to allow a pin holding force against a pin lowering force (finger pressing force of the user for pressing each pin 301 in reading pin display or braille) to be greater than a pin holding force against a pin raising force (for raising each pin 301 in generating pin display). Furthermore, by such taper structure of the hole of the retainer 360, it becomes easier to assemble the rotational member, and to reduce the size (power) of each electromagnetic solenoid.

Besides, it is optional to coat a solid lubricant on e.g. each pin 301 for smoothing and stabilizing the up-and-down movement (sliding) of the pin in each punch hole of the rotational member.

Figure 18:
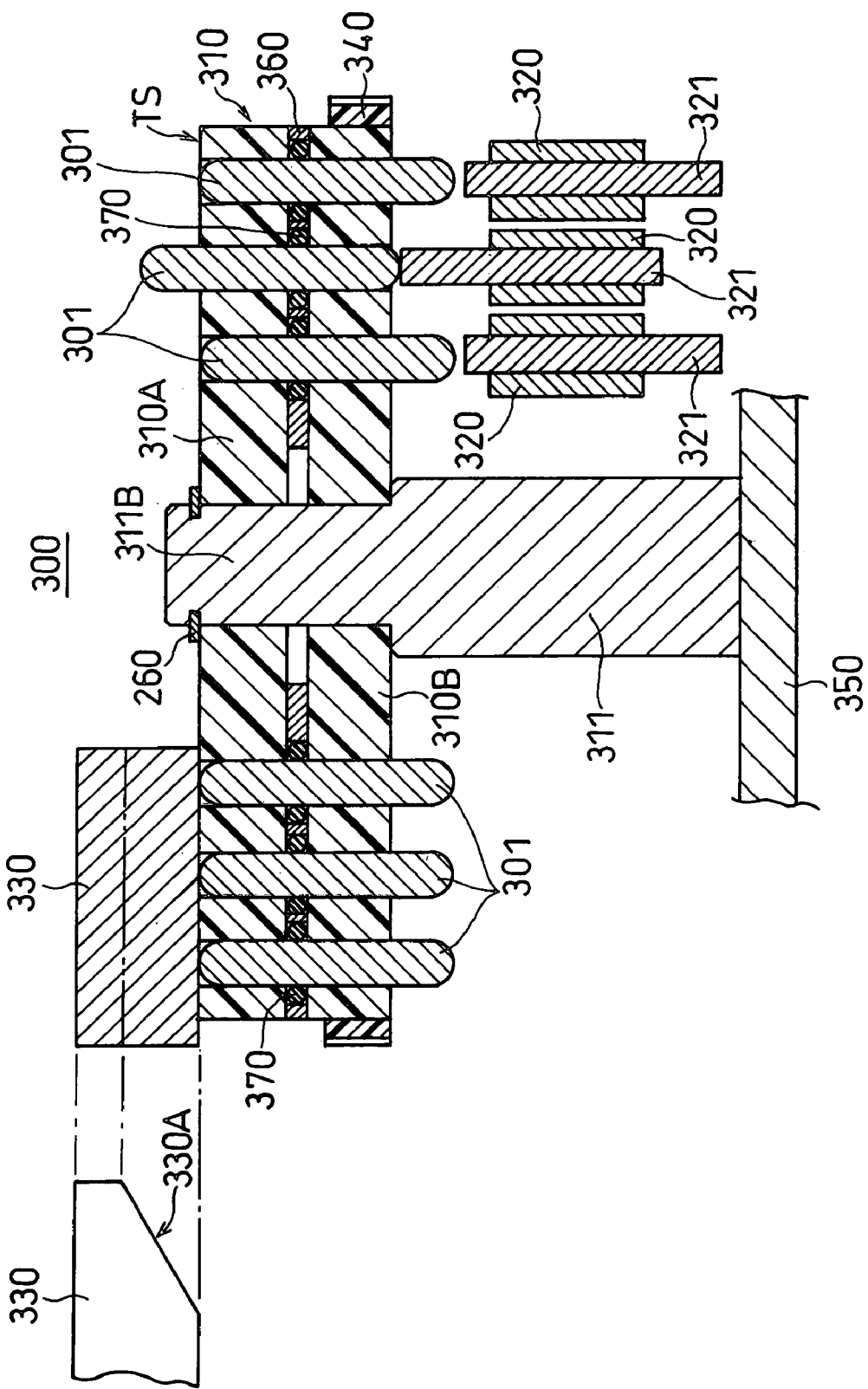
FIG. 18A is a schematic cross-sectional view, showing a tactile pin display apparatus (braille display apparatus) according to an embodiment of the present invention.
FIG. 18B is a schematic side view of the cam, shown in FIG. 18A, as seen from the left side of the cam in FIG. 18A.
Figure 19:
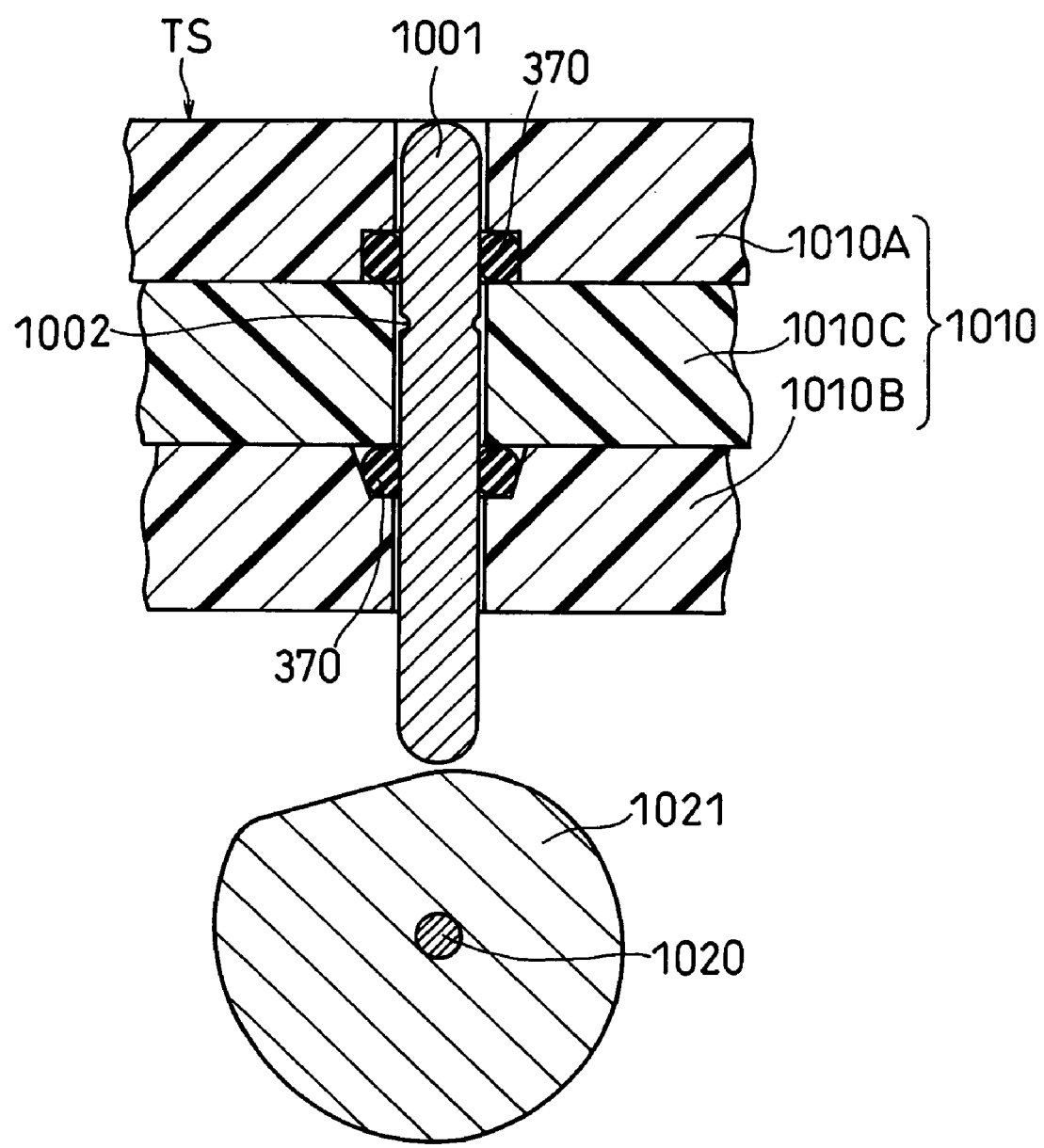
FIG. 19 is a schematic cross-sectional view of a part of a tactile pin display apparatus according to an embodiment of the present invention.

Furthermore, as schematically shown in FIG. 19, which will be described in detail later, a pin (pin 1001 in FIG. 19) can have an annular groove (groove 1002 in FIG. 19) at a position which faces an O-ring (upper O-ring 370 in FIG. 19) at the second position of the pin in the case where the pin is raised by a cam (cam 1021 in FIG. 19), whereby the O-ring 370 is partially fit into the annular groove for increasing the pin holding force at the second position. In this way, although not shown in FIG. 18A, it is also possible that each pin 301 in FIG. 18A is provided with an annular groove (grooves) in a manner similar to those as shown in FIG. 19 (annular groove 1002) and later described FIG. 24 (annular grooves 2 and 3) for the purpose of allowing each O-ring to engage with such annular groove(s) for increasing the holding force of the pin by the O-ring. In providing such annular groove(s), it is preferable to provide such annular groove(s) at such position(s) that when each O-ring is engaged with such annular groove(s) of each pin, the pin is positioned at the first position (reset position) or a later described second position (display position).

Referring back to FIG. 18A, a cam 330 is provided above and in the vicinity of the upper disc 310A for lowering the pins 301 to the first position. The cam 330 is fixed on a portion (not shown) of a housing. As schematically shown in FIG. 18B, which is a side view of the cam 330 seen from the left side of the cam in FIG. 18A, the cam 330 has a gradual slope surface 330A. When the rotational member rotates clockwise, the top end of each raised pin 301 is brought to contact with the slope surface 330A. During the rotation of the rotational member 310, respective columns, each of three pins, in the cells (braille cells) on the rotational member 310 are sequentially brought to contact with the slope surface 330A. As a result, each pin 301 is either lowered to or stays at the first position (reset position where the top level of each pin corresponds to the tactile surface TS), and is held there by the O-ring 370.

It is enough to provide such cam (330) at only one position in the rotation of the rotational member 310. Besides, the cam 330 can be replaced by e.g. a rotatable roller for the same or similar function, which can be also referred to as pin height reset member (pin position reset member).

Next, according to the present EMBODIMENT, electromagnetic solenoids are used for selectively raising the pins 301 to the second position. Referring to FIG. 18A, three electromagnetic solenoids 320 are placed in alignment in correspondence with three pins in each column of each cell (braille cell). FIG. 18A shows a status where a central pin in three pins in a column of a cell has been selectively raised by a raising member 321 against the elastic contact force of the O-ring 370 for the central pin. The central pin 301 is held at the raised position (second position) by the elastic contact force of the same O-ring 370.

Although not shown, the three solenoids 320 are fixed on a housing or a base 350. It is enough to provide such solenoids at only one position in the rotation of the rotational member 310.

The rotational member 310 is designed to rotate clockwise at about 4 rpm (revolutions per minute) in the case where 48 cells (braille characters) are arranged on the main plane surface (TS) of the rotational member 310. Further, although not shown, the rotational member 310 can be rotated by any optional means, such as a combination of a motor and a pinion, coupled to the gear 340.

Besides, it is possible to allow the pins 301 and the upper disc 310A in the tactile pin display apparatus 300 to have a photocatalytic effect. Furthermore, instead of raising the pins 301 directly by the solenoids 320, it is possible to raise the pins 301 each by e.g. a cam and a lever (not shown) which are driven by each solenoid. It is also possible that, instead of placing the three solenoids in alignment at one position in the rotation of the rotational member, the three solenoids are placed at three distanced positions in a manner similar to that as in EMBODIMENT 1, with the three solenoids being actuated at three different timings. It is furthermore possible to provide a stopper (not shown) at a top end of each pin 301 for restricting the pin 301 from being raised by each solenoid 320 to a height greater than a desired one, and/or to provide e.g. a roller(s) in a midway position of the rotation of the rotational member for making uniform the raised heights of the pins.

Furthermore, as schematically shown in FIG. 19, which is a schematic cross-sectional view of a part of a tactile pin display apparatus, a plurality of O-rings 370 can be provided for each pin 1001. Referring to FIG. 19, a rotational member 1010 comprises an upper disc 1010A, a middle disc 1010C and a lower disc 1010B, and supports a pin 1001 to be movable up-and-down. The upper disc 1010A has a recessed portion, for an O-ring 370, at a lower surface thereof around a hole for the pin 1001. The lower disc 1010B has a recessed portion, for a further O-ring 370, at an upper surface thereof around the hole for the pin 1001. Reference numeral 1002 designates an annular groove which is provided at the pin 1001 for having the upper O-ring 370 fit therein. Reference numerals 1020 and 1021 designate a shaft of a pulse motor and a disc-type cam, respectively.

When the pin 1001 is raised to a height of about 0.7 mm from a tactile surface TS of the rotational member 1010 (upper surface of the upper disc 1010A), the upper O-ring 370 is brought to be fit in the annular groove 1002 of the pin at the then height. Thereby, the pin 1001 is caused to have a withstanding force against a finger pressing force of a user (visually handicapped) when touching the pin.

It is evident that each of the O-rings can be made of other materials than rubber, such as a C-shaped resin member and a metal member having a function to allow the pin to move up-and-down and hold the pin. Furthermore, the cross-sectional shape of the O-ring can be optionally designed.

As described in the foregoing, the tactile pin holding mechanism or apparatus and the tactile pin movement mechanism or apparatus in the tactile pin display apparatus 300 according to the present EMBODIMENT can be made very simple. Accordingly, the tactile pin display apparatus can be made small in size, light in weight and low in cost.

Further, it is to be noted that combinations of the rotational members with the tactile pin holding mechanisms or apparatuses and other elements as shown in FIGS. 18 and 19 above in the present EMBODIMENT 2 evidently illustrate examples of the tactile pin holding apparatuses according to the before-described third aspect of the present invention.

Embodiment 3

A tactile pin display apparatus (braille display apparatus) shown in the present EMBODIMENT is similar to that in EMBODIMENT 2, except that the tactile pin holding mechanism or apparatus here is partially different from that in EMBODIMENT 2. More specifically, ring members (O-rings) in EMBODIMENT 2 are replaced in the present EMBODIMENT by an elastic sheet member, such as a rubber sheet, having plural punch holes at positions corresponding to plural pins, whereby the plural pins are commonly and elastically contacted and supported by the elastic sheet member at annular circumferences thereof.

The diameter of each punch hole in the elastic sheet member is designed to be smaller by about 10 to 30% than the outer diameter of each pin. The elastic sheet (rubber sheet) has a thickness of about 1.2 mm, and is made of e.g. NBR (acrylonitrile-butadiene rubber) having a rubber hardness of about 70 IRHD.

Figures 20A, 20B:
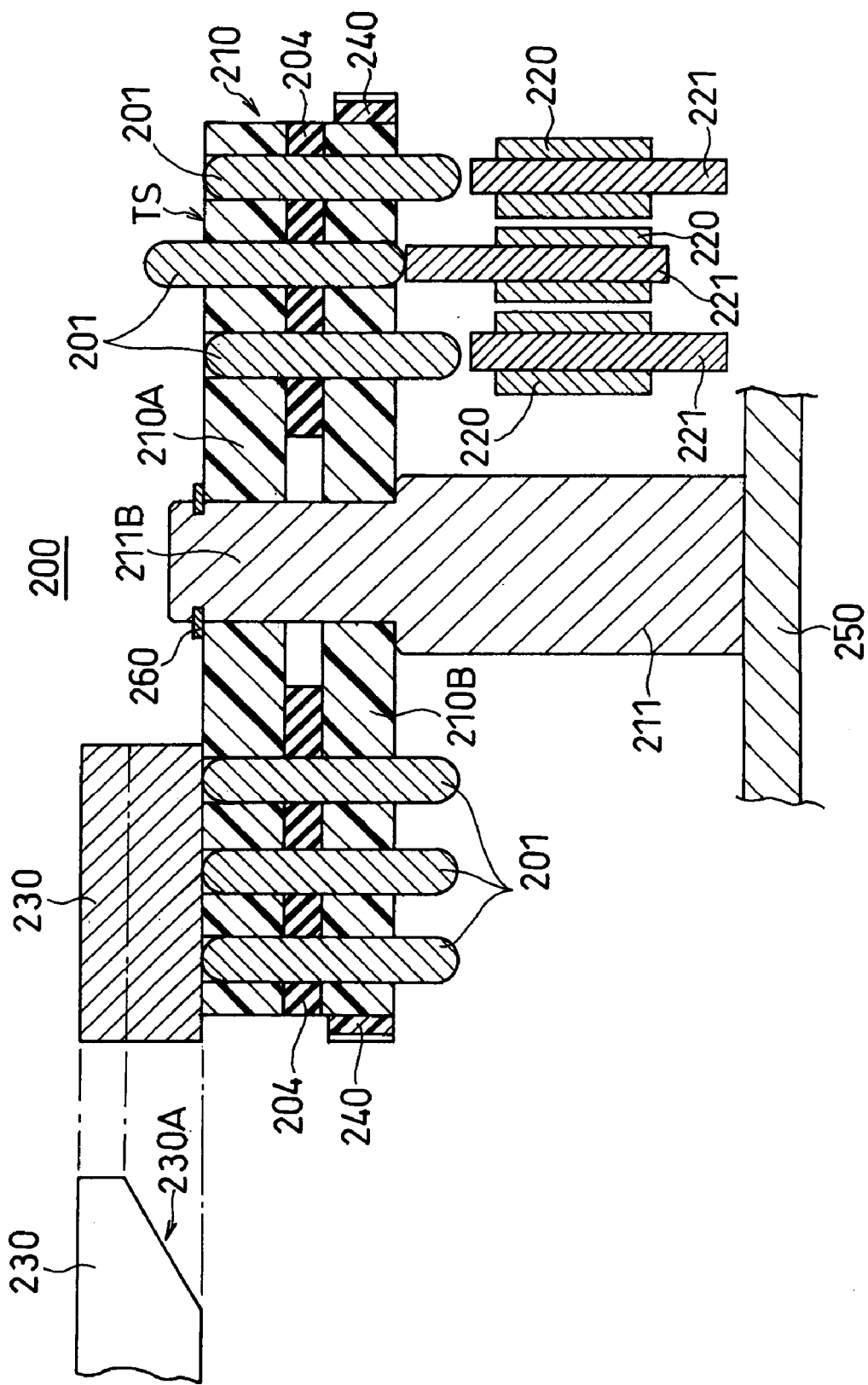
FIG. 20A is a schematic cross-sectional view, showing a tactile pin display apparatus (braille display apparatus) according to an embodiment of the present invention.
FIG. 20B is a schematic side view of the cam, shown in FIG. 20A, as seen from the left side of the cam in FIG. 20A.

FIG. 20A schematically shows a tactile pin display apparatus according to the present EMBODIMENT. A tactile pin display apparatus 200 comprises eight elements. A first element comprises a rotational member 210 of disc-type having a plurality of punch holes provided at radial positions therein that are distanced from one another and appear at a main plane surface thereof (tactile surface TS). A second element comprises a gear 240 to engage with a circumferential portion of the rotational member 210. A third element comprises rotation driving means (not shown) for rotating the rotational member 210, the rotation driving means comprising a gear, a motor and so on. A fourth element comprises pins 201 each provided, in each of the holes, to be raised and lowered between a first position (pin reset position) and a second position (pin display position) in the direction of the length of each hole or each pin.

A fifth element comprises an elastic sheet member 204 respectively for holding each pin at an optional position such as the first position or the second position. A sixth element comprises a cam 230 for making uniform the height of each of the pins 201 at the first position when the rotational member 210 rotates to bring the pins 201 to the position of the cam 230, such that pins having been raised to the second position from the tactile surface TS are lowered by the cam to the first position at the level of the tactile surface TS, while other pins having been positioned at the first position stay at the first position. Thus, the cam 230 can be referred to as pin height reset member (pin position reset member). A seventh element comprises three electromagnetic solenoids 220 which are positioned downstream of the cam 230 in the rotational direction of the rotational member 210, and which raise the pins 201 to the second position, when the rotational member 210 is rotated to bring the pins 201 to the position of the solenoids 220, and the solenoids are actuated. An eighth element comprises a selectively actuating means for selectively actuating the solenoids in order to selectively raise the pins 201 to the second position, which is an operative position of each pin, the first position being an inoperative position of each pin.

When the rotational member 210 is rotated by the rotation driving means, the pins 201 are brought to contact with the cam 230, whereby the pins are lowered by the cam 230 to or stay at the first position. When the rotational member 210 is further rotated by the rotation driving means to the position. of the solenoids 220, the pins 201 are selectively raised by the solenoids to the second position.

In the above description, the first position is where the pins are lowered to the tactile surface TS or upper surface of the rotational member 210 so that a top end of each pin is not raised from or stays at substantially the same level of the upper surface of an upper disc 210A. On the other hand, the second position is where the pins are raised from the tactile surface TS of the upper disc 210A to a height of about 0.7 mm.

The rotational member 210 is made by sequentially stacking, thereby integrally assembling, the upper disc 210A (made by molding an ABS resin), the elastic sheet member 204 and the lower disc 210B (also made by molding an ABS resin).

The pins 201 are basically designed to be the same as each other with respect e.g. to the material and the shape such as diameter and length. Each pin 201 is supported to be movable up-and-down across the upper disc 210A and the lower disc 210B. It is optional to coat a solid lubricant on e.g. each pin 201 for smoothing and stabilizing the up-and-down movement (sliding) of the pin in each punch hole of the rotational member.

Furthermore, although not shown here, each pin can have an annular groove at a position which faces the elastic sheet member 204 at the second position (or the first position) of the pin, whereby the elastic sheet member 204 is partially fit into the annular groove for increasing the pin holding force at the second position (or the first position).

Figure 21:
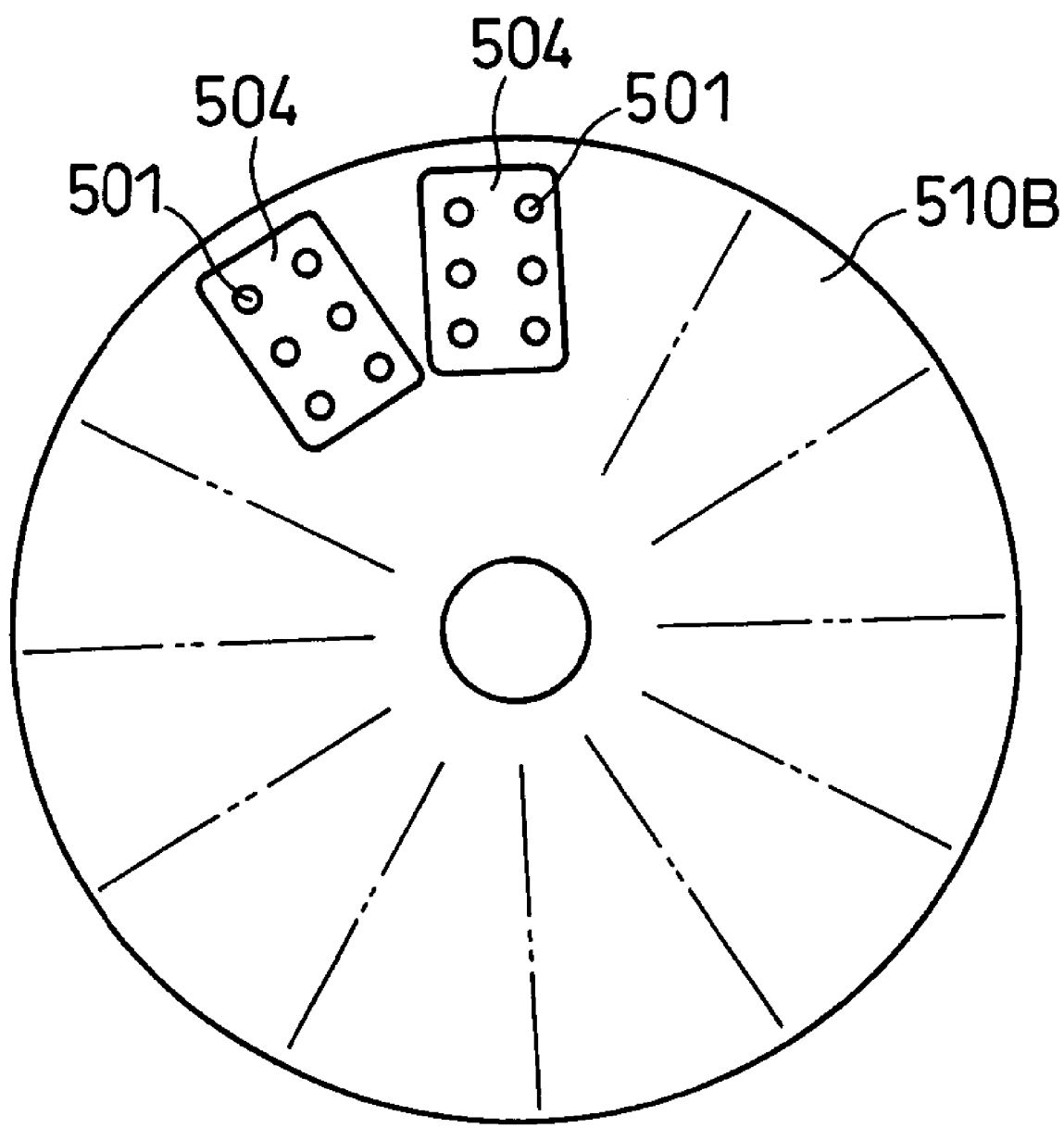
FIG. 21 is a schematic plan view, showing elastic sheet units placed between a lower disc and an upper disc, which has been removed.

FIG. 21 is a schematic plan view, showing elastic sheet units 504 which are usable instead of the elastic sheet member 204, and which are placed between the lower disc 510B and the upper disc (not shown in FIG. 21). As shown in FIG. 21, plural elastic sheet units 504, each having 6 punch holes for the pins for each cell (braille cell), are placed on the lower disc 510B (between the lower disc 510B and the upper disc 510A). In the case of FIG. 21, it is assumed that 12 cells (braille characters) are arranged on the rotational member. Accordingly, 12 elastic sheet units 504 are placed on the lower disc 510B, wherein only two of them are shown in FIG. 21 for simplifying the drawing. Reference numeral 501 designates pins.

Advantages of the elastic sheet units 504 are that precise punch holes can be made by molding, and that the influence of expansion and/or shrinkage of the elastic sheet units due to temperature change can be minimized, thereby minimizing change of the pitches between the punch holes.

As described in the foregoing, the tactile pin holding mechanism or apparatus and the tactile pin movement mechanism or apparatus in the tactile pin display apparatus 200 according to the present EMBODIMENT can be made very simple. Accordingly, the tactile pin display apparatus can be made small in size, light in weight and low in cost.

Embodiments 4

A tactile pin display apparatus (braille display apparatus) of the present EMBODIMENT will be described hereinafter with reference to FIGS. 22, 23, 24 and 25.

Figure 22:
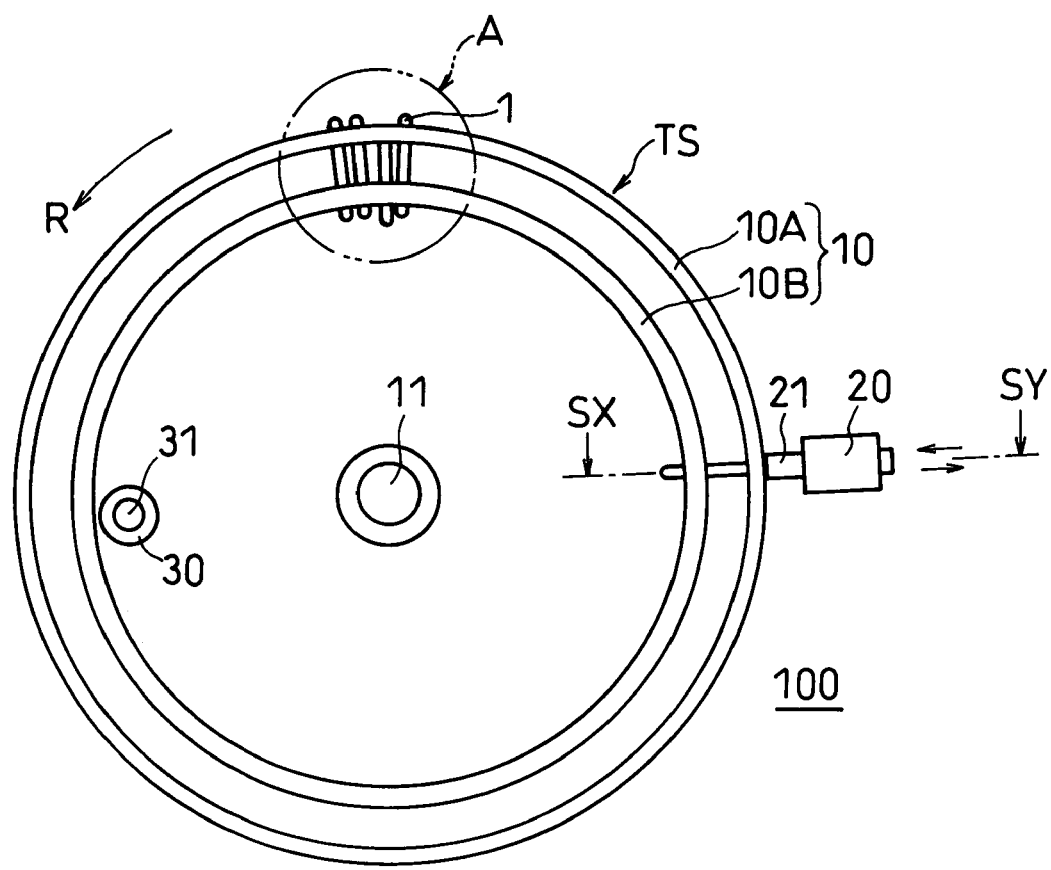
FIG. 22 is a schematic plan view, conceptually showing a part of a tactile pin display apparatus according to an embodiment of the present invention.
Figure 23:
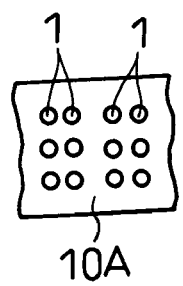
FIG. 23 is a schematic side view of a part of the apparatus of FIG. 22.

FIG. 22 is a schematic plan view, conceptually showing a main part of a tactile pin display apparatus 100, and FIG. 23 is a schematic side view of a part thereof of FIG. 22 according to the present EMBODIMENT. FIG. 24 is a schematic cross-sectional view of an enlarged part A of FIG. 22, and FIG. 25 is a schematic cross-sectional view, cut by SX-SY plane, of a part of FIG. 22.

Referring to these drawings, the tactile pin display apparatus 100 according to the present EMBODIMENT comprises seven elements. A first element comprises a rotational member 10 having a cylindrical surface (outer surface being a tactile surface TS) which has plural punch holes provided thereat at positions corresponding to tactile pins for display. A second element comprises rotation driving means (not shown) comprising a motor and gears for rotating the rotational member 10. A third element comprises pins 1 each being arranged in each of the holes to be movable between a first position (pin reset position) and a second position (pin display position) of each pin. A fourth element comprises elastic (resilient) holding members 4 for holding each pin 1 at either the first position or the second position.

A fifth element comprises a rotatable roller 30 for raising the pins to or allowing the pins to stay at the first position (reset position or reset height). Thus, the roller 30 can be referred to as pin height reset member (pin position reset member). A sixth element comprises three electromagnetic solenoids 20, as examples of actuators, positioned downstream of the roller 30 in the rotational direction of the rotational member 10, and which lower the pins 1 to the second position, when the rotational member 10 is rotated to bring the pins 1 to the position of the solenoids 20, and the solenoids are actuated. A seventh element comprises a selectively actuating means for selectively actuating the solenoids in order to selectively lower the pins 1 to the second position, which is an operative position of each pin, the first position being an inoperative position of each pin.

When the rotational member 10 is rotated by the rotation driving means, the pins 1 are brought to contact with the roller 30, whereby the pins are raised by the roller 30 to or stay at the first position. When the rotational member 10 is further rotated by the rotation driving means to the position of the solenoids 20, the pins 1 are selectively lowered by the solenoids to the second position.

In the above description, the first position is where the pins are raised from the tactile surface TS (outer surface) of the cylindrical rotational member 10. On the other hand, the second position is where the pins are lowered to the tactile surface TS of the rotational member 10.

The pins 1 are basically designed to be the same as each other with respect e.g. to the material and the shape such as diameter and length. Each pin 1 is preferred to have a diameter of about 1.2 mm and a length of about 14 mm, and have a roughly semi-spherical shape at each end thereof. An example of a tactile pin holding mechanism or apparatus is shown in FIG. 24. Two V-shaped annular grooves 2 and 3 are provided at two positions of each pin 1 in the length direction of the pin. For a pair of adjacent pins 1, an elastic (resilient) holding member 4 having engagement portions (V-shaped portions 5) engaged with the V-shaped annular grooves 2 and 3 is provided for holding the pins 1.

The elastic holding member 4 is e.g. a flat spring, made of stainless steel, bent into a U-shape at a central portion thereof and further bent into a V-shape to a V-shaped portion 5 at each end thereof. In other words, the V-shaped portion 5 of the flat spring 4 is an engagement portion of the flat spring 4 (elastic cantilever). Further, the flat spring 4 is designed to have a plate thickness of about 0.06 mm, a plate width of about 2 mm and an amount of spring deflection of about 0.7 mm. By elastically (resiliently) engaging the V-shaped portion 5 (engagement portion) of the elastic holding member 4 (elastic cantilever) with the annular grooves 2 and 3, the pins 1 can be held at the first position or the second position with a desired holding force such as about 0.3 N.

Figure 24:
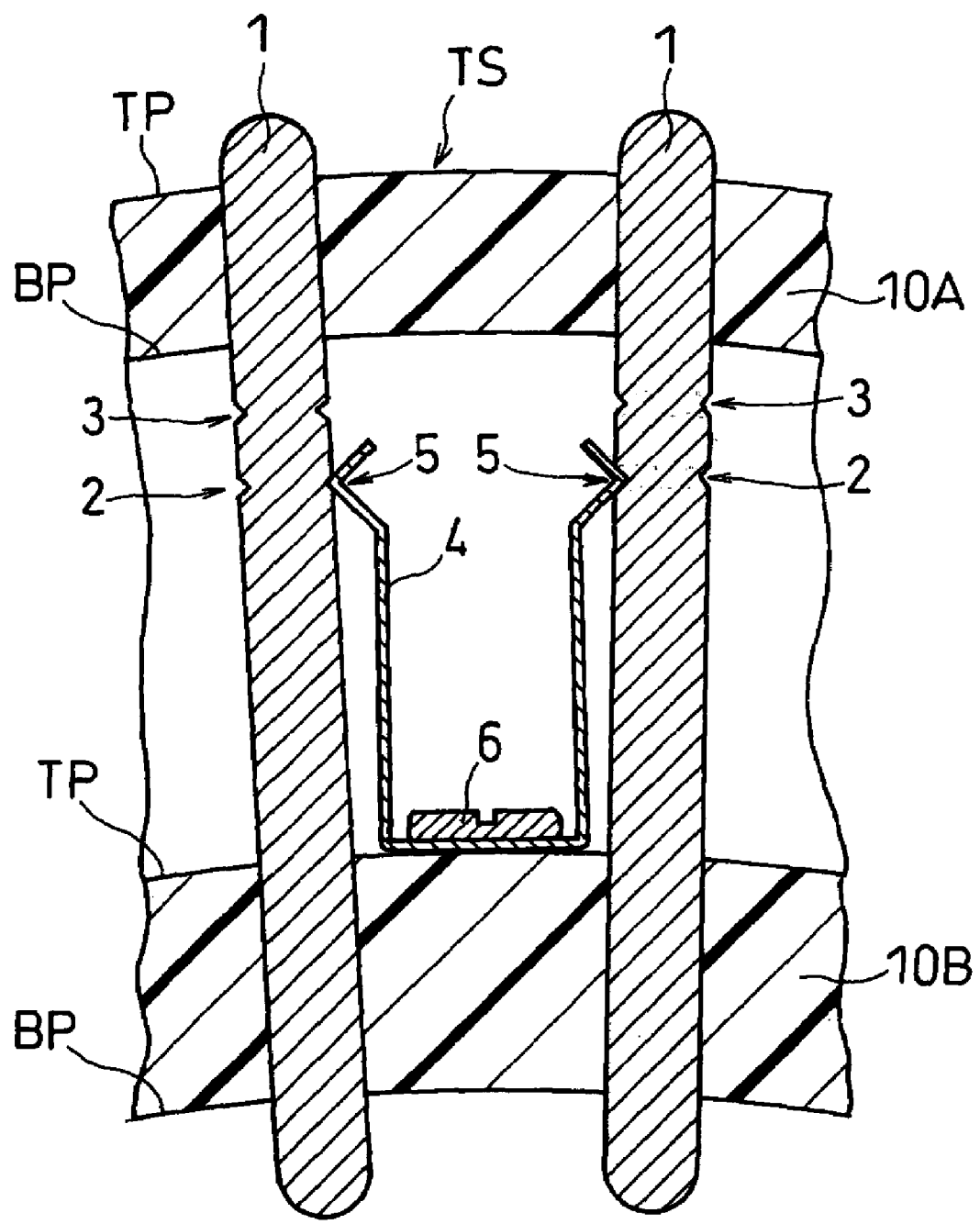
FIG. 24 is a schematic cross-sectional view of part A of the apparatus of FIG. 22 having been enlarged.
Figure 25:
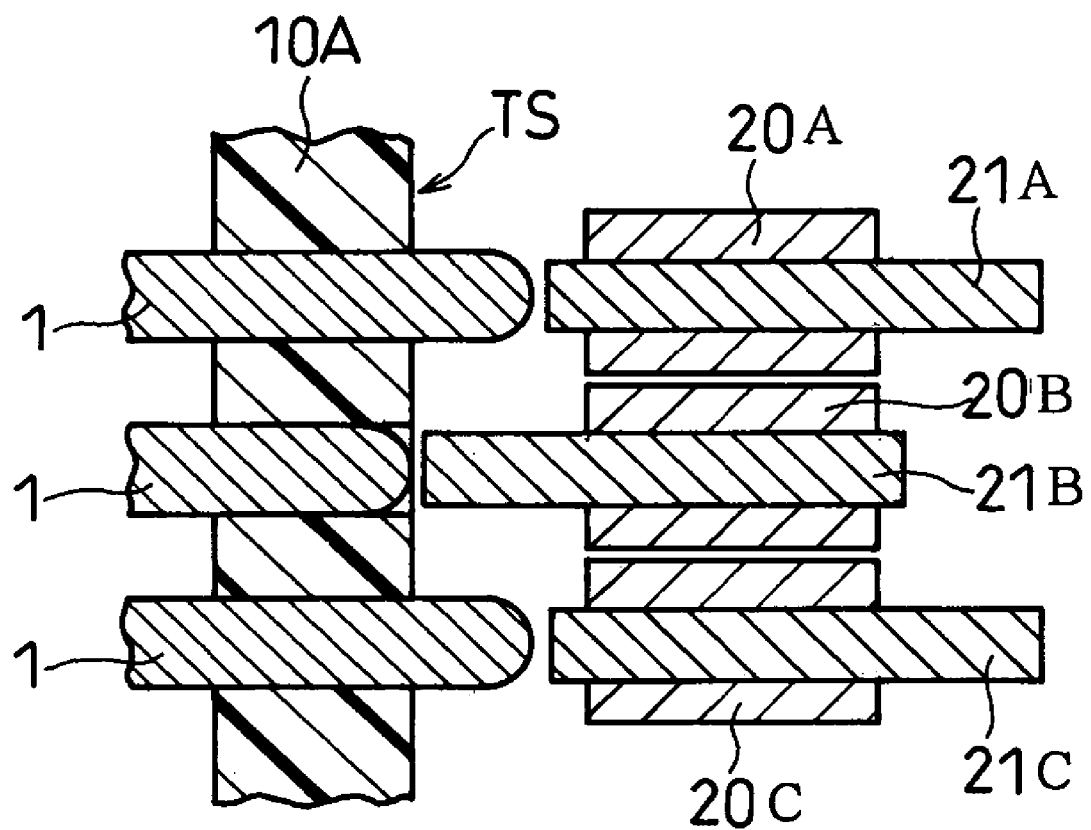
FIG. 25 is a schematic cross-sectional view, cut by SX-SY plane, of a part of the apparatus of FIG. 22.

Furthermore, as apparent from FIG. 24, the elastic holding member 4 (plate spring) is so designed, with respect to its shape and fixation manner thereof to the inner cylindrical member, that its pin holding force against the movement of the pin to the direction to the second position (namely against finger pressing force to the pin) is greater than its pin holding force against the movement of the pin to the opposite direction.

It is to be noted that although FIG. 24 shows an example of providing two V-shaped annular grooves 2 and 3 are provided at two positions of each pin 1 in the length direction of the pin, it is possible to change the number of the V-shaped annular grooves (for example, to reduce the number to only one V-shaped annular groove), depending on requirements on tactile pin display function.

FIG. 22 schematically shows a concept of means for raising the pins 1 to the first position. A rotatable roller 30 supported by a shaft 31 is provided within the cylindrical member 10 at a position with a given distance from the cylindrical member 10. The shaft 31 is fixed on a housing or a base (not shown). When the rotational member 10 rotates counterclockwise as indicated by arrow R, respective columns, each of three pins, in the cells (braille cells) on the rotational member 10 are sequentially brought to contact with the roller 30. As a result, each pin 1 is either raised to or allowed to stay at the first position (height) of about 0.7 mm from the outer surface (tactile surface TS) of the rotational member 10.

When the roller 30 contacts each pin 1 positioned at the second position where the V-shaped portion 5 of the elastic holding member 4 is in engagement with the V-shaped groove 3, the roller 30 raises the pin against the elastic engagement force of the V-shaped portion 5 of the elastic holding member 4 with the V-shaped groove 3, releasing the engagement therebetween. Thereby, the V-shaped portion 5 of the elastic holding member 4 is brought to be engaged with the V-shaped groove 2, whereby the pin 1 is held at the first position.

It is to be note that it is sufficient to provide the roller 30 at only one position in the rotation of the rotational member 10. Furthermore, the roller 30 can be replaced by a cam (not shown) fixed at the position and having a smooth slope similar to that shown in FIGS. 18B and 20B. Such cam can also be referred to as pin height reset member (pin position reset member).

FIG. 25 schematically shows a concept of means for lowering the pins 1 to the second position. As actuators, three electromagnetic solenoids 20A, 20B and 20C are arranged in alignment in correspondence with three pins in each column of each cell (braille character). FIG. 25 shows the case where the central pin out of the three pins has been selected for the actuation, and pressed to be lowered to the tactile surface TS (second position) by a central lowering member 21B, out of the three lowering members 21A, 21B and 21C in the solenoids 20A, 20B and 20C, against the elastic engagement force between the V-shaped portion 5 of the elastic holding member 4 and the V-shaped annular groove 2 of the pin 1. It may be needless to mention that the lowered pin 1 is held there, where the V-shaped portion 5 of the elastic holding member 4 is engaged in the V-shaped annular groove 3 of the pin again.

The three solenoids 20A, 20B and 20C are positioned outside the rotational member 10, and fixed on a housing or a base (not shown) positioned by a predetermined distance from the rotational member 10. It is to be noted that it is sufficient to provide the three solenoids 20 at only one position in the direction of the rotation of the rotational member 10. Furthermore, instead of lowering the pins 1 directly to the tactile surface (second position) by the solenoids 20, it is possible to lower the pins 1 each by e.g. a cam and a lever (not shown) which are driven by each solenoid.

In the present EMBODIMENT 4 as well, the respective solenoids 20A, 20B and 20C can be arranged at three distanced positions in the direction of the rotation of the rotational member 10 for sequentially driving the solenoids at the different timings in a manner as shown in FIG. 10. Furthermore, it is optional to provide a stopper (not shown) at a bottom end of each pin 1 for restricting the pin 1 from being lowered by each solenoid to a depth lower than a desired one.

The rotational member 10 is made of e.g. PS (polystyrene) resin, and has an inner cylindrical member 10B and an outer cylindrical member 10A integrally assembled with each other. The outer cylindrical member 10A has an outer place or topside plane TP, which is arc in the cross-sectional view of FIG. 24, and which functions as the tactile surface TS. Likewise, the bottom side place BP of the outer cylindrical member 10A, and a topside plane TP and a bottom side plate BP of the inner cylindrical member 10B are each arc in the cross-sectional view of FIG. 24. Each of the cylindrical members can be made by molding into a substantially cylindrical shape. The elastic holding member 4 is fixed to the inner cylindrical member 10B by a screw 6.

Each pin 1 is supported, to be slidable across the cylindrical members 10A and 10B, by the cylindrical members and the elastic holding member. For smoothing and stabilizing the sliding of each pin 1, it is optional to coat a fluoride-based solid lubricant, such as a fluoride-based lubricant, on a pin sliding portion such as surface of the pin 1.

Assuming that the number of cells (braille characters) to be arranged on the outer surface of the rotational member 10 is 48, and that the reading speed (touching speed) is 200 characters (braille characters) per minute, the rotational speed of the rotational member 10 is about 4 rpm (revolutions per minute). By rotating the rotational member counterclockwise, the user (visually handicapped) putting its finger on the cylindrical surface (tactile surface) can feel as if moving the finger from left to right on a braille paper.

Rotation driving means for rotating the rotational member 10 can be optionally constructed by a gear train, a pulse motor and the like. An example of such construction is that a gear is fixed on a boss portion of the rotational member 10 rotatably supported by a shaft 11, and that a pinion, a pulse motor and the like are coupled to the gear. Although not shown, the combination of these elements can be placed at a lower surface of the rotational member 10.

Furthermore, a control circuit for controlling the elements constituting the apparatus of the present EMBODIMENT, such as actuators 20 and a rotational member driving motor, can be constructed in a manner to that in EMBODIMENT 1 as shown in FIG. 12.

In the present EMBODIMENT as described above, the roller 30 is placed inside the rotational cylindrical member 10 to raise the pins 1 to the first position (reset position), while the solenoids 20 are placed outside the rotational cylindrical member 10 to lower the pins 1 to the second position. However, the positions of the roller and the solenoids can be exchanged such that a roller is placed outside the rotational cylindrical member to lower the pins to the first position (reset position), while solenoids are placed inside the rotational cylindrical member to raise the pins to the second position.

As described in the foregoing, the tactile pin holding mechanism apparatus and the tactile pin movement mechanism or apparatus in the tactile pin display apparatus according to the present EMBODIMENT can be made very simple. Accordingly, the tactile pin display apparatus can be made small in size, light in weight and low in cost.

Although not limited to the present EMBODIMENT 4, it is effective to use a photocatalyst on or for elements in the tactile pin display apparatus of the present EMBODIMENT 4 in order to keep the elements clean, as will be described below.

For example, it is preferable to provide a photocatalyst on each pin 1 made of stainless steel and on the outer cylindrical member 10A. A preferable method of providing a photocatalyst on each pin 1 is to immerse the pin in a liquid containing titanium dioxide as a photocatalyst, and then dry it. More specifically, a liquid solution or dispersion of a solvent, such as alcohol, having a fluoride-based resin diluted therein and viscosity adjusted is prepared. To this liquid solution or dispersion, a titanium dioxide power (having a particle size of a few nm to 200 nm) in about 5 wt % is mixed and dispersed, thereby producing a liquid dispersion of titanium dioxide. In the thus produced liquid dispersion, the pin is immersed, and then slowly pulled out of the liquid dispersion, thereby forming a coating having a thickness of about 1 μm on the pin. After removing unnecessary liquid drops from the pin, the pin is placed in a drying machine at about 50° C. for about 20 minutes to dry the pin. Thereby, a layer of photocatalyst (namely a layer having a photocatalytic effect) is formed on the entire surface of the pin.

It is possible to provide, as a first coating layer on the surface of the pin, a silicon dioxide ($SiO_2$) undercoat layer which is inert to the photocatalyst, and then to coat a layer of photocatalyst on the silicon dioxide undercoat layer in the same process as that described above, including coating a photocatalyst-containing liquid on the pin and drying it.

In order to provide a photocatalyst to the outer cylindrical member 10A, it is preferable to mix a photocatalyst, such as titanium dioxide particles, with a resin for forming the outer cylindrical member 10A by molding. More specifically, according to a preferable process, titanium dioxide particles coated with a material, such as porous silica, selected from materials insert to the photocatalyst are mixed in PS (polystyrene) resin pellets, which are then subjected to injection molding to form a desired shape for the outer cylindrical member 10A. It is preferred that the outer dimension of the titanium dioxide be a few nm to a few hundred nm, and the mixture amount be about 5 weight %.

By allowing the pins and the outer cylindrical member 10A to have a photocatalyst thereon or photocatalytic effect, they have bactericidal effect, deodorant effect, stain resistance and effect of decomposing stains deposited thereon, decomposing sweat, oil of the hand, food particles and so on. Thereby, the tactile surface of the rotational member can be kept clean, and the sliding movement of each pin can be always stabilized.

The use of such photocatalyst can be applied not only to the present EMBODIMENT but also to the other EMBODIMENTS of the present invention as well.

Embodiment 5

A further example of tactile pin display apparatus (braille display apparatus) of the present invention will be described in the present EMBODIMENT 5, with reference to FIG. 26 to FIG. 29.

Figure 26:
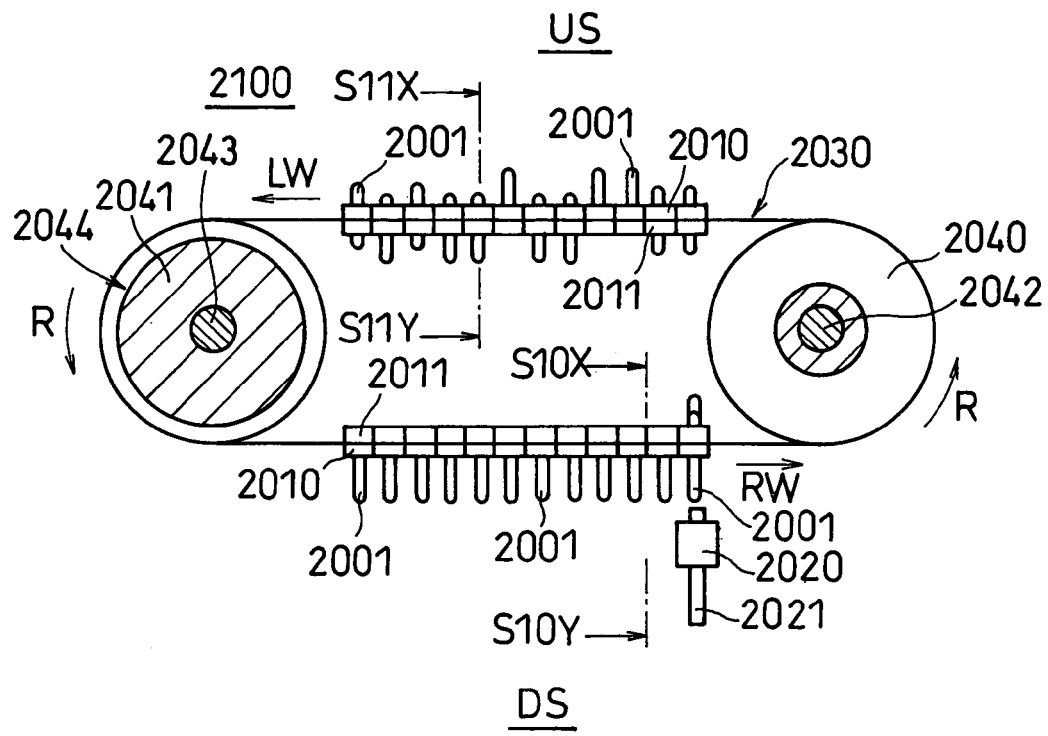
FIG. 26 is a schematic side view, partially in cross-section, showing a part of a tactile pin display apparatus according to an embodiment of the present invention.
Figure 27:
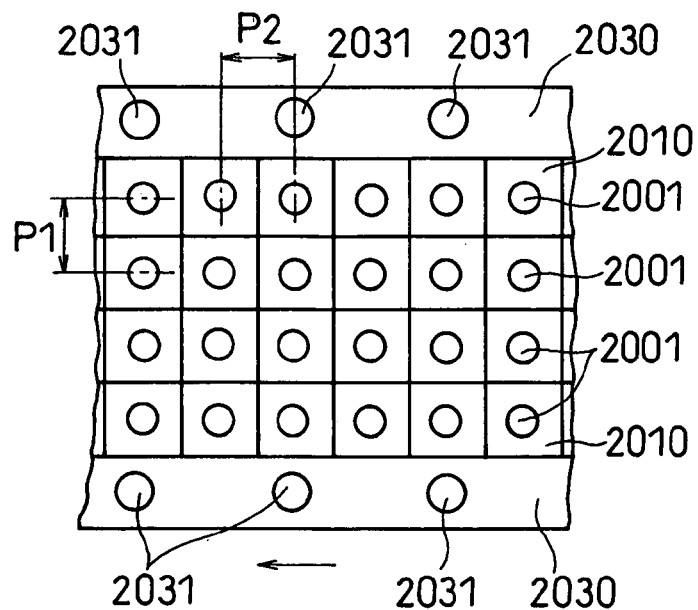
FIG. 27 is a schematic plan view of a part of the apparatus of FIG. 26.
Figure 28:
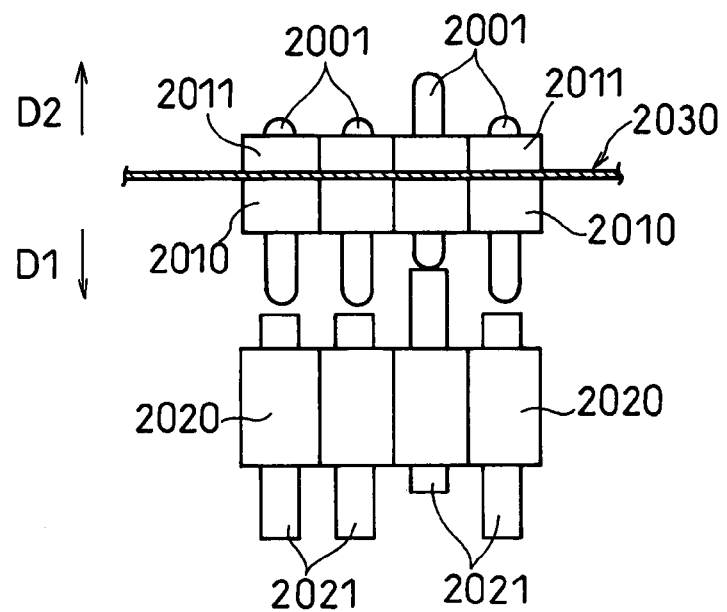
FIG. 28 is a schematic cross-sectional view, cut by S10X-S10Y plane, of a part of the apparatus of FIG. 26.
Figure 29:
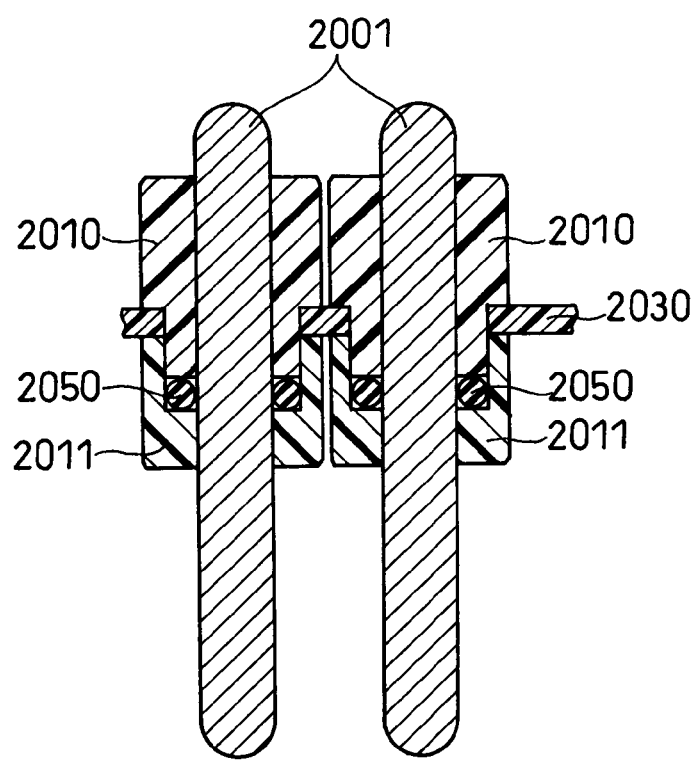
FIG. 29 is a schematic cross-sectional view, cut by S11X-S11Y plane, of a part of the apparatus of FIG. 26.

FIG. 26 is a schematic side view, partially in cross-section, showing a main part of a tactile pin display apparatus according to the present EMBODIMENT. FIG. 27 is a schematic plan view of a part of the apparatus of FIG. 26. FIG. 28 is a schematic cross-sectional view, cut by S10X-S10Y plane, of a part of the apparatus of FIG. 26. FIG. 29 is a schematic cross-sectional view, cut by S11X-S11Y plane, of a part of the apparatus of FIG. 26.

Referring to these FIGS. 26 to 29, reference numeral 2001 designates tactile pins made of stainless steel for displaying characters (braille characters) and/or graphics (braille graphics) by differences of heights of the pins. Reference numeral 2010 designates first holding members each for supporting the pin 2001 to be movable up-and-down therein. Reference numeral 2011 designates second holding members each for supporting the pin 2001 to be movable up-and-down therein. Reference numeral 2030 designates an endless belt having a plurality of the first and the second holding members mounted thereon. In FIG. 26, the combinations of the pins 2001 with the first and the second holding members 2010 and 2011 are shown at only two parts (upside and downside) for simplifying the drawing. Actually, such combinations are provided on the substantially entire area of the endless belt 2030.

Further, reference numeral 2031 designates a pair of perforations (holes for moving the belt) provided at both end portions of the width of the endless belt, respectively. Each adjacent two of the perforations at each end portion of the width of the endless belt are distanced from each other by a given distance. Reference numerals 2040 and 2041 designate a drive pulley and an idler pulley for suspending therebetween the endless belt 2030 to move in an elliptical shape through an upside and a downside of the pulleys. Reference numerals 2042 and 2043 designate shafts for rotatably supporting the pulleys 2040 and 2041, respectively.

Reference numeral 2050 designates O-rings each for elastically pressing and holding the pin 1. Reference numeral 2020 designates electric cylinders each for selectively moving (lowering) the pin 1 to an arbitrary position (height). Reference numeral 2021 designates moving members (threaded motor shafts) each as a component of each electric cylinder. Reference numeral 2100 designates a tactile pin display apparatus.

The tactile pin display apparatus 2100, as shown in FIG. 26 to FIG. 29, thus comprises: a belt conveyor for suspending in an elliptical shape and moving the endless belt 2030 (in counterclockwise direction in FIG. 26 as indicated by arrow R) through the upside and the downside of the belt conveyor; plural tactile pins 2001 arranged in multi-row multi-column (4 rows in each of many more columns) on a major surface of the endless belt 2030, the pins 2001 being able to be raised from and lowered to the belt; a rotating member (not shown) for moving the endless belt 2030 in one direction; four electric cylinders 2020 for selectively lowering the pins 2001 at the four columns to the belt, respectively, namely selectively moving the pins 2001 to second direction D2 in the pin length direction, to become positioned at arbitrary positions (heights) from the surface (tactile surface) of the belt; a selectively actuating means (not shown) for determining amount (including zero amount) of movement (lowering) of each pin 2001 to the D2 direction; and the idler pulley 2041 for raising the pins 2001 from the belt (namely moving the pins 2001 to first direction D1) or allowing the pins 2001 to stay at the raised position, to become positioned at the initial position (namely reset position). Thus, the idler pulley 2041 can be referred to as pin height reset member (pin position reset member).

The tactile pins 2001 are arranged on the substantially entire surface of the endless belt 2030, as described above, for displaying braille characters/graphics and/or general characters/graphics (for the non-handicapped), although FIG. 26 shows only a part of the pins at an upside (as designated by symbol US) of the conveyor and a part of the pins at a downside (as designated by symbol DS) of the conveyor. As shown in FIG. 27, each pitch P2 between two adjacent pins in each row of pins is designed to be the same as each pitch P1 between two adjacent pins in each column of pins, the value of P1 being 3 mm for example. Furthermore, the number of pins in each column in the width direction of the endless belt 2030 is designed to be 4 in FIG. 26 to FIG. 29. However, the width of the endless belt as well as the number of pins in each column in the direction of the width thereof can be optionally designed or selected for targeted uses.

Referring to FIG. 26, when a user (visually handicapped) touches to read the displayed pin characters and/or pin graphics on the upside of the conveyor, the pins 2001 move leftward at the upside US of the conveyor to the direction as indicated by arrow LW, and then move rightward, by the idler pulley 2041, at the downside DS to the direction as indicated by arrow RW. During the process of the movement, the pins 2001 are brought to contact with a cylindrical surface 2044 of the idler pulley 2041 to be moved or raised to the first direction D1. In other words, the pins 2001 are either raised by or allowed to stay at raised height by the idler pulley 2041, so that all the pins moved to the downside of the conveyor are positioned at initial reset position, i.e. at height raised by a given amount from the tactile surface or the surface of the first holding members 2010.

The pins 2001 on the belt 2030 move further to the RW direction toward the drive pulley 2040, whereby pins 2001 in each column are brought to the position of the electric cylinders 2020. As shown in FIG. 28, at that position, the four electric cylinders 2020 arranged in alignment in correspondence with the four pins in each column, respectively, are actuated. The four electric cylinders selectively move (lower) the respective pins in the D2 direction by given amounts or allow the pins to stay at the raised height (i.e. move by zero amount or do not move). FIG. 28 shows a case where each of the first, the third and the fourth pins in the column of four pins (as seen from right to left in FIG. 28) has been moved (lowered) to the D2 direction by a certain amount smaller than an amount by which the second pin has been moved (lowered) to the D2 direction. The D2 direction is the direction to which each pin 2001 moves toward each second holding member 2011.

The amount, including zero amount, of the movement of each pin 2001 to the D2 direction from the reset position (raised from the surface of each first holding member 2010) of each pin 2001 is controlled for each pin 2001. According to the present EMBODIMENT, it is designed that the height of each pin 2001 to remain raised from the surface of each first holding member 2010 is in the range from zero to 10 mm. Such height of each pin can be optionally selected to be any arbitrary value in the range. Furthermore, the upper limit value can be optionally changed from the value of 10 mm in accordance with a targeted pin pattern for two-dimensional or three-dimensional display.

The four electric cylinders 2020 are placed outside the belt 2030 suspended in an elliptical shape, and are fixed to a housing or a base (not shown). It is sufficient to place the four electric cylinders for the four rows of pins at one position of the belt 2030 in the direction of the belt movement. However, it is also possible to place the four electric cylinders for the four rows of pins at four different positions of the belt in the belt movement, thereby differentiating the actuation timings of the electric cylinders. By this timing differentiation, the peak value of the total driving current for actuating the electric cylinders can be reduced.

Furthermore, instead of lowering the pins 2001 directly by the electric cylinders 2020, it is possible to lower the pins 301 each by e.g. a disc-type cam and a lever (not shown) which are driven by each electric cylinder. Besides, it is optional to provide a stopper (not shown) at a bottom end of each pin 2001 (i.e. the end of the pin opposite to the end thereof for contact with the electric cylinder) for restricting the pin 2001 from being lowered by each electric cylinder to a depth lower than a desired one.

The belt conveyor comprises the endless belt 2030, the drive pulley 2040., the idler pulley 2041 and a driving motor (not shown) for rotating the shaft 2042, and can be made by a conventional construction. Usually, the belt is tighter at its upside, and looser at its downside. Although not shown, considering that the user (visually handicapped) presses the pins by touching, it is preferable according to the present EMBODIMENT to provide, at the upside of the conveyor, a guide rail for supporting the second holding members 2011, and also to provide, at the downside of the conveyor, a guide rail for supporting the first holding members 2010.

An example of the endless belt 2030 is made of stainless steel having a thickness of about 0.4 mm, a belt width of about 170 mm and a belt length of about 405 mm, and has, at the upside US of the belt, a tactile pin display area of approximately the B6 size (190 mm×130 mm) according to ISO (International Standards Organization). The number of tactile pins according to the B6 size is e.g. 2,816 under the condition that the pitch between adjacent pins in each row and each column is 3 mm. It may be needless to say that parameters, e.g., of the belt width, the belt length and the number of the tactile pins can be set according to display area sizes.

The pair of perforations 2031, at both end portions of the width of the endless belt 2030 respectively, are preferred to be provided for securing the movement of the endless belt 2030 without slip. In such case, it is preferable to provide engagement pins annularly arranged at each one of the two ends of a cylindrical surface of each of the drive pulley 2040 and the idler pulley 2041, such that the engagement pins at each end of each of the drive and idler pulleys 2040 and 2041 are sequentially engaged with the perforations 2040 of each of the pair of perforations 2040.

In a preferred embodiment, the endless belt 2030 is so designed that it can automatically stop for each display zone of the B6 size, and can optionally be continuously moved (forwarded) or fast forwarded. For example, when the user (visually handicapped) finishes reading of characters and/or graphics on one display zone and pushes a switch of "next zone display", the endless belt 2030 moves for a length of one zone, and characters and/or graphics of the next zone having been prepared by the electric cylinders 2020 are brought to be displayed at the upside US.

For fulfilling desire of a user (visually handicapped) to continuously read (touch) the characters and/or graphics, the endless belt 2030 is so designed that it can also continuously move leftward LW at a rate of about 100 to 300 characters per minute. Thus, the tactile pin display apparatus according to the present EMBODIMENT can sequentially and continuously display characters and/or graphics (braille characters and/or braille graphics). Accordingly, it becomes unnecessary for the user to move the finger to each new line, which is needed in the case of a braille paper. Thus, the apparatus is very convenient for users, particularly those visually handicapped.

Although not shown, the endless belt 2030 is moved by optional rotating means for rotating the drive pulley 2040, the means being, for example, a combination of a gear train and a pulse motor. Further, although not shown, the timings of driving the electric cylinders 2020 can be made by phase detection, using e.g. a pulse motor for rotating the drive pulley 2040 or a photo-interrupter (e.g. rotating disc with punch holes) which rotates synchronously with the drive pulley 2040.

Each tactile pin 2001 as used in the present EMBODIMENT is made of stainless steel having a diameter of about 1.2 mm and a length of about 20 mm, and has a roughly semi-spherical shape at each end thereof. An example of a pin holding mechanism for the tactile pins 2001 is shown in FIG. 29. The tactile pin 2001 is movably supported by a first holding member 2010 and a second holding member 2011. Each pair of first holding member 2010 and second holding member 201 is provided on the endless belt 2030 such that the two holding members sandwich the endless belt 2030 therebetween. Each pin 2001 is inserted into and pressed by an O-ring 2050 having an inner diameter slightly smaller than the diameter of each pin 2001. Each O-ring 2050 is placed between the first and the second holding members 2010 and 2011. Thereby, each pin 2001 can be held at an optional position (height) in the length direction of the pin.

The pins 2001 are basically designed to be the same as each other with respect e.g. to the material and the shape such as diameter and length. The holding force by each O-ring 2050 for holding each pin 2001 is designed here to be about 0.4 N. Referring to FIG. 29, in the case where the diameter and the length of each pin 2001 is 1.2 mm and 20 mm, respectively, each ring 2001 made of nitrile-butadiene rubber has a wire diameter of about 0.6 mm and an inner diameter of about 0.8 mm. A plurality of the O-rings can be used for one pin 2001. Furthermore, the pin holding force can be optionally set by selecting, as to the O-rings, materials, hardness values, inner diameters, the number of O-rings for each pin and so on.

Each first holding member 2010 is designed to have a step, such that its upper part is a parallelepiped portion of a 2.8 mm square, and its lower part is a cylinder portion of a 2.4 mm outer diameter. On the other hand, each second holding member 2011 has a shape of a hollow cylinder having a bottom wall. Each second holding member 2011 has, at a couple of portions at an inner circumference at a top end of an inside wall thereof, a couple of small convex portions (not shown in FIG. 29). On the other hand, each first holding member 2010 has, at an outer surface of the cylinder portion thereof at positions corresponding to the convex portions of each second holding member 2011, a couple of concave portions (not shown in FIG. 29) to be fit to the couple of convex portions of each second holding member 2011. Thereby, the two holding members are pressed and integrated with each other. Other than such manner, the two holding members can be integrated as well, e.g., by press-fitting them or using an adhesive.

As described in the foregoing, the tactile pin display apparatus 2100 according to the present EMBODIMENT makes it possible to display characters and/or graphics continuously, and realizes reduction of size and cost of the apparatus. Furthermore, by the multi-row multi-column arrangement of the pins at a constant pitch (e.g. 3 mm) between the adjacent pins, braille characters and/or graphics (general characters and/or graphics) can be displayed at the same time, either two-dimensionally or three-dimensionally. Furthermore, while the user (visually handicapped) read characters and/or graphics at the upside US of the conveyor, subsequent characters and/or graphics to be read next can be prepared (or if necessary displayed) at a subsequent position such as the downside DS of the conveyor.

Embodiment 6

A tactile pin display apparatus of the present EMBODIMENT will be described with reference to FIGS. 30, 31 and 32.

Figure 30:
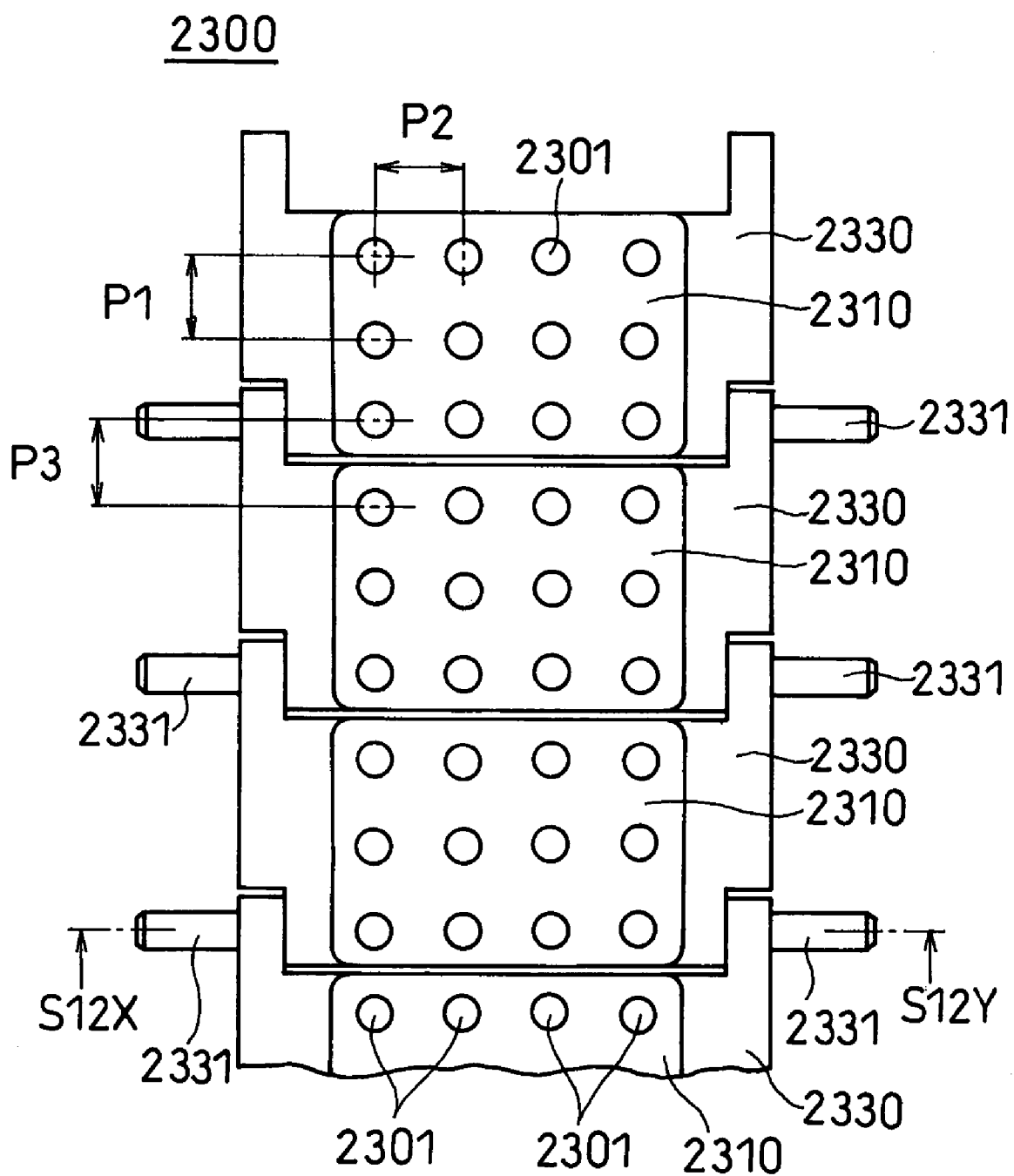
FIG. 30 is a schematic plan view, showing a part of a tactile pin display apparatus according to an embodiment of the present invention, more particularly a part of an endless chain used in the tactile pin display apparatus.

FIG. 30 is a schematic plan view, showing a part of a tactile pin display apparatus according to the present EMBODIMENT, more particularly a part of an endless chain used in the tactile pin display apparatus. FIG. 31 is a schematic cross-sectional view cut by S12X-Sl2Y plane in FIG. 30.

Figure 31:
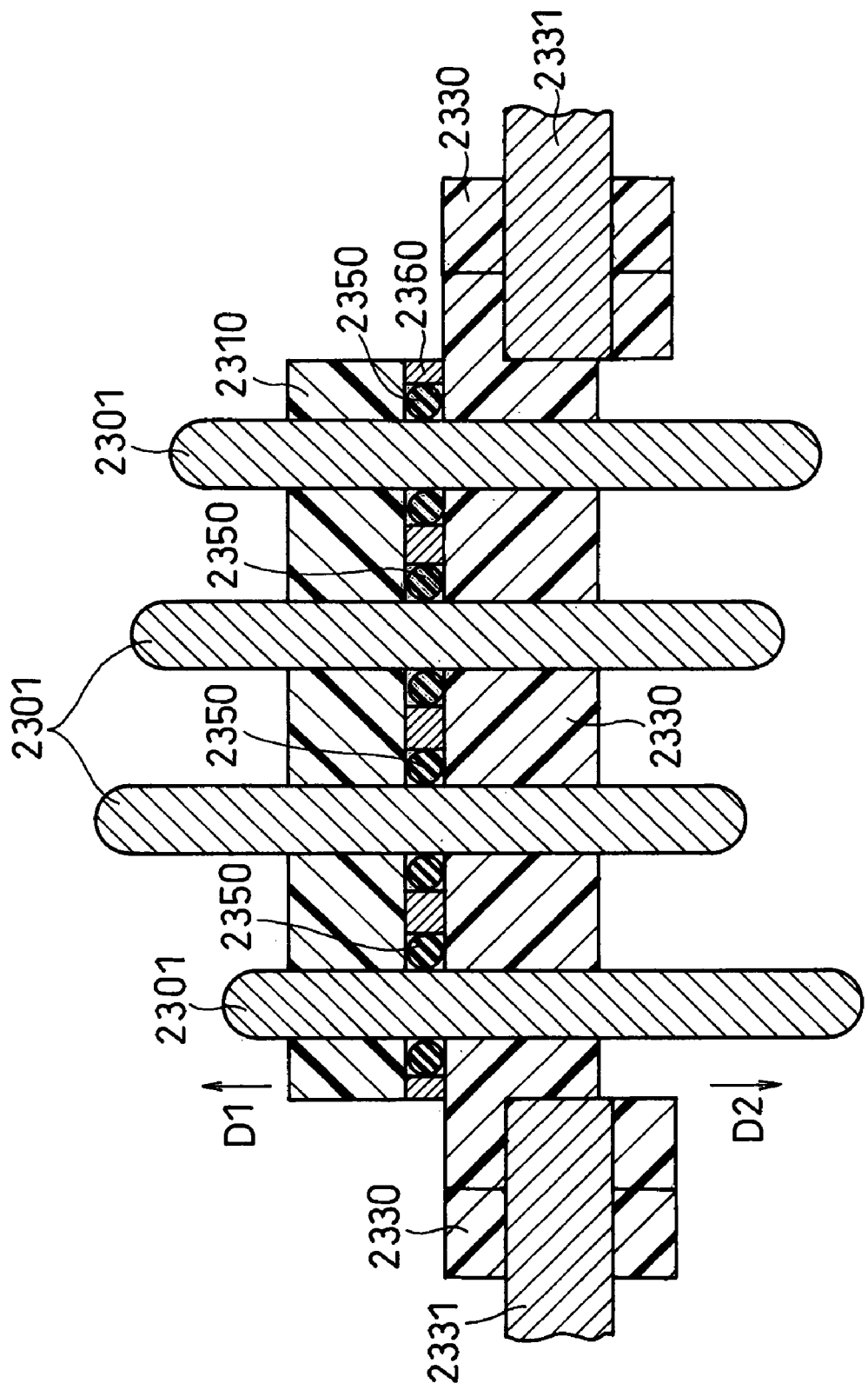
FIG. 31 is a schematic cross-sectional view, cut by S12X-S12Y plane, of a part (endless chain or conveyor) of the apparatus of FIG. 30.

In FIGS. 30 and 31, reference numeral 2301 designates tactile pins made of stainless steel for displaying characters (braille characters) and/or graphics (braille graphics) by differences of heights of the pins. Reference numeral 2310 designates first holding members for supporting the pins 2301 to be movable up-and-down. Reference numeral 2330 designates chain segments which are linked with each other to be a chain, and each of which has a plat portion for supporting the pins 2301 to be movable up-and-down therein. Each chain segment 2330 functions also as a second holding member, and is made of a resin material.

Reference numeral 2331 designates a pair of engagement pins, each pair being provided at both sides of each chain segment, respectively. Although not shown, the pair of engagement pins are provided for engagement with rotational suspending means or chain moving means. For example, the pair of engagement pins 2331 are provided for engagement with a pair of gear teeth, respectively, of each of a drive sprocket and an idler sprocket for moving the chain. Reference numeral 2350 designates O-rings each for elastically pressing and holding each pin 2301. Reference numeral 2360 designates retainers each for retaining the O-rings 2350 at holes thereof (12 holes for 12 O-rings in each chain segment 2330). Reference numeral 2300 designates a tactile pin display apparatus according to the present EMBODIMENT.

Adding description of the view of FIG. 31 here, the position of the plane S12X-S12Y for cutting the endless chain of FIG. 30 to produce the cross-sectional view of FIG. 31 is similar to the position of the plane S11X-S11Y for cutting the endless belt of FIG. 26 to produce the cross-sectional view of FIG. 29. More specifically, assuming that the endless chain of FIG. 30 is suspended by two rotational suspending means (for example, drive sprocket and idler sprocket in place of the drive pulley and the idler pulley as shown in FIG. 26) in a manner similar to that shown in FIG. 26, the plane S12X-S12Y is positioned at an upper part of the endless chain as partially shown in FIG. 30.

The basic concept of the tactile pin display apparatus 2300 is the same as that of the EMBODIMENT 5, except that here an endless chain is used in place of the endless belt.

Each chain segment 2330 has tactile pins which are. arranged in multi-row multi-column with a pitch of 3 mm, and which are movable up-and-down. In FIG. 30, the pitch between two adjacent pins in each column of pins is designated as P2 and is designed to be the same as each pitch P1 between two adjacent pins in each row of pins, namely either P1 between two adjacent pins in each chain segment 2330 or P3 between two adjacent pins in two adjacent chain segments 2330.

Adjacent ones of the chain segments 2330 are linked to be bendable therebetween, thereby forming an endless loop or endless chain. The following five arrangements here for the present EMBODIMENT are similar to corresponding arrangements in EMBODIMENT 5.

A first arrangement is to suspend the endless loop (endless chain) in an elliptical shape by a drive sprocket and an idler sprocket. A second arrangement is to move the loop (chain conveyor) to repeatedly pass through an topside and a downside of the two sprockets. A third arrangement is to place, at one position in the movement of the endless chain, plural electric cylinders in alignment in the direction of the width of the endless chain.

A fourth arrangement is to prepare electric cylinders in the number corresponding to the number of pins in each column on each chain segment 2330, so that four electric cylinders are to be prepared in the present EMBODIMENT in correspondence with the shown four pins in each column. A fifth arrangement is to actuate the four electric cylinders for selectively positioning the pins 2301 at arbitrary positions raised from the surface (tactile surface) of each first holding member 2310, i.e. at arbitrary heights raised from the tactile surface in first direction D1 similarly as in EMBODIMENT 5.

Besides, although not shown, the present EMBODIMENT assumes use of a rotatable roller, in place of the idler pulley in EMBODIMENT 5, for raising the pins 2301 from the chain (namely moving the pins 2301 to first direction D1) or allowing the pins 2301 to stay at the raised position, to become positioned at the initial position (namely reset position). Thus, such rotatable roller can be referred to as pin height reset member (pin position reset member). Such rotatable roller can be placed inside the loop of the endless chain at an appropriate position before the position of the electric cylinders in the direction of the chain movement.

Furthermore, the number of rows and columns of pins to be arranged on each chain segment 2330 can be set to be optional.

Adding description of FIG. 31, it shows an example of a structure for arranging the pins 2301 to be movable up-and-down at a plane surface portion of each chain segment 2330. The chain segment 2330 functions also as the second holding member. Each pin 2301 is supported, by the first holding member 2310 and the chain segment 2330, to be movable up-and-down. Furthermore, each of the pins 2301 (four pins in each column of each chain segment) is elastically pressed at a side thereof and held by each of the O-rings 2350 arranged in the retainer 2360 at an optional position (height) in the up-and-down movement (length direction) of each pin. The material, dimensions and so on of each O-ring in the present EMBODIMENT are assumed to be the same as those in EMBODIMENT 5.

It is to be noted that the retainer 2360, which is for facilitating the O-ring assembling, can be omitted by forming a recessed portion at either each first holding member 2310 or each chain segment 2330 and by retaining each O-ring in the thus formed recessed portion.

A structure of a further endless conveyor, which can be used in the tactile pin display apparatus according to the present EMBODIMENT in place of the above-described endless chain (conveyor), will be described with reference to FIG. 32. FIG. 32 is a schematic cross-sectional view of the further endless conveyor as seen similarly as in FIG. 31 showing the above-described endless chain (conveyor).

Figure 32:
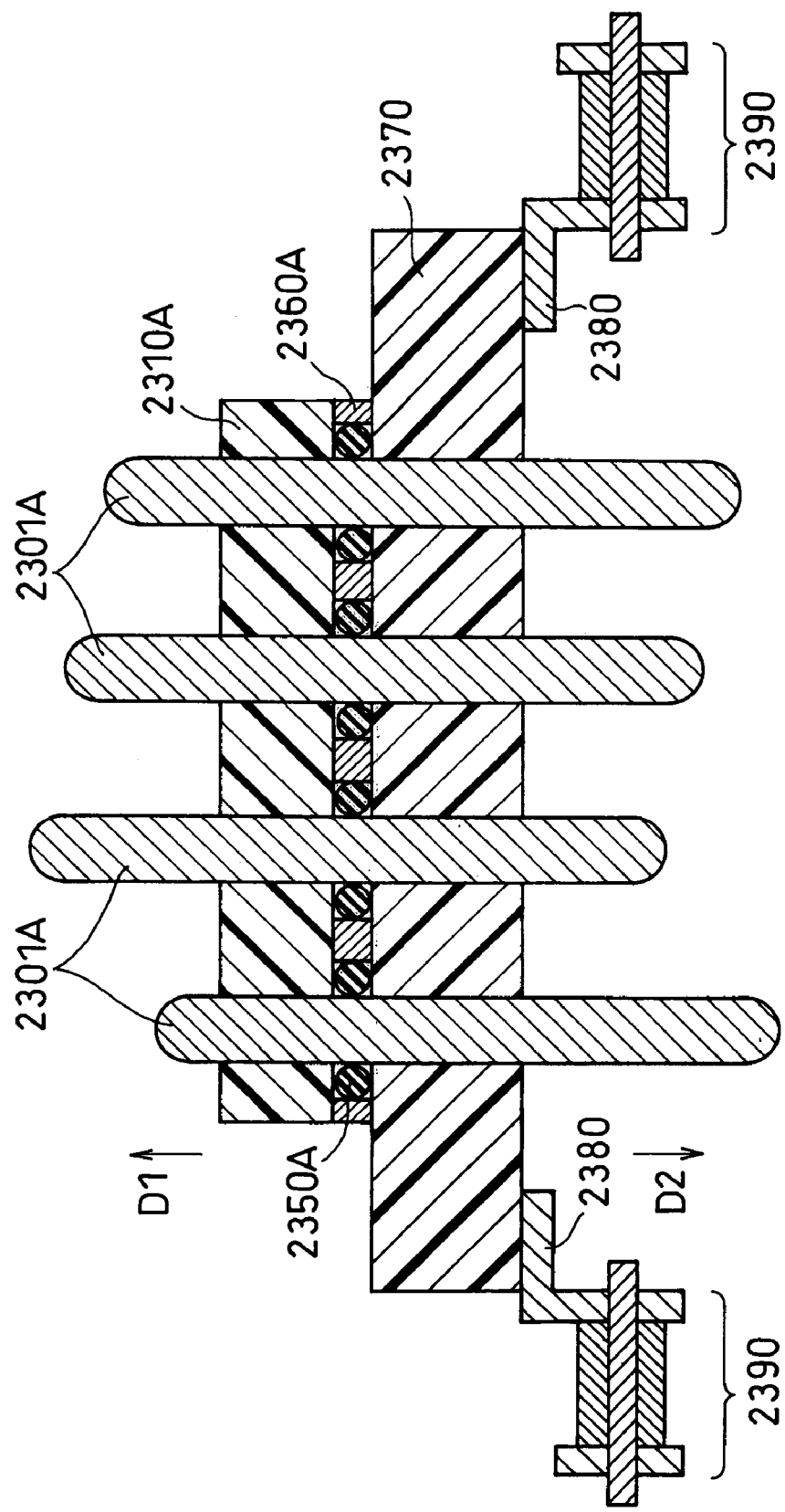
FIG. 32 is a schematic cross-sectional view of a part of a tactile pin display apparatus according to an embodiment of the present invention, more specifically a part of a further endless conveyor as seen similarly as in FIG. 31.

Just as the endless chain (conveyor) of FIG. 30 (FIG. 31) is assumed as above, the endless conveyor shown by the cross-sectional view of FIG. 32 is also assumed to be suspended by two rotational suspending means (drive and idler sprockets) in a manner similar to that shown in FIG. 26. The cross-sectional view of FIG. 32 is thus assumed to be cut by a plane positioned at an upper part of the endless conveyor in a manner similar to the case of each of the planes S11X-S11Y and S12X-S12Y as described above.

Referring to FIG. 32, two endless chains (2390) are provided arranged at a given distance therebetween for supporting a second plate-shaped holding member 2370. Each endless chain (2390) comprises chain segments 2390, such that each chain segment 2390 has an attachment portion 2380, and that adjacent ones of the chain segments 2390 are linked to be bendable therebetween, thereby forming an endless loop or endless conveyor in an elliptical shape. The second plate-shaped holding member 2370 is fixed, at both width ends thereof, with the attachment portions 2380 of the chain segments 2390 of the two endless chains (2390), respectively. Here, it is assumed to use a screw to fix the attachment portion 2380 of each chain segment to the second plate-shaped holding member 2370.

On the second plate-shaped holding member 2370, a pin retainer 2360A retaining O-rings 2350A therein is stacked and fixed using e.g. screws. On the pin retainer 2360A, a first plate-shaped holding member 2310A is stacked and fixed using e.g. screws. The stacked assembly of the first and the second plate-shaped holding members 2310A and 2370 with the pin retainer 2360A therebetween supports pins 2301A to be movable up-and-down in directions D1 and D2, and holds each pin 2301A at an arbitrary position (height) from an upper surface (tactile surface) of the first plate-shaped holding member 2310A. Just as in the case of the above-described embodiments, the number of rows and the number of columns of the pins 2301A can be optionally designed.

Furthermore, although not shown in FIGS. 29, 31 and 32, it is also possible that each pin shown therein is provided with an annular groove (grooves) in a manner similar to those as shown in FIG. 19 (annular groove 1002) and FIG. 24 (annular grooves 2 and 3) for the purpose of allowing each O-ring to engage with such annular groove(s) for increasing the holding force of the pin by the O-ring. In providing such annular groove(s), it is preferable to provide such annular groove(s) at such position(s) that when each O-ring is engaged with such annular groove(s) of each pin, the pin is positioned at the first position (reset position) or a later described second position (display position).

As described in the foregoing, the tactile pin display apparatus according to the present EMBODIMENT 6 makes it possible to display characters and/or graphics continuously, and realizes reduction of size and cost of the apparatus just as in the case e.g. of EMBODIMENT 5. Furthermore, by the multi-row multi-column arrangement of the pins at a constant pitch (e.g. 3 mm) between the adjacent pins, braille characters and/or graphics (general characters and/or graphics) can be displayed at the same time, either two-dimensionally or three-dimensionally. Furthermore, while the user (visually handicapped) read characters and/or graphics at the upside of the conveyor, subsequent characters and/or graphics to be read next can be prepared (or if necessary displayed) at a subsequent position such as the downside of the conveyor.

It is to be noted that the above-described tactile pin holding mechanisms or apparatuses applied to continuous tactile pin (braille) display apparatuses using disc-type rotational members (discs) or rotational hollow cylinders (drums) are not limited to such tactile pin display apparatuses, but can be effectively applied also to continuous tactile pin (braille) display apparatuses using rotational conveyors or rotational drums each having a conical surface as a tactile surface that are designed to display characters and/or graphics two-dimensionally or three-dimensionally. For example, although not shown, in stead of arranging plural O-rings annularly in recessed grooves on a disc-type rotational member for supporting plural tactile pins to be movable up-and-down, plural O-rings can be annularly arranged on or in recessed grooves on a cylindrical surface of a rotational hollow cylinder (drum) for pressing the pins from one side of each pin and holding the pins.

Furthermore, regarding conveyors in the case of tactile pin display apparatuses using rotational conveyors, various kinds of conveyors (not only belt conveyors or chain conveyors) can be optionally applied, such as a pallet conveyor for sequentially conveying plural pallets.

Besides, photocatalysts or photocatalytic effects are described above to be used in the pins, the pin holding members and/or the like in the tactile pin (braille) display apparatuses according to the above EMBODIMENTS, it is evident that such photocatalysts or photocatalytic effects can also be applied to any optional braille display members. For example, it is effective to use photocatalysts or photocatalytic effects for braille cell members to be raised to braille dots by air pressure or resin expansion, and for foamed resin members to be raised to braille dots by heat.

Furthermore, for braille cells in various braille display members such as braille sheets, braille books, braille labels, braille blocks and keyboards with braille, the use of photocatalysts or photocatalytic effects at least on the surface of or inside the braille cells is effective for decomposing bacteria, sweat, oil of the hand, food particles and the like on the braille cells.

As described in the foregoing, the tactile pin holding mechanisms or apparatuses according to the EMBODIMENTS of the present invention can simultaneously hold plural pins together, using, for example, elastic members annularly arranged on e.g. a rotational member, or rod-shaped elastic members arranged between pins, or compression coil springs arranged between pins. Further, with the aid of ring-shaped members (O-rings) each fit to each pin, each pin can be held at an arbitrary positions (height from tactile surface) in the up-and-down movement of each pin. Furthermore, such pin holding at an arbitrary position can also be accomplished with the aid of elastic holding members such as flat springs.

Each one of the tactile pin (braille) display apparatuses according to the EMBODIMENTS of the present invention can allow a user (visually handicapped) to be able to touch them as if the user touches a braille book or braille paper, owing to the use e.g. of: one of the pin holding mechanisms or apparatuses; actuators distantly placed nearby a rotational member; a mechanism for moving the pins in the first direction (D1) to the initial reset position or allowing the pins to stay at the reset position by using e.g. a rotatable roller, thereby positioning all the pins at the reset position; and a mechanism for selectively moving the pins in the second direction (D2) to positions different from the reset position by driving the actuators, which are driven at timings different from each other if necessary.

Furthermore, differently from the case of displaying (touching or reading) and refreshing one line (braille line) at a time, it becomes possible according to the EMBODIMENTS of the present invention to continuously display (touch or read) any desired number of pins (pin cells or braille cells), namely any desired lengths of sentences, on e.g. a rotational member such as a rotational disc.

Moreover, the tactile pin display apparatuses according to the EMBODIMENTS of the present invention including the pin moving mechanisms and the pin holding mechanisms can be constructed very simply, and realize reductions of size, weight and cost thereof. As a result, it becomes possible for users (visually handicapped) to conveniently use and easily buy such apparatuses. Accordingly, it becomes possible to widely spread such apparatuses to public facilities such as libraries and transportation stations.

In addition, the tactile pin display apparatuses according to the EMBODIMENTS of the present invention can be used as braille display terminals coupled to personal computers for reading internet home pages, or coupled to cellular phones or PDAs (personal digital assistants) for mobile internet applications. Needless to say, they can also be used as braille display terminals for various electronic equipment such as ticket-vending machines, ATMs (automated teller machines) for money, vending machines, electronic book readers, facsimiles, braille learning apparatuses, electronic voting machines and navigation systems.

Besides, by providing photocatalysts or photocatalytic effects to tactile or braille pins and rotational members to movably hold the pins (such pins and rotational members being examples of braille display members), it becomes possible that contaminants deposited thereon, such as bacteria, sweat, oil of the hand and food particles, can be decomposed, thereby keeping the tactile surfaces (surfaces of the braille display members) clean, and that the pin sliding movement (sliding movement of the braille display members) can be constantly stabilized. Furthermore, by providing a lubricant material to each pin sliding portion, it becomes possible to stabilize each pin holding force and each pin sliding movement as well.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A tactile pin holding apparatus comprising:
a holding member having a tactile surface and a first number of holes, and being provided for supporting the first number of tactile pins in the holes, respectively, to be movable up-and-down therein relative to the tactile surface for displaying characters and/or graphics, the tactile pins being arranged in multi-row multi-column and in a second number of groups at the tactile surface; and
elastic members, in the second number, respectively corresponding to the second number of groups of tactile pins and being arranged at the holding member for pressing and holding the tactile pins with the holding member in a manner that each of the tactile pins in each of the groups of tactile pins is pressed by the elastic member corresponding thereto can thereby be held at a desired height relative to the tactile surface, and that the each of the tactile pins is movable up-and-down when a force exceeding a given value is applied to the each of the tactile pins in up-and-down direction, characterized in that the second number is smaller than the first number, each elastic member presses simultaneously against the plurality of tactile pins in the group associated with the respective elastic member, and that each of the tactile pins is pressed at a side thereof by the respective elastic member.

2. The tactile pin holding apparatus according to claim 1, wherein the second number is the number of rows of tactile pins, and each of the elastic members provided for each of the rows of tactile pins is an elastic ring placed annularly at the holding member for pressing sideways against the tactile pins of the respective row.

3. A tactile pin display apparatus, comprising:
a tactile pin holding apparatus as defined in claim 2 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

4. The tactile pin display apparatus according to claim 3, wherein the number of the actuators is equal to the number of rows of tactile pins, and the actuators are placed distantly from each other.

5. The tactile pin display apparatus according to claim 3, wherein the number of the actuators is equal to the number of rows of tactile pins, and the actuators are driven at timings respectively different from each other.

6. The tactile pin display apparatus according to claim 3, further comprising an abnormal load detecting means for detecting an abnormal load applied to the rotational member.

7. The tactile pin display apparatus according to claim 3, further comprising an indicator portion provided nearby the rotational member for a user to put its finger at for touching the tactile pins.

8. The tactile pin display apparatus according to claim 3, wherein
each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface, and
the tactile pin display apparatus further comprises engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member.

9. The tactile pin display apparatus according to claim 8, wherein the number of the engagement release members is equal to the number of rows of tactile pins.

10. The tactile pin holding apparatus according to claim 1, wherein the second number is equal to half of the number of columns of tactile pins, and each of the elastic members is an elastic rod extending in column direction and being sandwiched between a pair of adjacent columns of tactile pins in a manner that the tactile pins in one column of the pair of columns are pressed and held by one side of the elastic rod, and the tactile pins in the other column are pressed and held by the opposite side of the elastic rod.

11. A tactile pin display apparatus, comprising:
a tactile pin holding apparatus as defined in claim 10 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

12. The tactile pin display apparatus according to claim 11, wherein the number of the actuators is equal to the number of rows of tactile pins, and the actuators are placed distantly from each other.

13. The tactile pin display apparatus according to claim 11, wherein the number of the actuators is equal to the number of rows of tactile pins, and the actuators are driven at timings respectively different from each other.

14. The tactile pin display apparatus according to claim 11, further comprising an abnormal load detecting means for detecting an abnormal load applied to the rotational member.

15. The tactile pin display apparatus according to claim 11, further comprising an indicator portion provided nearby the rotational member for a user to put its finger at for touching the tactile pins.

16. The tactile pin display apparatus according to claim 11, wherein
each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface, and
the tactile pin display apparatus further comprises engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member.

17. The tactile pin display apparatus according to claim 16, wherein the number of the engagement release members is equal to the number of rows of tactile pins.

18. The tactile pin holding apparatus according to claim 1, wherein the second number is equal to half of the number of tactile pins, and each of the elastic members is an elastic segment sandwiched between a pair of adjacent tactile pins in each row in a manner that one of the pair of tactile pins is pressed and held by one side of the elastic segment, and the other tactile pin is pressed and held by the opposite side of the elastic segment.

19. A tactile pin display apparatus, comprising:
a tactile pin holding apparatus as defined in claim 18 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

20. The tactile pin display apparatus according to claim 19, wherein the number of the actuators is equal to the number of rows of tactile pins, and the actuators are placed distantly from each other.

21. The tactile pin display apparatus according to claim 19, wherein the number of the actuators is equal to the number of rows of tactile pins, and the actuators are driven at timings respectively different from each other.

22. The tactile pin display apparatus according to claim 19, further comprising an abnormal load detecting means for detecting an abnormal load applied to the rotational member.

23. The tactile pin display apparatus according to claim 19, further comprising an indicator portion provided nearby the rotational member for a user to put its finger at for touching the tactile pins.

24. The tactile pin display apparatus according to claim 19, wherein
each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface, and the tactile pin display apparatus further comprises engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member.

25. The tactile pin display apparatus according to claim 24, wherein the number of the engagement release members is equal to the number of rows of tactile pins.

26. The tactile pin holding apparatus according to claim 1, wherein the each of the tactile pins in the each of the groups of tactile pins has an annular groove for engagement with the elastic member corresponding to the each of the groups of tactile pins.

27. A tactile pin display apparatus, comprising:
a tactile pin holding apparatus as defined in claim 26 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

28. The tactile pin display apparatus according to claim 27, wherein the number of the actuators is equal to the number of rows of tactile pins, and the actuators are placed distantly from each other.

29. The tactile pin display apparatus according to claim 27, wherein the number of the actuators is equal to the number of rows of tactile pins, and the actuators are driven at timings respectively different from each other.

30. The tactile pin display apparatus according to claim 27, further comprising an abnormal load detecting means for detecting an abnormal load applied to the rotational member.

31. The tactile pin display apparatus according to claim 27, further comprising an indicator portion provided nearby the rotational member for a user to put its finger at for touching the tactile pins.

32. The tactile pin display apparatus according to claim 27, wherein
each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface, and the tactile pin display apparatus further comprises engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member.

33. The tactile pin display apparatus according to claim 32, wherein the number of the engagement release members is equal to the number of rows of tactile pins.

34. The tactile pin holding apparatus according to claim 1, wherein the holding member is disc-shaped or drum-shaped.

35. A tactile pin display apparatus, comprising:
a tactile pin holding apparatus as defined in claim 34 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

36. The tactile pin display apparatus according to claim 35, wherein the number of the actuators is equal to the number of rows of tactile pins, and the actuators are placed distantly from each other.

37. The tactile pin display apparatus according to claim 35, wherein the number of the actuators is equal to the number of rows of tactile pins, and the actuators are driven at timings respectively different from each other.

38. The tactile pin display apparatus according to claim 35, further comprising an abnormal load detecting means for detecting an abnormal load applied to the rotational member.

39. The tactile pin display apparatus according to claim 35, further comprising an indicator portion provided nearby the rotational member for a user to put its finger at for touching the tactile pins.

40. The tactile pin display apparatus according to claim 35, wherein
each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface, and the tactile pin display apparatus further comprises engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member.

41. The tactile pin display apparatus according to claim 40, wherein the number of the engagement release members is equal to the number of rows of tactile pins.

42. The tactile pin holding apparatus according to claim 1, wherein each of the elastic members is a non-metal ring-shaped member, a non-metal rod-shaped member, a non-metal tube-shaped member or a compression coil spring.

43. A tactile pin display apparatus, comprising:
a tactile pin holding apparatus as defined in claim 42 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

44. The tactile pin display apparatus according to claim 43, wherein the number of the actuators is equal to the number of rows of tactile pins, and the actuators are placed distantly from each other.

45. The tactile pin display apparatus according to claim 43, wherein the number of the actuators is equal to the number of rows of tactile pins, and the actuators are driven at timings respectively different from each other.

46. The tactile pin display apparatus according to claim 43, further comprising an abnormal load detecting means for detecting an abnormal load applied to the rotational member.

47. The tactile pin display apparatus according to claim 43, further comprising an indicator portion provided nearby the rotational member for a user to put its finger at for touching the tactile pins.

48. The tactile pin display apparatus according to claim 43, wherein
each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface, and
the tactile pin display apparatus further comprises engagement release members each being brought to contact with each of the tactile pins in each of the holes, during the rotation of the rotational member, for releasing the engagement between the step portion of the each of the tactile pins and the engagement portion of the each of the holes, the engagement release members being placed upstream of the pin height reset member in the rotation of the rotational member.

49. A tactile pin holding apparatus according to claim 1, wherein
wherein each of the holes comprises an engagement portion, and each of the tactile pins in the each of the holes comprises a step portion engageable with the engagement portion of the each of the holes, such that when the step portion of the each of the tactile pins is engaged with the engagement portion of the each of the holes, the each of the tactile pins is held at a desired height relative to the tactile surface.

50. A tactile pin display apparatus, comprising:
a tactile pin holding apparatus as defined in claim 49 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

51. The tactile pin holding apparatus according to claim 49, further comprising engagement release members each for being coupled to each of the tactile pins for releasing the engagement between the step portion of the each of the tactile pins and the engagement portion of the each of the holes.

52. A tactile pin display apparatus, comprising:
a tactile pin holding apparatus as defined in claim 51 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

53. A tactile pin display apparatus, comprising:
a tactile pin holding apparatus as defined in claim 1 and wherein the holding member is a rotational member;
rotation driving means coupled to the rotational member for rotating the rotational member;
a pin height reset member provided nearby the rotational member for resetting the height of the tactile pins at a reset height when the tactile pins are brought to contact with the pin height reset member during the rotation of the rotational member;
actuators provided nearby the rotational member for moving the tactile pins; and
selectively driving means coupled to the actuators for selectively driving the actuators to selectively move the tactile pins to be positioned at desired heights, respectively, relative to the tactile surface.

54. The tactile pin display apparatus according to claim 53, wherein the number of the actuators is equal to the number of rows of tactile pins, and the actuators are placed distantly from each other.

55. The tactile pin display apparatus according to claim 53, wherein the number of the actuators is equal to the number of rows of tactile pins, and the actuators are driven at timings respectively different from each other.

56. The tactile pin display apparatus according to claim 53, further comprising an abnormal load detecting means for detecting an abnormal load applied to the rotational member.

57. The tactile pin display apparatus according to claim 53, further comprising an indicator portion provided nearby the rotational member for a user to put its finger at for touching the tactile pins.

* * * * *